(12) United States Patent
Yamada

(10) Patent No.: US 8,059,312 B2
(45) Date of Patent: Nov. 15, 2011

(54) CALIBRATION DATA CREATING DEVICE

(75) Inventor: Ryuji Yamada, Ogaki (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 882 days.

(21) Appl. No.: 12/027,008

(22) Filed: Feb. 6, 2008

(65) Prior Publication Data

US 2008/0192272 A1 Aug. 14, 2008

(30) Foreign Application Priority Data

Feb. 8, 2007 (JP) ................................. 2007-029770
Mar. 30, 2007 (JP) ................................. 2007-094641

(51) Int. Cl.
*G06F 3/12* (2006.01)
*G06K 15/00* (2006.01)
*H04N 1/40* (2006.01)

(52) U.S. Cl. ..................... 358/3.13; 358/3.14; 358/3.22; 358/3.23; 358/1.16

(58) Field of Classification Search .......................... None
See application file for complete search history.

(56) References Cited

U.S. PATENT DOCUMENTS

| | | | |
|---|---|---|---|
| 5,649,073 | A | 7/1997 | Knox et al. |
| 5,936,741 | A | 8/1999 | Burns |
| 6,067,406 | A * | 5/2000 | Van Hoof et al. ............... 358/1.9 |
| 6,616,262 | B2 | 9/2003 | Nakajima et al. |
| 7,061,648 | B2 * | 6/2006 | Nakajima et al. ............... 358/1.9 |
| 7,133,623 | B2 | 11/2006 | Yoshida |
| 2002/0113984 | A1 | 8/2002 | Nakajima et al. |
| 2004/0217972 | A1 * | 11/2004 | Deishi ........................... 345/596 |
| 2006/0181687 | A1 | 8/2006 | Matsuda |

FOREIGN PATENT DOCUMENTS

| | | |
|---|---|---|
| EP | 0 734 149 A2 | 9/1996 |
| EP | 0 859 506 A1 | 8/1998 |
| EP | 1 365 576 A2 | 11/2003 |

(Continued)

OTHER PUBLICATIONS

Roetling et al., "Tone Reproduction and Screen Design for Pictorial Electrographic Printing", Journal of the Applied Photographic Engineering, vol. 5, No. 4, 1979, pp. 179-182.

*Primary Examiner* — Twyler Haskins
*Assistant Examiner* — Barbara Reinier
(74) *Attorney, Agent, or Firm* — Scully, Scott, Murphy & Presser, P.C.

(57) ABSTRACT

A calibration data creating device includes a reference measured density memory, a dither data memory, a corresponding set density determining unit, a calibration data creating unit, and a calibration data creating unit. The reference measured density memory stores measured densities of reference density patches that are formed by an image-forming unit based on the reference density patch data. The dither data memory stores dither data that has a plurality of dot locations, the dither data having a prescribed threshold at each dot location. The corresponding set density determining unit determines corresponding set densities for the plurality of the reference set densities. The calibration data creating unit creates calibration data indicating a correlation between the set densities and calibrated set densities, the calibrated set density for each set density allowing the dither data to create binarized image data that enables the image-forming unit to form an image whose density is the same as the target density for the each set density.

23 Claims, 37 Drawing Sheets

FOREIGN PATENT DOCUMENTS

| | | |
|---|---|---|
| JP | 11-177823 | 7/1999 |
| JP | 2001-111833 | 4/2001 |
| JP | 2001-251510 | 9/2001 |
| JP | 2002-57911 | 2/2002 |
| JP | 2003-125202 | 4/2003 |
| JP | 2004-114343 | 4/2004 |
| JP | 2005-107047 | 4/2005 |
| JP | 2005-144883 | 6/2005 |
| JP | 2006-195849 | 7/2006 |
| JP | 2006-222857 | 8/2006 |

* cited by examiner

FIG.3

| 24 | FLASH MEMORY |
|---|---|
| 24a | REFERENCE DENSITY PATCH DATA MEMORY AREA |
| 24b | A REFERENCE DENSITY PATCH COVERAGE MEMORY AREA |
| 24c | DITHER MATRIX MEMORY AREA |
| 24c1 | STANDARD MODE CYAN DITHER MATRIX MEMORY AREA |
| 24c2 | STANDARD MODE MAGENTA DITHER MATRIX MEMORY AREA |
| 24c3 | STANDARD MODE YELLOW DITHER MATRIX MEMORY AREA |
| 24c4 | STANDARD MODE BLACK DITHER MATRIX MEMORY AREA |
| 24c5 | HIGH-QUALITY MODE CYAN DITHER MATRIX MEMORY AREA |
| 24c6 | HIGH-QUALITY MODE MAGENTA DITHER MATRIX MEMORY AREA |
| 24c7 | HIGH-QUALITY MODE YELLOW DITHER MATRIX MEMORY AREA |
| 24c8 | HIGH-QUALITY MODE BLACK DITHER MATRIX MEMORY AREA |
| 24d | CALIBRATION TABLE MEMORY AREA |
| 24d1 | STANDARD MODE CYAN CALIBRATION TABLE MEMORY AREA |
| 24d2 | STANDARD MODE MAGENTA CALIBRATION TABLE MEMORY AREA |
| 24d3 | STANDARD MODE YELLOW CALIBRATION TABLE MEMORY AREA |
| 24d4 | STANDARD MODE BLACK CALIBRATION TABLE MEMORY AREA |
| 24d5 | HIGH-QUALITY MODE CYAN CALIBRATION TABLE MEMORY AREA |
| 24d6 | HIGH-QUALITY MODE MAGENTA CALIBRATION TABLE MEMORY AREA |
| 24d7 | HIGH-QUALITY MODE YELLOW CALIBRATION TABLE MEMORY AREA |
| 24d8 | HIGH-QUALITY MODE BLACK CALIBRATION TABLE MEMORY AREA |

FIG.4

| | |
|---|---|
| 25 | RAM |
| 25a | CORRESPONDING DENSITY DATA MEMORY AREA |
| 25a1 | STANDARD MODE CYAN CORRESPONDING DENSITY DATA MEMORY AREA |
| 25a2 | STANDARD MODE MAGENTA CORRESPONDING DENSITY DATA MEMORY AREA |
| 25a3 | STANDARD MODE YELLOW CORRESPONDING DENSITY DATA MEMORY AREA |
| 25a4 | STANDARD MODE BLACK CORRESPONDING DENSITY DATA MEMORY AREA |
| 25a5 | HIGH-QUALITY MODE CYAN CORRESPONDING DENSITY DATA MEMORY AREA |
| 25a6 | HIGH-QUALITY MODE MAGENTA CORRESPONDING DENSITY DATA MEMORY AREA |
| 25a7 | HIGH-QUALITY MODE YELLOW CORRESPONDING DENSITY DATA MEMORY AREA |
| 25a8 | HIGH-QUALITY MODE BLACK CORRESPONDING DENSITY DATA MEMORY AREA |
| 25b | REFERENCE DENSITY PATCH MEASURED DENSITY MEMORY AREA |
| 25b1 | CYAN REFERENCE DENSITY PATCH MEASURED DENSITY MEMORY AREA |
| 25b2 | MAGENTA REFERENCE DENSITY PATCH MEASURED DENSITY MEMORY AREA |
| 25b3 | YELLOW REFERENCE DENSITY PATCH MEASURED DENSITY MEMORY AREA |
| 25b4 | BLACK REFERENCE DENSITY PATCH MEASURED DENSITY MEMORY AREA |
| 25c | CORRESPONDING MEASURED DENSITY MEMORY AREA |
| 25c1 | STANDARD MODE CYAN CORRESPONDING MEASURED DENSITY MEMORY AREA |
| 25c2 | STANDARD MODE MAGENTA CORRESPONDING MEASURED DENSITY MEMORY AREA |
| 25c3 | STANDARD MODE YELLOW CORRESPONDING MEASURED DENSITY MEMORY AREA |
| 25c4 | STANDARD MODE BLACK CORRESPONDING MEASURED DENSITY MEMORY AREA |
| 25c5 | HIGH-QUALITY MODE CYAN CORRESPONDING DENSITY DATA MEMORY AREA |
| 25c6 | HIGH-QUALITY MODE CORRESPONDING MEASURED DENSITY MEMORY AREA |
| 25c7 | HIGH-QUALITY MODE YELLOW CORRESPONDING MEASURED DENSITY MEMORY AREA |
| 25c8 | HIGH-QUALITY MODE BLACK CORRESPONDING MEASURED DENSITY MEMORY AREA |
| 25d | INTERPOLATION DATA MEMORY AREA |
| 25d1 | STANDARD MODE CYAN INTERPOLATION DATA MEMORY AREA |
| 25d2 | STANDARD MODE MAGENTA INTERPOLATION DATA MEMORY AREA |
| 25d3 | STANDARD MODE YELLOW INTERPOLATION DATA MEMORY AREA |
| 25d4 | STANDARD MODE BLACK INTERPOLATION DATA MEMORY AREA |
| 25d5 | HIGH-QUALITY MODE CYAN INTERPOLATION DATA MEMORY AREA |
| 25d6 | HIGH-QUALITY MODE MAGENTA INTERPOLATION DATA MEMORY AREA |
| 25d7 | HIGH-QUALITY MODE YELLOW INTERPOLATION DATA MEMORY AREA |
| 25d8 | HIGH-QUALITY MODE BLACK INTERPOLATION DATA MEMORY AREA |
| 25e | TARGET DATA MEMORY AREA |
| 25e1 | STANDARD MODE CYAN TARGET DATA MEMORY AREA |
| 25e2 | STANDARD MODE MAGENTA TARGET DATA MEMORY AREA |
| 25e3 | STANDARD MODE YELLOW TARGET DATA MEMORY AREA |
| 25e4 | STANDARD MODE BLACK TARGET DATA MEMORY AREA |
| 25e5 | HIGH-QUALITY MODE CYAN TARGET DATA MEMORY AREA |
| 25e6 | HIGH-QUALITY MODE MAGENTA TARGET DATA MEMORY AREA |
| 25e7 | HIGH-QUALITY MODE YELLOW TARGET DATA MEMORY AREA |
| 25e8 | HIGH-QUALITY MODE BLACK TARGET DATA MEMORY AREA |

FIG.11(a)

CONTENT OF REFERENCE DENSITY
PATCH DATA MEMORY AREA 24a

| REFERENCE DENSITY PATCH NAME | SET DENSITY OF REFERENCE DENSITY PATCH (%) | COLOR |
|---|---|---|
| REFERENCE DENSITY PATCH C1 | 20 | CYAN |
| REFERENCE DENSITY PATCH M1 | 20 | MAGENTA |
| REFERENCE DENSITY PATCH Y1 | 20 | YELLOW |
| REFERENCE DENSITY PATCH K1 | 20 | BLACK |
| REFERENCE DENSITY PATCH C2 | 40 | CYAN |
| REFERENCE DENSITY PATCH M2 | 40 | MAGENTA |
| REFERENCE DENSITY PATCH Y2 | 40 | YELLOW |
| REFERENCE DENSITY PATCH K2 | 40 | BLACK |
| REFERENCE DENSITY PATCH C3 | 60 | CYAN |
| REFERENCE DENSITY PATCH M3 | 60 | MAGENTA |
| REFERENCE DENSITY PATCH Y3 | 60 | YELLOW |
| REFERENCE DENSITY PATCH K3 | 60 | BLACK |
| REFERENCE DENSITY PATCH C4 | 80 | CYAN |
| REFERENCE DENSITY PATCH M4 | 80 | MAGENTA |
| REFERENCE DENSITY PATCH Y4 | 80 | YELLOW |
| REFERENCE DENSITY PATCH K4 | 80 | BLACK |
| REFERENCE DENSITY PATCH C5 | 100 | CYAN |
| REFERENCE DENSITY PATCH M5 | 100 | MAGENTA |
| REFERENCE DENSITY PATCH Y5 | 100 | YELLOW |
| REFERENCE DENSITY PATCH K5 | 100 | BLACK |

FIG.13

| | SET DENSITY OF REFERENCE DENSITY PATCH C1~C5 (%) | CYAN MEASURED DENSITY |
|---|---|---|
| | | MEASURED DENSITY OF REFERENCE DENSITY PATCH C1~C5 |
| C1 | 20 | 0.15 |
| C2 | 40 | 0.25 |
| C3 | 60 | 0.40 |
| C4 | 80 | 0.62 |
| C5 | 100 | 1.00 |

CONTENT OF REFERENCE DENSITY PATCH COVERAGE MEMORY AREA 24b

| | SET DENSITY OF REFERENCE DENSITY PATCH C1~K5 (%) | TOTAL NUMBER OF DOTS | NUMBER OF ON DOTS | REFERENCE DENSITY PATCH COVERAGE (%) |
|---|---|---|---|---|
| C1, M1, Y1, K1 | 20 | 256 | 59 | 23% |
| C2, M2, Y2, K2 | 40 | 256 | 108 | 42% |
| C3, M3, Y3, K3 | 60 | 256 | 162 | 63% |
| C4, M4, Y4, K4 | 80 | 256 | 210 | 82% |
| C5, M5, Y5, K5 | 100 | 256 | 256 | 100% |

FIG.15

STANDARD MODE CYAN DITHER MATRIX

| 1 | 83 | 151 | 220 | 53 | 121 | 190 | 254 | 2 | 84 | 152 | 221 | 54 | 122 | 191 | 254 |
|---|---|---|---|---|---|---|---|---|---|---|---|---|---|---|---|
| 14 | 91 | 160 | 228 | 61 | 130 | 198 | 254 | 17 | 92 | 161 | 229 | 62 | 131 | 199 | 254 |
| 31 | 100 | 168 | 237 | 70 | 138 | 207 | 255 | 32 | 101 | 169 | 238 | 71 | 139 | 208 | 255 |
| 40 | 108 | 177 | 245 | 78 | 147 | 215 | 255 | 41 | 109 | 178 | 247 | 79 | 148 | 217 | 255 |
| 48 | 117 | 185 | 254 | 10 | 89 | 158 | 226 | 49 | 118 | 187 | 254 | 13 | 90 | 159 | 227 |
| 57 | 125 | 194 | 254 | 27 | 98 | 166 | 235 | 58 | 127 | 195 | 254 | 30 | 99 | 167 | 236 |
| 65 | 134 | 203 | 255 | 38 | 106 | 175 | 243 | 66 | 135 | 204 | 255 | 39 | 107 | 176 | 244 |
| 74 | 143 | 211 | 255 | 46 | 115 | 183 | 252 | 75 | 144 | 212 | 255 | 47 | 116 | 184 | 253 |
| 3 | 85 | 153 | 222 | 55 | 123 | 192 | 254 | 4 | 86 | 154 | 223 | 56 | 124 | 193 | 254 |
| 18 | 93 | 162 | 230 | 63 | 132 | 200 | 254 | 21 | 94 | 163 | 232 | 64 | 133 | 202 | 254 |
| 33 | 102 | 170 | 239 | 72 | 140 | 209 | 255 | 34 | 103 | 172 | 240 | 73 | 142 | 210 | 255 |
| 42 | 110 | 179 | 248 | 80 | 149 | 218 | 255 | 43 | 111 | 180 | 249 | 81 | 150 | 219 | 255 |
| 50 | 119 | 188 | 254 | 8 | 88 | 157 | 225 | 51 | 120 | 189 | 254 | 6 | 87 | 155 | 224 |
| 59 | 128 | 196 | 254 | 25 | 96 | 165 | 234 | 60 | 129 | 197 | 254 | 24 | 95 | 164 | 233 |
| 68 | 136 | 205 | 255 | 36 | 105 | 174 | 242 | 69 | 137 | 206 | 255 | 35 | 104 | 173 | 241 |
| 76 | 145 | 213 | 255 | 45 | 114 | 182 | 251 | 77 | 146 | 214 | 255 | 44 | 113 | 181 | 250 |
| 2 | 84 | 152 | 221 | 54 | 122 | 191 | 254 | 1 | 83 | 151 | 220 | 53 | 121 | 190 | 254 |
| 16 | 92 | 161 | 229 | 62 | 131 | 199 | 254 | 15 | 91 | 160 | 228 | 61 | 130 | 198 | 254 |
| 32 | 101 | 169 | 238 | 71 | 139 | 208 | 255 | 31 | 100 | 168 | 237 | 70 | 138 | 207 | 255 |
| 41 | 109 | 178 | 247 | 79 | 148 | 217 | 255 | 40 | 108 | 177 | 245 | 78 | 147 | 215 | 255 |
| 49 | 118 | 187 | 254 | 12 | 90 | 159 | 227 | 48 | 117 | 185 | 254 | 11 | 89 | 158 | 226 |
| 58 | 127 | 195 | 254 | 29 | 99 | 167 | 236 | 57 | 125 | 194 | 254 | 28 | 98 | 166 | 235 |
| 66 | 135 | 204 | 255 | 39 | 107 | 176 | 244 | 65 | 134 | 203 | 255 | 38 | 106 | 175 | 243 |
| 75 | 144 | 212 | 255 | 47 | 116 | 184 | 253 | 74 | 143 | 211 | 255 | 46 | 115 | 183 | 252 |
| 4 | 86 | 154 | 223 | 56 | 124 | 193 | 254 | 3 | 85 | 153 | 222 | 55 | 123 | 192 | 254 |
| 20 | 94 | 163 | 232 | 64 | 133 | 202 | 254 | 19 | 93 | 162 | 230 | 63 | 132 | 200 | 254 |
| 34 | 103 | 172 | 240 | 73 | 142 | 210 | 255 | 33 | 102 | 170 | 239 | 72 | 140 | 209 | 255 |
| 43 | 111 | 180 | 249 | 81 | 150 | 219 | 255 | 42 | 110 | 179 | 248 | 80 | 149 | 218 | 255 |
| 51 | 120 | 189 | 254 | 5 | 87 | 155 | 224 | 50 | 119 | 188 | 254 | 9 | 88 | 157 | 225 |
| 60 | 129 | 197 | 254 | 23 | 95 | 164 | 233 | 59 | 128 | 196 | 254 | 26 | 96 | 165 | 234 |
| 69 | 137 | 206 | 255 | 35 | 104 | 173 | 241 | 68 | 136 | 205 | 255 | 36 | 105 | 174 | 242 |
| 77 | 146 | 214 | 255 | 44 | 113 | 181 | 250 | 76 | 145 | 213 | 255 | 45 | 114 | 182 | 251 |

FIG. 16

HIGH-QUALITY MODE CYAN DITHER MATRIX

| 141 | 201 | 171 | 117 | 72 | 87 | 139 | 199 | 169 | 115 | 70 | 85 | 140 | 200 | 170 | 118 | 73 | 88 | 138 | 198 | 168 | 116 | 71 | 86 |
|---|---|---|---|---|---|---|---|---|---|---|---|---|---|---|---|---|---|---|---|---|---|---|---|
| 216 | 246 | 231 | 27 | 12 | 57 | 214 | 244 | 229 | 25 | 10 | 55 | 215 | 245 | 230 | 28 | 13 | 58 | 213 | 243 | 228 | 26 | 11 | 56 |
| 186 | 231 | 156 | 102 | 42 | 132 | 184 | 229 | 154 | 100 | 40 | 130 | 185 | 230 | 155 | 103 | 43 | 133 | 183 | 228 | 153 | 101 | 41 | 131 |
| 106 | 61 | 76 | 147 | 207 | 177 | 112 | 67 | 82 | 145 | 205 | 175 | 107 | 62 | 77 | 148 | 208 | 178 | 113 | 68 | 83 | 146 | 206 | 176 |
| 16 | 1 | 46 | 222 | 252 | 252 | 22 | 7 | 52 | 220 | 250 | 250 | 17 | 2 | 47 | 223 | 253 | 253 | 23 | 8 | 53 | 221 | 251 | 251 |
| 91 | 31 | 121 | 192 | 237 | 162 | 97 | 37 | 127 | 190 | 235 | 160 | 92 | 32 | 122 | 193 | 238 | 163 | 98 | 38 | 128 | 191 | 236 | 161 |
| 136 | 196 | 166 | 113 | 68 | 83 | 142 | 202 | 172 | 119 | 74 | 89 | 137 | 197 | 167 | 114 | 69 | 84 | 143 | 203 | 173 | 120 | 75 | 90 |
| 211 | 241 | 241 | 23 | 8 | 53 | 217 | 247 | 247 | 29 | 14 | 59 | 212 | 242 | 242 | 24 | 9 | 54 | 218 | 248 | 248 | 30 | 15 | 60 |
| 181 | 226 | 151 | 98 | 38 | 128 | 187 | 232 | 157 | 104 | 44 | 134 | 182 | 227 | 152 | 99 | 39 | 129 | 188 | 233 | 158 | 105 | 45 | 135 |
| 110 | 65 | 80 | 143 | 203 | 173 | 108 | 63 | 78 | 149 | 209 | 179 | 111 | 66 | 81 | 144 | 204 | 174 | 109 | 64 | 79 | 150 | 210 | 180 |
| 20 | 5 | 50 | 218 | 248 | 248 | 18 | 3 | 48 | 224 | 254 | 254 | 21 | 6 | 51 | 219 | 249 | 249 | 19 | 4 | 49 | 225 | 255 | 255 |
| 95 | 35 | 125 | 188 | 233 | 158 | 93 | 33 | 123 | 194 | 239 | 164 | 96 | 36 | 126 | 189 | 234 | 159 | 94 | 34 | 124 | 195 | 240 | 165 |
| 140 | 200 | 170 | 118 | 73 | 88 | 138 | 198 | 168 | 116 | 71 | 86 | 141 | 201 | 171 | 117 | 72 | 87 | 139 | 199 | 169 | 115 | 70 | 85 |
| 215 | 245 | 245 | 28 | 13 | 58 | 213 | 243 | 243 | 26 | 11 | 56 | 216 | 246 | 246 | 27 | 12 | 57 | 214 | 244 | 244 | 25 | 10 | 55 |
| 185 | 230 | 155 | 103 | 43 | 133 | 183 | 228 | 153 | 101 | 41 | 131 | 186 | 231 | 156 | 102 | 42 | 132 | 184 | 229 | 154 | 100 | 40 | 130 |
| 107 | 62 | 77 | 148 | 208 | 178 | 113 | 68 | 83 | 146 | 206 | 176 | 106 | 61 | 76 | 147 | 207 | 177 | 112 | 67 | 82 | 145 | 205 | 175 |
| 17 | 2 | 47 | 223 | 253 | 253 | 23 | 8 | 53 | 221 | 251 | 251 | 16 | 1 | 46 | 222 | 252 | 252 | 22 | 7 | 52 | 220 | 250 | 250 |
| 92 | 32 | 122 | 193 | 238 | 163 | 98 | 38 | 128 | 191 | 236 | 161 | 91 | 31 | 121 | 192 | 237 | 162 | 97 | 37 | 127 | 190 | 235 | 160 |
| 137 | 197 | 167 | 114 | 69 | 84 | 143 | 203 | 173 | 120 | 75 | 90 | 136 | 196 | 166 | 113 | 68 | 83 | 142 | 202 | 172 | 119 | 74 | 89 |
| 212 | 242 | 242 | 24 | 9 | 54 | 218 | 248 | 248 | 30 | 15 | 60 | 211 | 241 | 241 | 23 | 8 | 53 | 217 | 247 | 247 | 29 | 14 | 59 |
| 182 | 227 | 152 | 99 | 39 | 129 | 188 | 233 | 158 | 105 | 45 | 135 | 181 | 226 | 151 | 98 | 38 | 128 | 187 | 232 | 157 | 104 | 44 | 134 |
| 111 | 66 | 81 | 144 | 204 | 174 | 109 | 64 | 79 | 150 | 210 | 180 | 110 | 65 | 80 | 143 | 203 | 173 | 108 | 63 | 78 | 149 | 209 | 179 |
| 21 | 6 | 51 | 219 | 249 | 249 | 19 | 4 | 49 | 225 | 255 | 255 | 20 | 5 | 50 | 218 | 248 | 248 | 18 | 3 | 48 | 224 | 254 | 254 |
| 96 | 36 | 126 | 189 | 234 | 159 | 94 | 34 | 124 | 195 | 240 | 165 | 95 | 35 | 125 | 188 | 233 | 158 | 93 | 33 | 123 | 194 | 239 | 164 |

FIG.17

CONTENT OF STANDARD MODE CYAN CORRESPONDING
DENSITY DATA MEMORY AREA 25a1

| STANDARD MODE CYAN DENSITY DATA ||
|---|---|
| SET DENSITY OF REFERENCE DENSITY PATCH C1~C5 (%) | SET DENSITY OF STANDARD MODE CYAN DENSITY DATA (%) |
| C1 — 20 | 27 (27.0) |
| C2 — 40 | 48 (48.0) |
| C3 — 60 | 70 (70.0) |
| C4 — 80 | 91 (91.0) |
| C5 — 100 | 100 (100.0) |

FIG.18

CONTENT OF STANDARD MODE CYAN CORRESPONDING
MEASURED DENSITY DATA MEMORY AREA 25c1

| STANDARD MODE CYAN CORRESPONDING MEASURED DENSITY DATA ||
|---|---|
| SET DENSITY OF STANDARD MODE CYAN DENSITY DATA (%) | MEASURED DENSITY OF REFERENCE DENSITY PATCH C1~C5 |
| 27 (27.0) | 0.15 — C1 |
| 48 (48.0) | 0.25 — C2 |
| 70 (70.0) | 0.40 — C3 |
| 91 (91.0) | 0.62 — C4 |
| 100 (100.0) | 1.00 — C5 |

FIG.19(a)

CONTENT OF STANDARD MODE CYAN
INTERPOLATION DATA MEMORY AREA 25d1

| STANDARD MODE CYAN INTERPOLATION DATA ||
|---|---|
| INTERPOLATION DATA OF SET DENSITY IN STANDARD MODE CYAN (%) | INTERPOLATION DATA OF MEASURED DENSITY OF REFERENCE DENSITY PATCH C1~C5 |
| 0 | 0 |
| ⋮ | ⋮ |
| 27 | 0.15 |
| ⋮ | ⋮ |
| 48 | 0.25 |
| ⋮ | ⋮ |
| 70 | 0.40 |
| ⋮ | ⋮ |
| 91 | 0.62 |
| ⋮ | ⋮ |
| 100 | 1.00 |

FIG.19(b)

CONTENT OF STANDARD MODE CYAN TARGET DATA MEMORY AREA 25e1

| STANDARD MODE CYAN TARGET DATA ||
|---|---|
| SET DENSITY OF STANDARD MODE CYAN DENSITY DATA (%) | PRESET TARGET VALUES FOR MEASURED DENSITY |
| 0 | 0 |
| ⋮ | ⋮ |
| 27 | 0.27 |
| ⋮ | ⋮ |
| 48 | 0.48 |
| ⋮ | ⋮ |
| 70 | 0.70 |
| ⋮ | ⋮ |
| 91 | 0.91 |
| ⋮ | ⋮ |
| 100 | 1.00 |

FIG.19(d)

CONTENT OF STANDARD MODE CYAN
CALIBRATION TABLE MEMORY AREA 24d1

| STANDARD MODE CYAN CALIBRATION TABLE ||
|---|---|
| SET DENSITY OF STANDARD MODE CYAN DENSITY DATA (%) | CALIBRATED SET DENSITY OF STANDARD MODE CYAN DENSITY DATA (%) |
| 0 | 0 |
| ⋮ | ⋮ |
| 27 | 52 |
| ⋮ | ⋮ |
| 48 | 78 |
| ⋮ | ⋮ |
| 70 | 93 |
| ⋮ | ⋮ |
| 91 | 98 |
| ⋮ | ⋮ |
| 100 | 100 |

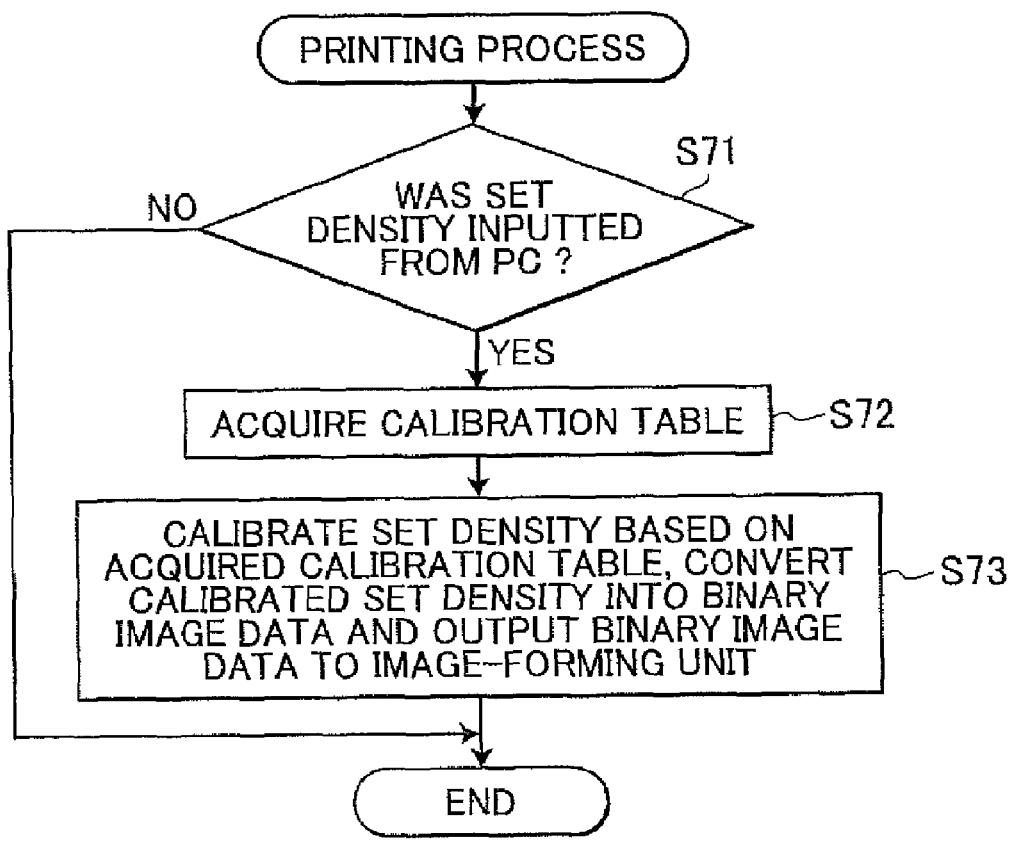

FIG.22

| | |
|---|---|
| 125 | RAM |
| 125a | CHARACTER STRING STORAGE MEMORY AREA |
| 25b | REFERENCE DENSITY PATCH MEASURED DENSITY MEMORY AREA |
| 25b1 | CYAN REFERENCE DENSITY PATCH MEASURED DENSITY MEMORY AREA |
| 25b2 | MAGENTA REFERENCE DENSITY PATCH MEASURED DENSITY MEMORY AREA |
| 25b3 | YELLOW REFERENCE DENSITY PATCH MEASURED DENSITY MEMORY AREA |
| 25b4 | BLACK REFERENCE DENSITY PATCH MEASURED DENSITY MEMORY AREA |
| 125c | DENSITY PATCH DATA MEMORY AREA |
| 125c1 | STANDARD MODE CYAN DENSITY PATCH DATA MEMORY AREA |
| 125c2 | STANDARD MODE MAGENTA DENSITY PATCH DATA MEMORY AREA |
| 125c3 | STANDARD MODE YELLOW DENSITY PATCH DATA MEMORY AREA |
| 125c4 | STANDARD MODE BLACK DENSITY PATCH DATA MEMORY AREA |
| 125c5 | HIGH-QUALITY MODE CYAN DENSITY PATCH DATA MEMORY AREA |
| 125c6 | HIGH-QUALITY MODE MAGENTA DENSITY PATCH DATA MEMORY AREA |
| 125c7 | HIGH-QUALITY MODE YELLOW DENSITY PATCH DATA MEMORY AREA |
| 125c8 | HIGH-QUALITY MODE BLACK DENSITY PATCH DATA MEMORY AREA |
| 125d | MEASURED DENSITY DATA MEMORY AREA |
| 125d1 | STANDARD MODE CYAN MEASURED DENSITY DATA MEMORY AREA |
| 125d2 | STANDARD MODE MAGENTA MEASURED DENSITY DATA MEMORY AREA |
| 125d3 | STANDARD MODE YELLOW MEASURED DENSITY DATA MEMORY AREA |
| 125d4 | STANDARD MODE BLACK MEASURED DENSITY DATA MEMORY AREA |
| 125d5 | HIGH-QUALITY MODE CYAN MEASURED DENSITY DATA MEMORY AREA |
| 125d6 | HIGH-QUALITY MODE MAGENTA MEASURED DENSITY DATA MEMORY AREA |
| 125d7 | HIGH-QUALITY MODE YELLOW MEASURED DENSITY DATA MEMORY AREA |
| 125d8 | HIGH-QUALITY MODE BLACK MEASURED DENSITY DATA MEMORY AREA |

FIG.23

| | |
|---|---|
| 1128 | HDD |
| 1128a | PRINTER DRIVER REGION AREA |
| 24c1 | STANDARD MODE CYAN DITHER MATRIX MEMORY AREA |
| 24c2 | STANDARD MODE MAGENTA DITHER MATRIX MEMORY AREA |
| 24c3 | STANDARD MODE YELLOW DITHER MATRIX MEMORY AREA |
| 24c4 | STANDARD MODE BLACK DITHER MATRIX MEMORY AREA |
| 24c5 | HIGH-QUALITY MODE CYAN DITHER MATRIX MEMORY AREA |
| 24c6 | HIGH-QUALITY MODE MAGENTA DITHER MATRIX MEMORY AREA |
| 24c7 | HIGH-QUALITY MODE YELLOW DITHER MATRIX MEMORY AREA |
| 24c8 | HIGH-QUALITY MODE BLACK DITHER MATRIX MEMORY AREA |
| 25a | CORRESPONDING DENSITY DATA MEMORY AREA |
| 25a1 | STANDARD MODE CYAN CORRESPONDING DENSITY DATA MEMORY AREA |
| 25a2 | STANDARD MODE MAGENTA CORRESPONDING DENSITY DATA MEMORY AREA |
| 25a3 | STANDARD MODE YELLOW CORRESPONDING DENSITY DATA MEMORY AREA |
| 25a4 | STANDARD MODE BLACK CORRESPONDING DENSITY DATA MEMORY AREA |
| 25a5 | HIGH-QUALITY MODE CYAN CORRESPONDING DENSITY DATA MEMORY AREA |
| 25a6 | HIGH-QUALITY MODE MAGENTA CORRESPONDING DENSITY DATA MEMORY AREA |
| 25a7 | HIGH-QUALITY MODE YELLOW CORRESPONDING DENSITY DATA MEMORY AREA |
| 25a8 | HIGH-QUALITY MODE BLACK CORRESPONDING DENSITY DATA MEMORY AREA |
| 24d | CALIBRATION TABLE MEMORY AREA |
| 24d1 | STANDARD MODE CYAN CALIBRATION TABLE MEMORY AREA |
| 24d2 | STANDARD MODE MAGENTA CALIBRATION TABLE MEMORY AREA |
| 24d3 | STANDARD MODE YELLOW CALIBRATION TABLE MEMORY AREA |
| 24d4 | STANDARD MODE BLACK CALIBRATION TABLE MEMORY AREA |
| 24d5 | HIGH-QUALITY MODE CYAN CALIBRATION TABLE MEMORY AREA |
| 24d6 | HIGH-QUALITY MODE MAGENTA CALIBRATION TABLE MEMORY AREA |
| 24d7 | HIGH-QUALITY MODE YELLOW CALIBRATION TABLE MEMORY AREA |
| 24d8 | HIGH-QUALITY MODE BLACK CALIBRATION TABLE MEMORY AREA |

FIG.24

| | |
|---|---|
| 1129 | RAM |
| 1129a | DENSITY PATCH DATA MEMORY AREA |
| 1129a1 | STANDARD MODE CYAN DENSITY PATCH DATA MEMORY AREA |
| 1129a2 | STANDARD MODE MAGENTA DENSITY PATCH DATA MEMORY AREA |
| 1129a3 | STANDARD MODE YELLOW DENSITY PATCH DATA MEMORY AREA |
| 1129a4 | STANDARD MODE BLACK DENSITY PATCH DATA MEMORY AREA |
| 1129a5 | HIGH-QUALITY MODE CYAN DENSITY PATCH DATA MEMORY AREA |
| 1129a6 | HIGH-QUALITY MODE MAGENTA DENSITY PATCH DATA MEMORY AREA |
| 1129a7 | HIGH-QUALITY MODE YELLOW DENSITY PATCH DATA MEMORY AREA |
| 1129a8 | HIGH-QUALITY MODE BLACK DENSITY PATCH DATA MEMORY AREA |
| 1129b | DITHER PATCH MEASURED DENSITY DATA MEMORY AREA |
| 1129b1 | STANDARD MODE CYAN DITHER PATCH MEASURED DENSITY DATA MEMORY AREA |
| 1129b2 | STANDARD MODE MAGENTA DITHER PATCH MEASURED DENSITY DATA MEMORY AREA |
| 1129b3 | STANDARD MODE YELLOW DITHER PATCH MEASURED DENSITY DATA MEMORY AREA |
| 1129b4 | STANDARD MODE BLACK DITHER PATCH MEASURED DENSITY DATA MEMORY AREA |
| 1129b5 | HIGH-QUALITY MODE CYAN DITHER PATCH MEASURED DENSITY DATA MEMORY AREA |
| 1129b6 | HIGH-QUALITY MODE MAGENTA DITHER PATCH MEASURED DENSITY DATA MEMORY AREA |
| 1129b7 | HIGH-QUALITY MODE YELLOW DITHER PATCH MEASURED DENSITY DATA MEMORY AREA |
| 1129b8 | HIGH-QUALITY MODE BLACK DITHER PATCH MEASURED DENSITY DATA MEMORY AREA |
| 1129c | REFERENCE DENSITY PATCH MEASURED DENSITY DATA MEMORY AREA |
| 1129c1 | REFERENCE DENSITY PATCH CYAN MEASURED DENSITY DATA MEMORY AREA |
| 1129c2 | REFERENCE DENSITY PATCH MAGENTA MEASURED DENSITY DATA MEMORY AREA |
| 1129c3 | REFERENCE DENSITY PATCH YELLOW MEASURED DENSITY DATA MEMORY AREA |
| 1129c4 | REFERENCE DENSITY PATCH BLACK MEASURED DENSITY DATA MEMORY AREA |
| 1129d | INTERPOLATION DENSITY DATA MEMORY AREA |
| 1129d1 | STANDARD MODE CYAN INTERPOLATION DENSITY DATA MEMORY AREA |
| 1129d2 | STANDARD MODE MAGENTA INTERPOLATION DENSITY DATA MEMORY AREA |
| 1129d3 | STANDARD MODE YELLOW INTERPOLATION DENSITY DATA MEMORY AREA |
| 1129d4 | STANDARD MODE BLACK INTERPOLATION DENSITY DATA MEMORY AREA |
| 1129d5 | HIGH-QUALITY MODE CYAN INTERPOLATION DENSITY DATA MEMORY AREA |
| 1129d6 | HIGH-QUALITY MODE MAGENTA INTERPOLATION DENSITY DATA MEMORY AREA |
| 1129d7 | HIGH-QUALITY MODE YELLOW INTERPOLATION DENSITY DATA MEMORY AREA |
| 1129d8 | HIGH-QUALITY MODE BLACK INTERPOLATION DENSITY DATA MEMORY AREA |
| 25c | CORRESPONDING MEASURED DATA MEMORY AREA |
| 25c1 | STANDARD MODE CYAN CORRESPONDING MEASURED DATA MEMORY AREA |
| 25c2 | STANDARD MODE MAGENTA CORRESPONDING MEASURED DATA MEMORY AREA |
| 25c3 | STANDARD MODE YELLOW CORRESPONDING MEASURED DATA MEMORY AREA |
| 25c4 | STANDARD MODE BLACK CORRESPONDING MEASURED DATA MEMORY AREA |
| 25c5 | HIGH-QUALITY MODE CYAN CORRESPONDING MEASURED DATA MEMORY AREA |
| 25c6 | HIGH-QUALITY MODE MAGENTA CORRESPONDING MEASURED DATA MEMORY AREA |
| 25c7 | HIGH-QUALITY MODE YELLOW CORRESPONDING MEASURED DATA MEMORY AREA |
| 25c8 | HIGH-QUALITY MODE BLACK CORRESPONDING MEASURED DATA MEMORY AREA |
| 25d | INTERPOLATION DATA MEMORY AREA |
| 25d1 | STANDARD MODE CYAN INTERPOLATION DATA MEMORY AREA |
| 25d2 | STANDARD MODE MAGENTA INTERPOLATION DATA MEMORY AREA |
| 25d3 | STANDARD MODE YELLOW INTERPOLATION DATA MEMORY AREA |
| 25d4 | STANDARD MODE BLACK INTERPOLATION DATA MEMORY AREA |
| 25d5 | HIGH-QUALITY MODE CYAN INTERPOLATION DATA MEMORY AREA |
| 25d6 | HIGH-QUALITY MODE MAGENTA INTERPOLATION DATA MEMORY AREA |
| 25d7 | HIGH-QUALITY MODE YELLOW INTERPOLATION DATA MEMORY AREA |
| 25d8 | HIGH-QUALITY MODE BLACK INTERPOLATION DATA MEMORY AREA |
| 25e | TARGET DATA MEMORY AREA |
| 25e1 | STANDARD MODE CYAN TARGET DATA MEMORY AREA |
| 25e2 | STANDARD MODE MAGENTA TARGET DATA MEMORY AREA |
| 25e3 | STANDARD MODE YELLOW TARGET DATA MEMORY AREA |
| 25e4 | STANDARD MODE BLACK TARGET DATA MEMORY AREA |
| 25e5 | HIGH-QUALITY MODE CYAN TARGET DATA MEMORY AREA |
| 25e6 | HIGH-QUALITY MODE MAGENTA TARGET DATA MEMORY AREA |
| 25e7 | HIGH-QUALITY MODE YELLOW TARGET DATA MEMORY AREA |
| 25e8 | HIGH-QUALITY MODE BLACK TARGET DATA MEMORY AREA |

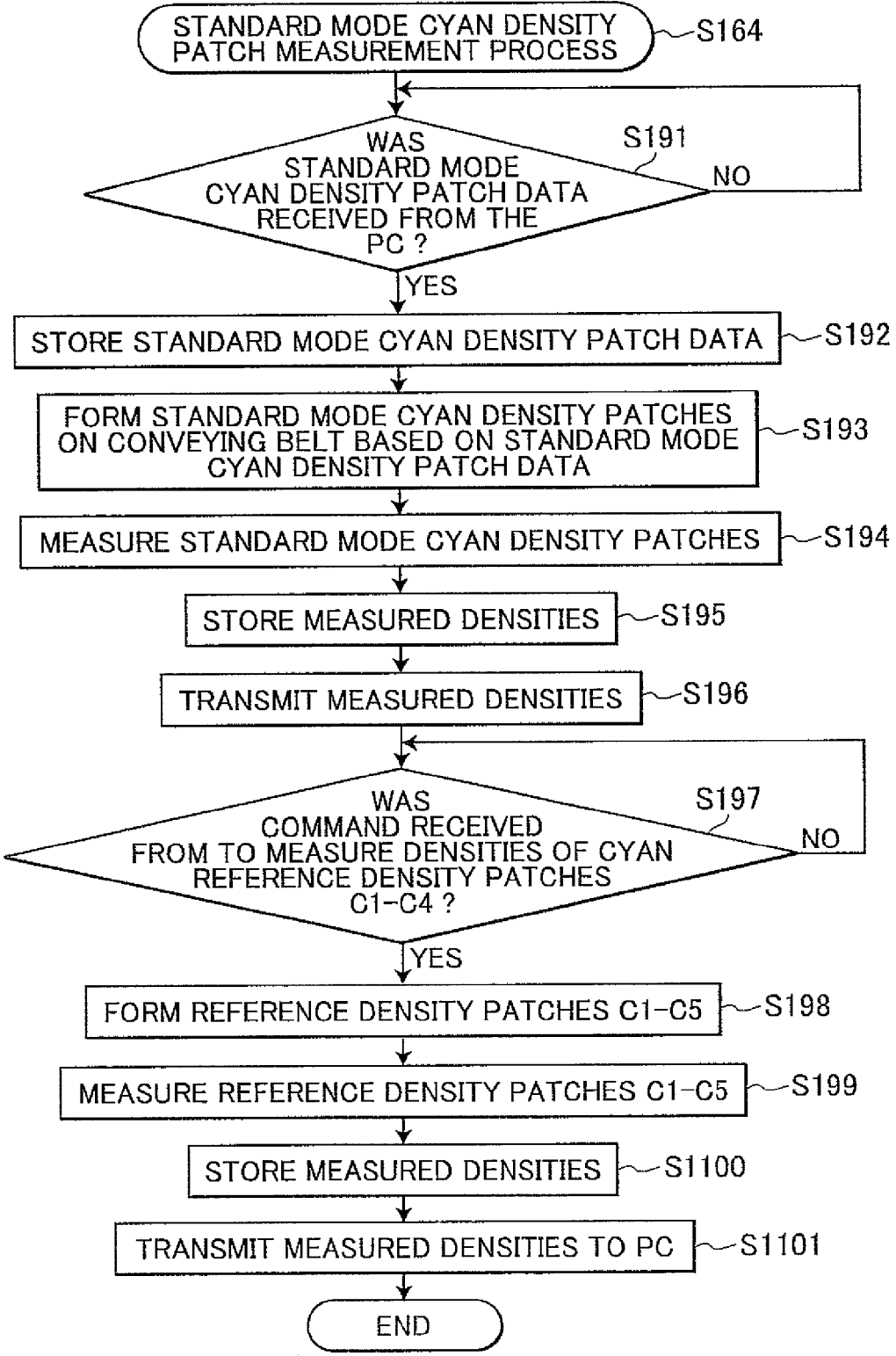

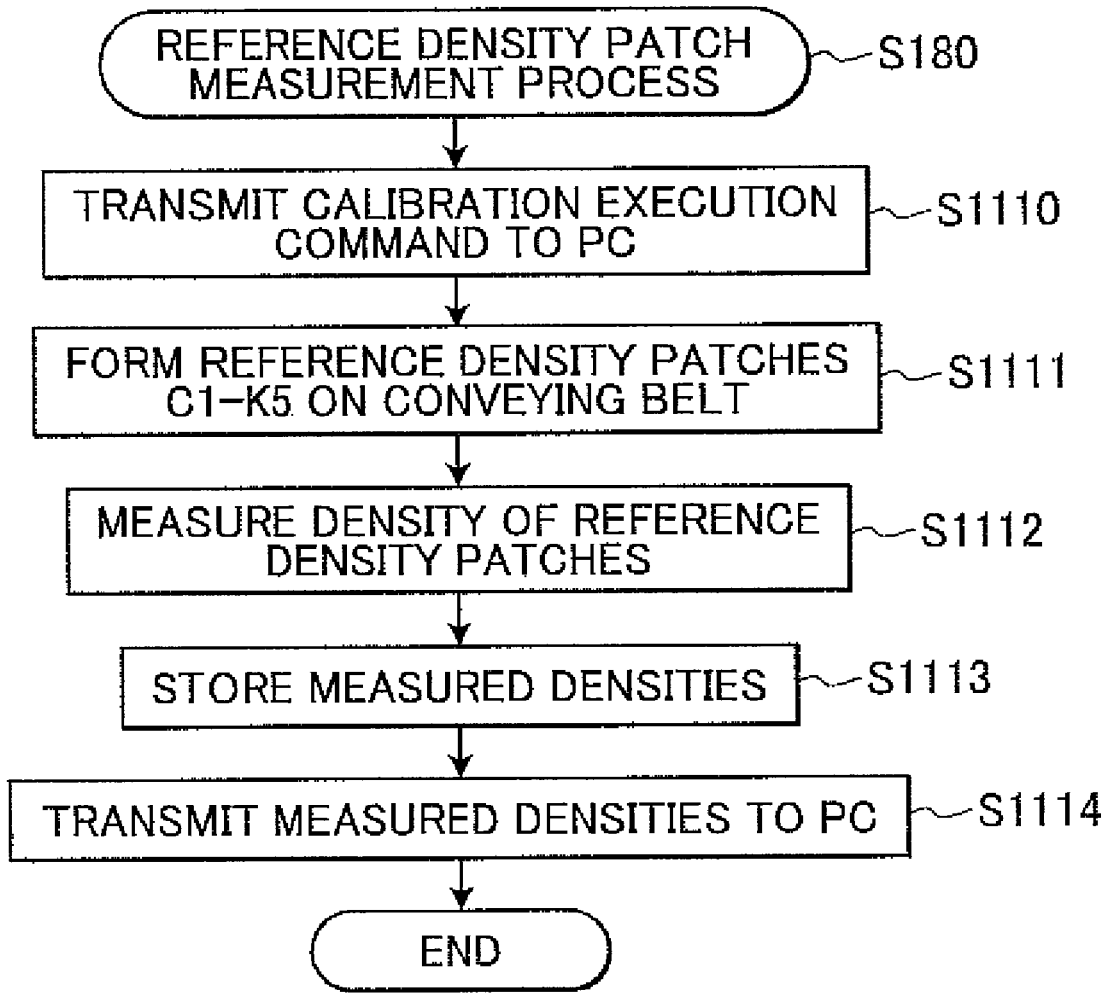

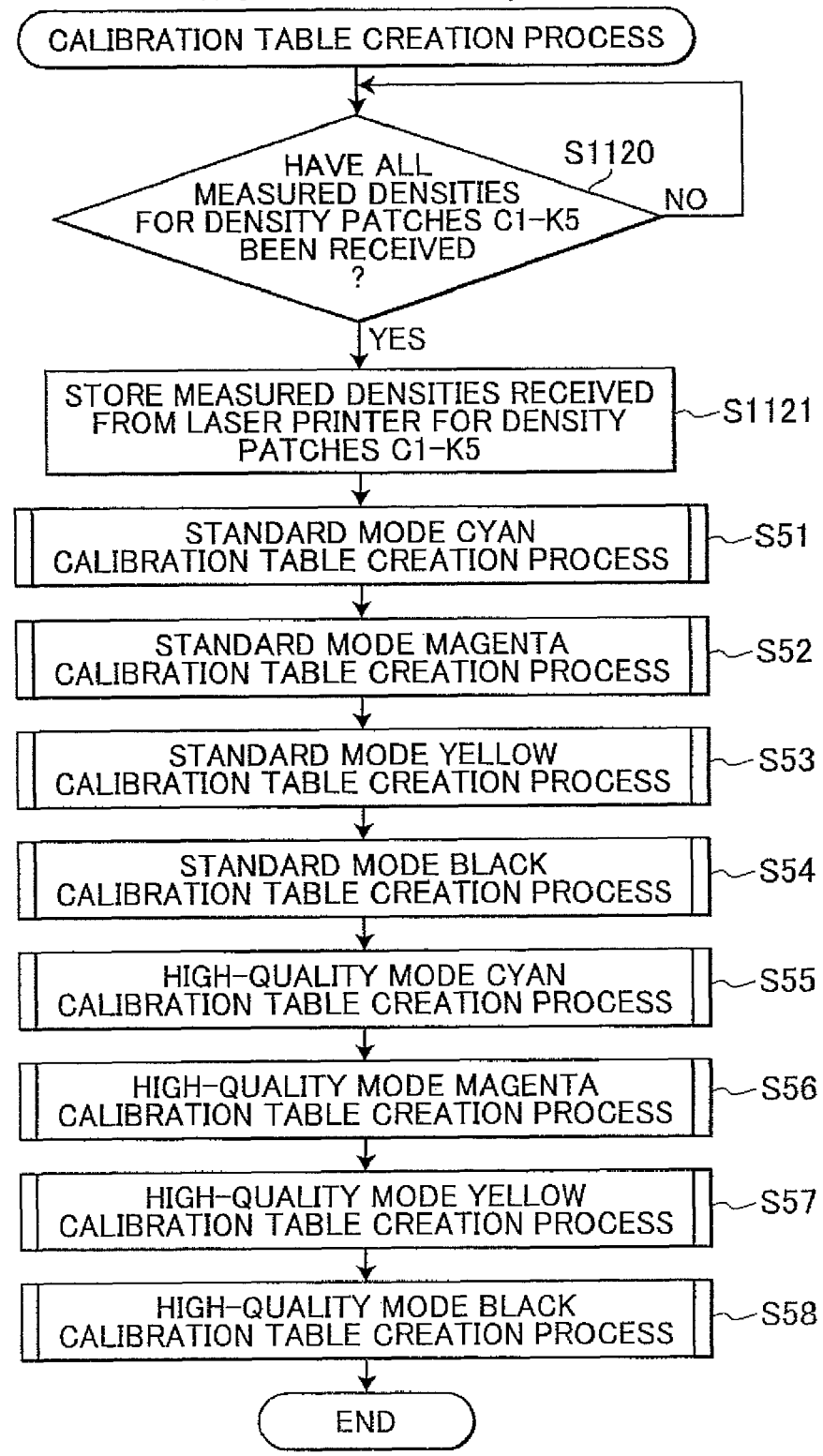

FIG.34

(PROCESS EXECUTED BY CPU 1126 OF PC 1125)

PC-SIDE CALIBRATION PROCESS

↓

ACQUIRE CALIBRATION TABLE CORRESPONDING TO SET DENSITY — S1140

↓

CALIBRATE SET DENSITY USING CALIBRATION, CONVERT CALIBRATED SET DENSITY INTO BINARY IMAGE DATA, AND OUTPUT BINARY IMAGE DATA — S1141

↓

END

FIG.35

CONTENT OF STANDARD MODE CYAN
MEASURED DENSITY DATA MEMORY AREA 1129b1

| STANDARD MODE CYAN MEASURED DENSITY DATA ||
| SET DENSITY OF STANDARD MODE CYAN DENSITY PATCH (%) | MEASURED DENSITY OF STANDARD MODE CYAN DENSITY PATCH |
| --- | --- |
| 20 | 0.12 |
| 40 | 0.21 |
| 60 | 0.34 |
| 80 | 0.54 |
| 100 | 1.00 |

FIG.36

CONTENT OF STANDARD MODE CYAN
INTERPOLATION DENSITY DATA MEMORY AREA 1129d1

| STANDARD MODE CYAN INTERPOLATION DENSITY DATA ||
|---|---|
| INTERPOLATED SET DENSITY OF STANDARD MODE CYAN DENSITY PATCH (%) | INTERPOLATED MEASURED DENSITY OF STANDARD MODE CYAN DENSITY PATCH |
| 0.0 | 0.0 |
| ⋮ | ⋮ |
| 26.9 | 0.1494 |
| 27.0 | 0.1501 |
| ⋮ | ⋮ |
| 47.9 | 0.2496 |
| 48.0 | 0.2508 |
| ⋮ | ⋮ |
| 69.9 | 0.3993 |
| 70.0 | 0.4002 |
| ⋮ | ⋮ |
| 90.9 | 0.6198 |
| 91.0 | 0.6207 |
| ⋮ | ⋮ |
| 100.0 | 1.0000 |

CALIBRATION DATA CREATING DEVICE

CROSS REFERENCE TO RELATED APPLICATION

This application claims priority from Japanese Patent Applications No. 2007-029770 filed Feb. 8, 2007 and No. 2007-094641 filed Mar. 30, 2007. The entire content of each of these priority applications is incorporated herein by reference.

TECHNICAL FIELD

The present invention relates to a calibration data creating device, an image-forming device, a system, a method for creating calibration data, and a computer read able recording medium storing a set of program.

BACKGROUND

Image processing devices for calibrating image density are well known in the art. One such image processing device disclosed in Japanese unexamined patent application publication No. 2004-114343 performs operations to measure the densities of samples having known densities, and performs calibration to correct changes in image density properties over time and lot variations based on the results of the density measurements in order to prevent errors in density measurements caused by changes over time and the like.

When printing a test image for calibration based on set printing conditions and acquiring calibration data based on the test image, the conventional image-processing device records the acquired calibration data together with printing conditions for the test image in correlated data. When subsequently printing an image, the image-processing device prompts the operator to set printing conditions and select the calibration data for printing the image. If the operator-specified printing conditions do not match the printing conditions corresponding to the operator-selected calibration data, the image processing device issues a warning to the operator, thereby notifying the operator of this inconsistency. Accordingly, the image-processing device can prevent the operator from unknowingly printing an image using inappropriate calibration data.

In the conventional image processing device described above, test images (hereinafter referred to as "density patches") are stored in association with printing conditions, such as the density, color, resolution, and the like of the image because dither data used for forming images during printing (data having a prescribed threshold set for each dot used to form the image) differs when printing conditions differ. Accordingly, image densities are calibrated by varying density patches for each printing condition and measuring the densities of the varied density patches. As a consequence, there may be five densities for density patches, four colors for images, and three image resolutions, for example, requiring sixty types (5×4×3) of density patches. As the number of printing conditions increases, the number of density patches used in calibration increases correspondingly, increasing the required capacity for a storage device used to store the density patches.

Further, an increase in the number of density patches used for calibration increases the time required for forming the density patches and measuring the density patches, Hence, the conventional method increases the time required for calibration.

SUMMARY

In view of the foregoing, it is an object of the present invention to provide a calibration data creating device, an image-forming device, a system, a method for creating calibration data, and a computer readable recording medium storing a set of program capable of reducing the required capacity of the storage device used to store density patches for calibrating image density.

In order to attain the above and other objects, the invention provides a calibration data creating device including a reference measured density memory a target data, a dither data memory, a corresponding set density determining unit, a calibration data creating unit, a calibration data creating unit, and a calibration data memory. The reference measured density memory stores, as reference measured densities, measured densities of reference density patches that are formed by an image-forming unit based on a reference density patch data for a plurality of reference set densities, the reference density patch data being binarized image data. The target density memory stores target densities in association with a plurality of set densities. The dither data memory stores dither data that has a plurality of dot locations and that is used for creating binarized image data based on each set density, the dither data having a prescribed threshold at each dot location. The corresponding set density determining unit determines corresponding set densities for the plurality of the reference set densities, the corresponding set density for each reference set density allowing the dither data to create binarized image data that enables the image-forming unit to form an image whose density corresponds to the measured density of the reference density patch that is formed by the image-forming unit based on the reference density patch data at the each reference set density. The calibration data creating unit creates calibration data indicating a correlation between the set densities and calibrated set densities, the calibrated set density for each set density allowing the dither data to create binarized image data that enables the image-forming unit to form an image whose density is the same as the target density for the each set density, the calibration data creating unit creating the calibration data based on the target densities, the reference measured densities, and the corresponding set densities. The calibration data memory stores the calibration data.

According to another aspect, the present invention provides a system including a calibration data creating device and an image-forming device that is capable of communicating with the calibration data creating device. The calibration data creating device includes a reference measured density memory, a target data, a dither data memory, a communication unit, a density patch data transmitting unit, a density patch measured density receiving unit, a reference density patch measured density receiving unit, a corresponding set density determining unit, a calibration data creating unit, a calibration data creating unit, and a calibration data memory. The reference measured density memory stores, as reference measured densities, measured densities of reference density patches that are formed by an image-forming unit based on a reference density patch data for a plurality of reference set densities, the reference density patch data being binarized image data. The target density memory stores target densities in association with a plurality of set densities. The dither data memory stores dither data that has a plurality of dot locations and that is used for creating binarized image data based on each set density, the dither data having a prescribed threshold at each dot location. The communication unit is capable of communicating with an image-forming device. The density patch data transmitting unit converts the dither data to density patch, data by using each set density and transmitting the converted density patch data via the communication unit to the image-forming device, the density patch data being binarized image data. The density patch measured density receiving unit receives via the communication unit from the image-forming device a measured density of a density patch, the density patch being formed by the image-forming unit in the image-forming device at each reference set density based on the density patch data transmitted from the density patch data transmitting unit, the measured density of the density patch being measured by the measuring unit. The reference density patch measured density receiving unit receives via the communication unit from the image-forming device the measured density of the reference density patch. The reference density patch is formed by the image-forming unit in the image-forming device at each reference set density based on the binarized reference density patch data for each reference set density The measured density of the reference density patch is measured by the measuring unit. The reference density patch measured density receiving unit stores the measured density of the reference patch data in the reference measured density memory. The corresponding set density determining unit determines, for each reference set density, the corresponding set density that allows the dither data to create binarized image data that enables the image-forming unit to form an image whose density is substantially equal to the measured density of the reference density patch at the each reference set density, the dither data set density determining unit determining the corresponding set density based on the measured density of the reference density patch at the each set density received by the reference density patch measured density receiving unit and the measured density of the density patch at the each reference set density received by the density patch measured density receiving unit. The calibration data creating unit creates calibration data indicating a correlation between the set densities and calibrated set densities, the calibrated set density for each set density allowing the dither data to create binarized image data that enables the image-forming unit to form an image whose density is the same as the target density for the each set density, the calibration data creating unit creating the calibration data based on the target densities, the reference measured densities, and the corresponding set densities. The calibration data memory stores the calibration data. The image-forming device includes the image-forming unit, the measuring unit, a density patch data receiving unit, a density patch measuring unit, a reference density patch measuring unit, and a measured density transmitting unit. The image-forming unit is configured to form images based on binarized image data. The measuring unit is configured to measure density of images formed by the image-forming unit. The density patch data receiving unit receives the density patch data at each reference set density transmitted from the dither data density patch data transmitting unit. The density patch measuring unit controls the image-forming unit to form a density patch at each reference set density based on the dither data density patch data. The density patch measuring unit controls the measuring unit to measure the density of the dither data density patch at each reference set density. The reference density patch measuring unit measures a density of the reference density patch formed by the image-forming unit based on the reference density patch data at each reference set density. The measured density transmitting unit transmits the measured density of the density patch and the measured density of the reference density patch to the calibration data creating device.

According to another aspect, the present invention provides the above-described image-forming device.

According to another aspect, the present invention provides a method for creating calibration data including: forming reference density patches for a plurality of reference set densities based on binarized reference density patch data by an image-forming unit, the reference density patch data being binarized image data; measuring densities of the reference density patches and storing the measured densities in a measured density memory; determining a corresponding set density for dither data that has a plurality of dot locations and that is used for creating binarized image data based on each set density, the dither data having a prescribed threshold at each dot location, the corresponding set density allowing the dither data to create binarized image data that enables the image-forming unit to form an image whose density corresponds to the measured density of the reference density patch that is formed by the image-forming unit based on the reference density patch data at the each reference set density; and creating calibration data that indicates a correlation between the set densities and calibrated set densities, the calibrated set density for each set density allowing the dither data to create binarized image data that enables the image-forming unit to form an image whose density is the same as a target density for the each set density, the calibration data being created based on the target density, measured density, and the corresponding set density for each reference set density.

According to another aspect, the present invention provides a method executed by a calibration data creating device and an image-forming device. The method includes converting dither data to density patch data by using each reference set density at the calibration data creating device, the dither data having a plurality of dot locations and that is used for creating binarized image data based on each set density, the dither data having a prescribed threshold at each dot location; transmitting the converted density patch data from the calibration data creating device to the image-forming device, the density patch data being binarized image data; forming a density patch at each reference set density based on the dither data density patch data, and measuring the density of the dither data density patch at each reference set density at the image-forming device; transmitting from the image-forming device to the calibration data creating device a measured density of a density patch for each reference set density, forming the reference density patch at each reference set density; measuring a density of the reference density patch for each set density at the image-forming device; transmitting the measured density of the reference density patch from the image-forming device to the calibration data creating device; determining at the calibration data creating device, for each reference set density, a corresponding set density that allows the dither data to create binarized image data that enables the image-forming unit to form an image whose density corresponding to the measured density of the reference density patch at the each reference set density; and creating calibration data based on the corresponding set densities and target densities at the calibration data creating device.

According to another aspect, the present invention provides a computer readable recording medium storing a set of program instructions executable on a calibration data creating device, instructions including forming reference density patch for a plurality of reference set densities based on binarized reference density patch data by an image-forming unit, the reference density patch data being binarized image data; measuring densities of the reference density patches and storing the measured densities in a measured density memory; determining a corresponding set density that allows dither data to create binarized image data that enables the image-forming unit to form an image whose density corresponds to the measured density of the reference density patch that is formed by the image-forming unit based on the reference density patch data at the each reference set density; and creating calibration data that indicates a correlation between the set densities and calibrated set densities, the calibrated set density for each set density allowing the dither data to create binarized image data that enables the image-forming unit to form an image whose density is the same as a target density for the each set density, the calibration data being created based on the target density, measured density, and the corresponding set density for each set density.

BRIEF DESCRIPTION OF THE DRAWINGS

The particular features and advantages of the invention as well as other objects will become apparent from the following description taken in connection with the accompanying drawings, in which:

In the drawings

FIG. 3 is an explanatory diagram showing the content of a flash memory in the printer;

FIG. 4 is an explanatory diagram showing the content of PAM in the printer;

FIG. 13 is a table showing the content of a cyan measured density memory;

FIG. 14 is a table showing the content of a reference density patch coverage memory area;

FIG. 15 is an explanatory diagram conceptually illustrating a standard mode cyan dither matrix stored in the standard mode cyan dither matrix memory area;

FIG. 16 is an explanatory diagram conceptually illustrating a high-quality mode cyan dither matrix stored in a high-quality mode cyan dither matrix memory area;

FIG. 17 is a table showing the content of a standard mode cyan corresponding density data memory area;

FIG. 18 is a table showing the content of a standard mode cyan corresponding measured data memory area;

FIG. 19(a) is a table showing the content of a standard mode cyan interpolation data memory area;

FIG. 19(b) is a table showing the content of a standard mode cyan target data memory area;

FIG. 19(d) is a table showing the content of a standard mode cyan calibration table memory area;

FIG. 20 is a flowchart illustrating steps in a printing process;

FIG. 22 is a table showing the content of printer RAN;

FIG. 23 is a table showing the content of a hard disk drive in the PC;

FIG. 24 is a table showing the content of the PC MM;

FIG. 31 is a flowchart illustrating steps in a standard mode cyan density patch measurement process executed by the CPU of the printer;

FIG. 32 is a flowchart illustrating steps in a reference density patch measurement process executed by the CPU of the printer;

FIG. 33 is a flowchart illustrating steps in a calibration table creation process executed by the CPU of the PC;

FIG. 34 is a flowchart illustrating steps in a PC side calibration process executed by the CPU of the PC;

FIG. 35 is a table showing the content of the standard mode cyan measured density data memory area; and FIG. 36 is a table showing the content of the standard mode cyan interpolation density data memory area.

DETAILED DESCRIPTION

Figure 1:
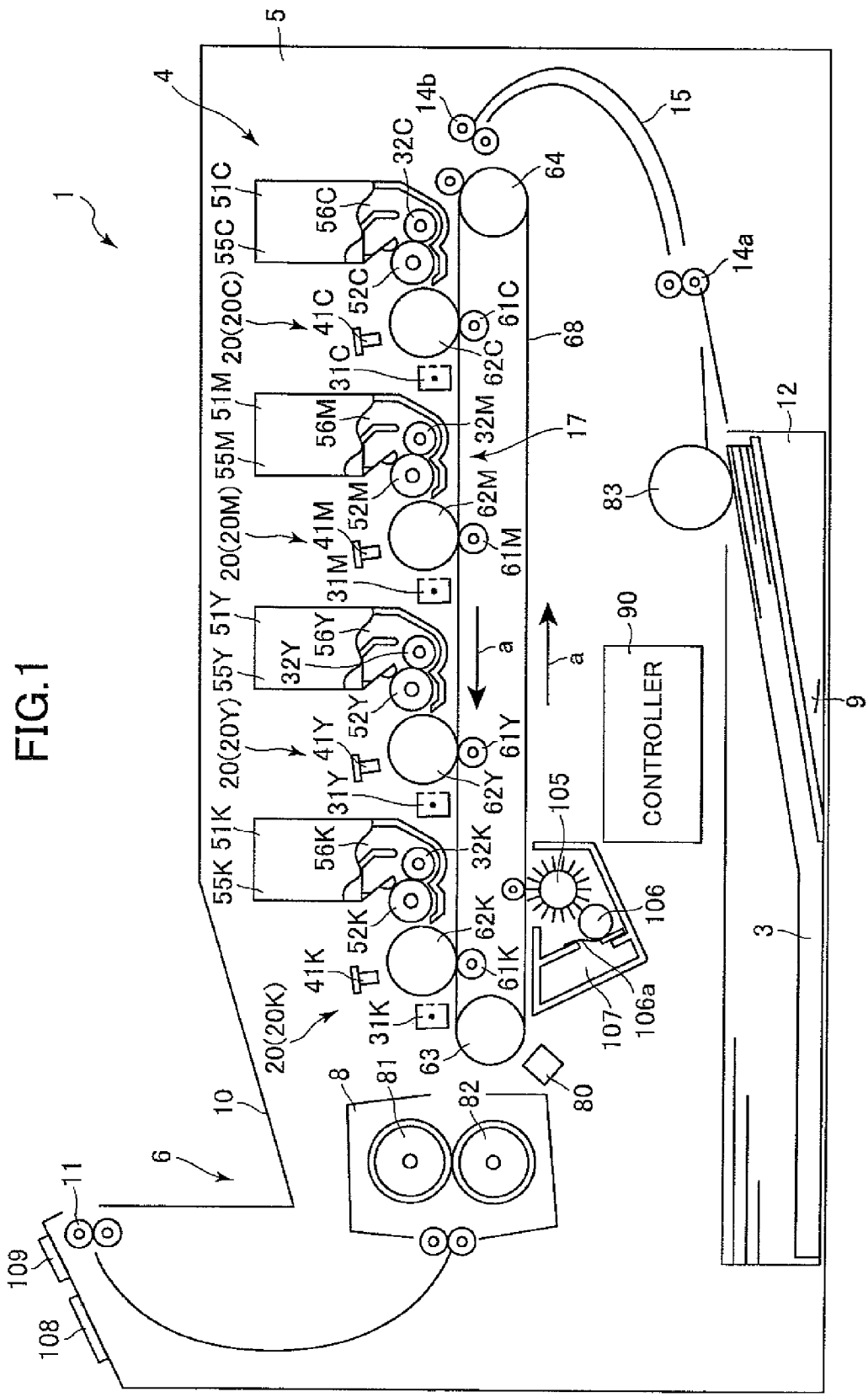
FIG. 1 is a cross-sectional view of a color laser printer according to a first embodiment.

FIG. 1 is a vertical sectional view showing an overall configuration of a color laser printer 1 as a first embodiment of the present invention. As shown in FIG. 1, the color laser printer 1 is of a transverse-mounting tandem type in which four image forming units 20 are provided in series in a horizontal direction. The laser printer 1 includes a paper feed section 9, an image forming section 4, a paper ejection section 6 and a control section 90. The paper feed section 9 feeds sheets of recording paper 3 one sheet at a time as recording medium to the image forming section 4. The image forming section 4 forms an image on the fed recording paper 3. The paper ejection section 6 ejects the recording paper 3 on which the image has been formed. The controller 90 controls the color laser printer 1.

The paper feed section 9 includes a paper feed tray 12, a paper feed roller 83 and conveying rollers 14a and 14b. The paper feed tray 12 is detachably mounted on the main casing 5 from the front side (right side in FIG. 1) in the bottom of the main casing 5. The paper feed roller 83 is provided at one end (at the front side) of the paper feed tray 12. The conveying rollers 14a and 14b are provided on the downstream side in the conveying direction of the recording paper 3 with respect to the paper feed roller 83 at the front side of the paper feed roller 83.

A plurality of sheets of the recording paper 3 is stacked in the paper feed tray 12. The uppermost sheet of the recording paper 3 is fed towards the conveying rollers 14a and 14b by rotations of the paper feed roller 83 and is conveyed sequentially between a conveying belt 68 and each of photosensitive drums 62 (62C, 62M, 62Y, and 062K).

In the middle portion of the main casing 5, the image forming section 4 includes four image forming units 20 (20Y; 20M, 20C, and 20K) for forming images, a transfer section 17, and a fixing section 8. The transfer section 17 transfers images formed by each of the image forming units 20 to the recording paper 3. The fixing section 8 fixes the images transferred to the recording paper 3 by heating and pressurizing the same. The above-described subscripts Y, M, C, and K represent the colors of Yellow (Y), Magenta (M), Cyan (C), and Black (K), respectively.

Four image-forming units 20 have the same configuration except for storing different colors of toners. Each image-forming unit 20 (20C, 20M, 20Y, or 201K) has a photosensitive drum 62 (62C, 62M, 62Y, or 62K), a charger 31 (31C, 31M, 31Y, or 31K), an exposure unit 41 (41C, 41M, 41Y, or 41K), and a developing unit 51 (51C, 51M, 51C, 51Y, or 51K). Each charger 31 (31C, 31M, 31Y, or 31K) is provided adjacent to the corresponding photosensitive drum 62 (62C, 62M, 62Y, or 62K) for charging the same. Each exposure unit 41 (41C, 41M, 41Y or 41K) forms an electrostatic latent image on the corresponding photosensitive drum 62 (62C, 62M, 62Y or 62K). The developing unit 51 (51Y, 51M, 51C, or 51K) forms a toner image by providing toner as a developing agent to the photosensitive drum 62 (62C, 62M, 62Y, or 62K), using a development bias applied between the photosensitive drum 62 (62C, 62M, 62Y, or 62K) and the developing unit 51 (51Y, 51M, 51C, or 51K).

Each charger 31 (31C, 31M, 31Y or 31K) is, for example, a Scorotron charger generating corona discharge from a discharging wire made of tungsten and evenly charging the surface of the photosensitive drum 62 (62C, 62M, 62Y or 62K) in a positive polarity. Each exposure unit 41 (41C, 41M, 41Y or 41K) includes an LED array emitting light for forming an electrostatic latent image on the surface of the photosensitive drum 62 (62C, 62M, 62Y or 62K). In this exposure unit 41 (41C, 41M, 41Y or 41K), light emitted from the LED array is irradiated on the photosensitive drum 62 (62C, 62N, 62Y or 62K), and an electrostatic latent image is formed on the surface of the photosensitive drum 62 (62C, 62M, 62Y or 62K). The exposure unit 41 (41C, 41M, 43Y or 41K) need not be an LED array, but may be an exposure unit that emits laser light.

Each developing unit 51 (51C, 51M, 51Y or 51N) has a developing casing 55 (55C, 55M, 55Y or 55K), in which provided are a hopper 56 (56C, 56M, 56Y or 56K), a supply roller 32 (32C, 32M, 32Y or 32K), and a developing roller 52 (52C, 52M, 52Y or 52K). Each hopper 56 (56C, 56M, 56Y or 56K) is formed as an inner space of the developing casing 55 (55C, 55M, 55Y or 55K). Toner of Cyan is contained in the hopper 56C in the image forming unit 20C. Toner of Magenta is contained in the hopper 56M of the image forming unit 20M. Toner of Yellow is contained in the hopper 56Y of the image forming unit 20Y. Toner of Black is contained in the hopper 56K of the image forming unit 20K.

Each supply roller 32 (32C, 32M, 32Y or 32K) is provided in the lower section of the hopper 56 (56C, 56M, 56Y or 56K) A roller portion made of a conductive sponge member is covered on a metallic roller shaft of the supply roller 32 (32C, 32M, 32Y or 32K). Each supply roller 32 (32C, 32M, 32Y or 32K) is rotatably supported so as to rotate in a direction to move opposite to the developing roller 52 (52C, 52M, 52Y or 52K) at a nip portion in contact with the developing roller 52 (52C, 52M, 52Y or 52K).

Each developing roller 52 (52C, 52M, 52Y or 52K) is rotatably provided at a position in contact with the supply roller 32 (32C, 32M, 32Y or 32K) A roller portion made of an elastic member such as a conductive rubber material is covered on a metallic roller shaft of the developing roller 52 (52C, 52M, 52Y or 52K) A developing bias voltage is applied from a power source (not shown) to the developing rollers 52C, 52M, 52Y and 52K.

The transfer section 17 is provided so as to be opposed to the photosensitive drums 62 (62C, 62M, 62Y or 62K) in the main casing 5 and has a conveying belt driving roller 63, a conveying belt follow roller 64, the conveying belt 68 which is an endless belt, and transfer rollers 61 (61C, 61M, 61Y or 61K).

The conveying belt driving roller 63 is provided on the downstream side of the photosensitive drums 62 (62C, 62M, 62Y and 62K) in the conveying direction of the recording paper 3 as well as on the upstream side of the fixing section 8. The conveying belt follow roller 64 is provided on the upstream side of the photosensitive drums 62 (62C, 62M, 62Y and 62K) with respect to the conveying direction of the recording paper 3 as well as at the upper front side of the paper feed roller 83. The conveying belt 68 is wound around between the conveying belt driving roller 63 and the conveying belt follow roller 64, with the outer surface thereof being in contact with all the photosensitive drums 62 of the image forming units 20. The conveying belt 68 is circularly moved in a counter-clockwise direction between the conveying belt driving roller 63 and the conveying belt follow roller 64 by being driven by the conveying belt driving roller 63.

Each transfer roller 61 (61C, 61M, 61Y or 61K) is provided inside the loop of the conveying belt 66 so as to be opposed to the corresponding photosensitive drum 62 (62C, 62M, 62Y or 62K) with interposing the conveying belt GB therebetween. In a transfer operation, a predetermined voltage is applied between the transfer roller 61 (61C, 61M, 61Y or 61K) and the photosensitive drum 62 (62C, 62M, 62Y or 62K) to transfer toner images from the photosensitive drum 62 (62C, 62M, 62Y or 62K) to the recording paper 3.

The fixing section 8 is provided on the downstream side of the image forming, units 20 and the transfer section 17, and has a heating roller 81 and a pressure roller 82. The heating roller 81 is made of a metallic pipe, on the surface of which a release layer is formed. A halogen lamp (not shown) is provided in the heating roller 81 along the axial direction thereof, and the surface of the heating roller 81 is heated to a fixing temperature by the halogen lamp. The pressure roller 82 is provided so as to pressurize the heating roller 81. Toner image on the recording paper 3 is fixed by heat, when conveying the recording paper 3 between the pressure roller 82 and heating roller 81.

The paper discharging section 6 is provided on the downstream side of the fixing section 8 in the upper portion of the main casing 5, and includes a pair of paper discharging rollers 11 and a paper discharging tray 10. The pair of paper discharging rollers 11 discharges the recording paper 3 on which an image has been fixed to the paper discharging tray 10. The paper discharging tray 10 is provided on the downstream side of the paper discharging rollers 11 for accumulating the sheets of the recording paper 3 having completed the image forming process.

A density sensor 90 is provided obliquely rearward below the conveying belt driving roller 63 so as to oppose the outer surface of the conveying belt 68. The density sensor 80 is configured to detect patches formed on the conveying belt 68.

A toner-collecting device 107 is provided obliquely forward below the conveying belt driving roller 63, A cleaning blush 105 is provided in the toner-collecting device 107, and is in contact with the outer surface of the conveying belt 68. The cleaning blush 105 is for electrically scraping off toner (patches and the like described above) adhered to the conveying belt 68. A toner-collecting roller 106 is further provided in the toner-collecting device 107 and is for collecting the toner scraped off by the cleaning blush 105. A blade 106a is further provided in the toner-collecting device 107 and scrapes off toner collected by the toner-collecting roller 106. The toner scraped off by the blade 106 is collected in the toner-collecting device 107.

Operation keys 108 and a display device 109 are provided on the main casing 5 at a location above the discharging rollers 11. The operation keys 108 enable a user to input a predetermined command to the color laser printer 1. The display device 109 displays a processing state of the color laser printer 1 and a message for a user.

Figure 2:
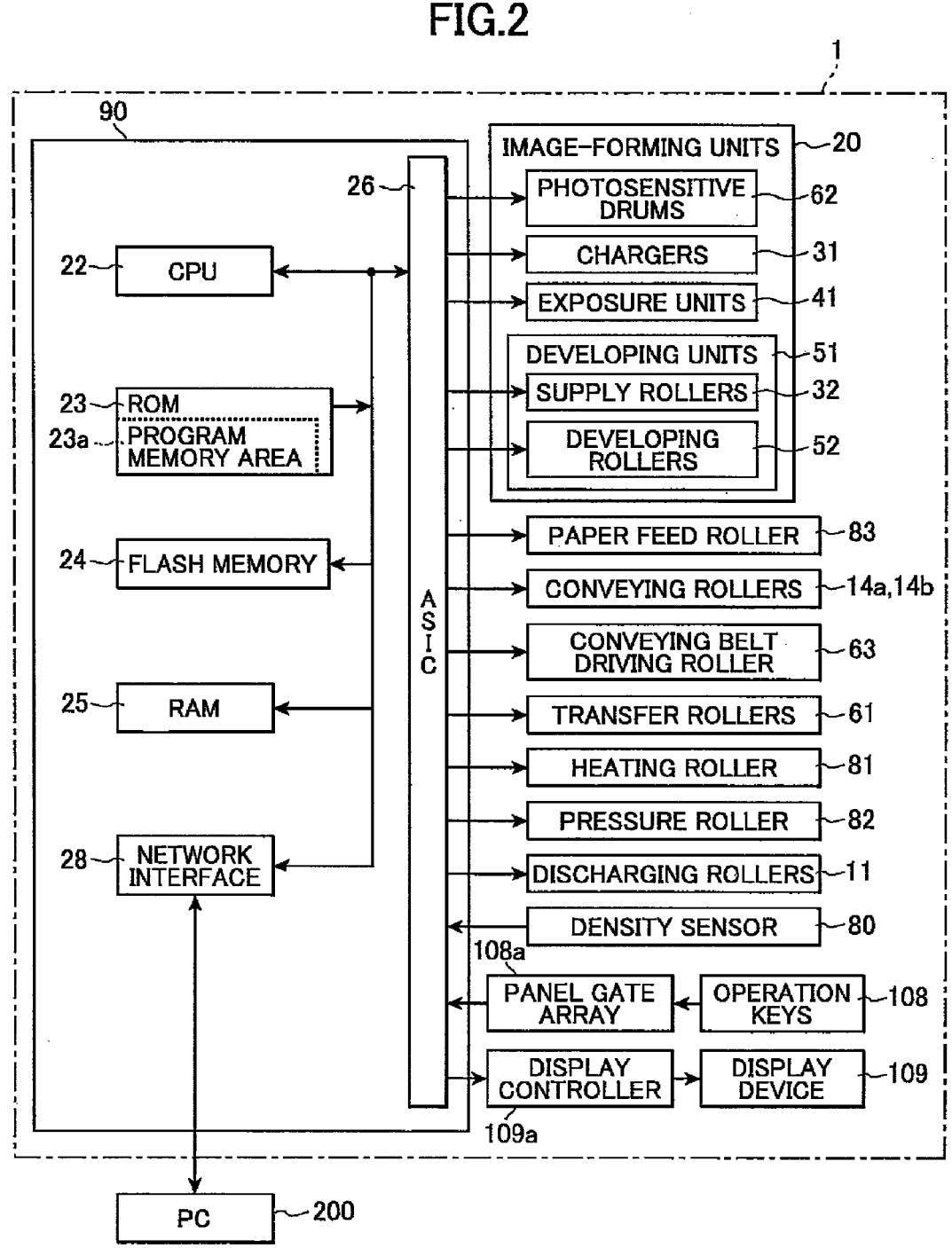
FIG. 2 is a block diagram showing the electrical structure of the color laser printer.

An electric configuration of the color laser printer 1 and a personal computer 200 (hereinafter, referred to as PC) providing image information (set densities) and dither matrices to the color laser printer 1 will be described with reference to FIG. 2. As shown in FIG. 2,the color laser printer 1 is provided with the controller 90 for controlling each component of the apparatus. An ASIC 26 which is part of the controller 90 is connected to the image forming units 20, the paper supply roller 83, the conveying rollers 14a and 14b, the conveying belt driving roller 63, the transfer rollers 61, the heating roller 81, the pressure roller 82, the paper discharging rollers 11, the density sensor 80, a panel gate array 108a, and a display controller 109a.

The controller 90 includes a CPU 22, a ROM 23, a flash memory 24, a RAM 25, the ASIC 26, and a network interface 28. The CPU 22, the ROM 23, the flash memory 24, the RAM 25, and the network interface 28 are connected to the ASIC 26 via a bus line. The CPU 22 is a microprocessor for executing various programs stored in the ROM 23. The ROM 23 is a read-only memory for storing programs executed by the CPU 22 and for storing constants and tables that the CPU 22 refers to when executing the programs. The ROM 23 includes a program memory 23a. The program memory area 23a stores a density calibration program shown in FIGS. 5 through 10 and a printing program shown in FIG. 20.

The flash memory 24 is a rewritable memory device storing various data that can be overwritten when the power is on and is capable of preserving the memory content when the power is off. The RAM 25 has a work area in which the CPU 22 temporarily stores variables and the like when executing programs. The flash memory 24 and RAM 25 will be described later.

The ASIC 26 is an integrated circuit that converts commands from the CPU 22 and outputs corresponding signals for driving components of the laser printer 1, and that converts signals outputted from the density sensor 80 and panel gate array 108a and outputs the converted signals to the CPU 22.

Each of the photosensitive drums 62 (62C, 62M, 62Y, or 62K), developing rollers 52, feed roller 83, conveying rollers 14a and 14b, conveying belt driving roller 63, heating roller 81, pressure roller 82, and ejection rollers 11 is connected to the ASIC 26, and includes a motor (not shown) for applying a rotational force thereto and a power source (not shown) for supplying power to the corresponding motor. The ASIC 26 outputs a control signal to rotate each motor, and the rotational force of the motor is drives the corresponding element to rotate.

Each of chargers 31 is connected to the ASIC 26 and charges the corresponding photosensitive drum 62 upon receiving a control signal from the ASIC 26.

Each of exposure units 41 is connected to the ASIC 26. The ASIC 26 outputs control signals to each exposure unit 41 to control irradiation of the light beam from the corresponding LED array and to control the irradiated position of the light beam.

The heating roller 81 heats the transmitted toner on the recording paper 3 based on a control signal outputted by the ASIC 26.

The density sensor 80 outputs data of measured densities (described later) to the ASIC 26, and the ASIC 26 stores data of the measured densities in the RAM 25.

The panel gate array 108a is connected to the operation keys 106 and controls the operation keys 108. Specifically, the panel gate array 108a detects when some operation key 105 is pressed (input) and outputs a prescribed code signal to the ASIC 26. A plurality of code signals is assigned to the plurality of operation keys 108. Upon receiving a prescribed code signal from the panel gate array 108a, the ASIC 26 issues an interrupt to the CPU 22. When an interrupt is issued, the CPU 22 performs a prescribed control process based on a key process table, The key process table includes control processes associated with code signals and is stored in the ROM 23, for example.

The display controller 109a controls the display of data related to operations of the laser printer 1 and the like on the display unit 109. The display controller 109a is connected to and the display unit 109.

The network interface 28 is an interface communicating by means of USE standard and is connected to the PC 200. The network interface 28 can convert image information input from the PC 200 and output the converted image information to the CPU 22.

The PC 200 inputs the image information or a set density for a dither matrix (described later) stored in the flash memory 24. The PC 200 is connected to and capable of communicating with the network interface 28. The densities of an image formed on the recording paper 3 are determined based on the set densities for dither matrices (described later) inputted from the PC 200.

Next, the content of the flash memory 24 will be described with reference to FIGS. 3 and 11(a), 14 through 16, and 19(d). As shown in FIG. 3, the flash memory 24 has a reference density patch data memory area 24a, a reference density patch coverage memory area 24b, a dither matrix memory area 24c, and a calibration table memory area 24d.

When forming an image on the recording paper 3, pixels of binary states (such as white and black) are formed from pixels configured of multiple values (RGB values, for example). For example, the color laser printer 1 forms images with dots in a formed state achieved by transferring toner to the recording paper and dots in an unformed state achieved by not transferring toner to the recording paper. A dither matrix stored in the dither matrix memory area 24c is used to produce intensity levels in the image using these two states.

In the embodiment, the color laser printer 1 can form images at a standard resolution in a standard mode or at a high resolution higher than the standard resolution in a high-quality mode. A standard dither matrix is used for the standard mode, and is configured of 32 (height)×16 (width) threshold values set for rows and columns of dots, for example. The threshold values are compared to set densities included in image data inputted from the PC 200. A pattern of 32 (height)×16 (width) dots is configured of: formed dots for which toner is transferred when the set density exceeds the threshold: and unformed dots for which toner are not transferred when the net density is smaller than the threshold. In this way, intensity levels of an image can be rendered with binary values. When printing a standard mode cyan image on the paper 3, for example, the CPU 22 uses the standard mode cyan dither matrix stored in the standard mode cyan dither matrix memory area 24c1 to convert multivalue image data indicated by the set density to binary image data, and forms a cyan image based on the binary image data using the image-forming unit 20C. When the set density is 20%, for example, the threshold value at each dot location in the dither matrix is compared with multivalue image data "51" (=255×20(%)/100 (%)). A dot in turned ON at dot locations whose threshold values are smaller than 51 and a dot in turned OFF at other remaining dot locations whose threshold values are greater than or equal to 51.

When the set density values between the minimum (0%) and the maximum (100%), the density of the formed image changes according to the set density. Increasing the set density increases the number of dots that are on and, hence, increases the density of the formed image. On the other hand, decreasing the set density reduces the number of dots that are on and, hence, reduces the density of the formed image. As will be described later, the PC 200 inputs the set density to the laser printer 1 in order to let the laser printer 1 form an image on the recording paper 3 (see FIG. 20). However, the set densities are inputted by the CPU 22 when the CPU 22 executes calibration for the laser printer 1 to create calibration tables (see FIG. 5). The PC 200 can overwrite each of the dither matrices stored in the dither matrix memory area 24c.

The dither matrix memory area 24c stores a plurality of different dither matrices for a plurality of combinations of resolutions and colors of images to be formed on the recording paper 3. However, it is possible to further provide additional dither matrices for test printing (draft printing) in which less toner is used to form images on the recording paper 3 than in normal printing. Further, when the speed at which an image is formed is changed among a plurality of levels based on the thickness of the recording paper 3, a plurality of different dither matrices may be provided for the respective speed levels.

In the embodiment, the dither matrix memory area 24c is configured of a standard mode cyan dither matrix memory area 24c1, standard mode magenta dither matrix memory area 24c2, standard mode yellow dither matrix memory area 24c3, standard mode black dither matrix memory area 24c4, high-quality mode cyan dither matrix memory area 24c5, high-quality mode magenta dither matrix memory area 24c6, high-quality mode yellow dither matrix memory area 24c7, and high-quality mode black dither matrix memory area 24c8.

The standard mode dither matrix areas 24c1, 24c2, 24c3, and 24c4 store dither matrices used when forming images on the recording paper 3 in the standard mode, where the standard mode is a recording mode set in the laser printer for printing with a standard resolution. Hence, when the color of the image to be formed on the recording paper 3 is cyan, the image-forming unit 20C forms an image in cyan using the standard mode cyan dither matrix stored in the standard mode cyan dither matrix memory area 24c1.

Similarly, when the color of the image to be formed on the recording paper 3 is magenta, the image-forming unit 20M forms an image in magenta using the standard mode magenta dither matrix stored in the standard mode magenta dither matrix memory area 24c2. When the color of the image to be formed on the recording paper 3 is yellow, the image-forming unit 20Y forms an image in yellow using the standard mode yellow dither matrix stored in the standard mode yellow dither matrix memory area 24c3. When the color of the image to be formed on the recording paper 3 is black, the image-forming unit 20K forms an image in black using the standard mode black dither matrix stored in the standard mode black dither matrix memory area 24c4.

FIG. 15 conceptually illustrates the standard mode cyan dither matrix stored in the standard mode cyan dither matrix memory area 24c1.

The standard mode cyan dither matrix is a 32 (height)×16 (width) matrix having a total of 512 dots. A threshold value is set for each dot.

The standard mode magenta dither matrix stored in the standard mode magenta dither matrix memory area 24c2, standard mode yellow dither matrix stored in the standard mode yellow dither matrix memory area 24c3, and standard mode black dither matrix stored in the standard mode black dither matrix memory area 24c4 have the same configuration as the standard mode cyan dither matrix except for the threshold value set for each dot.

The high-quality mode dither matrix memory areas 24c5, 24c6, 24c7, and 24c8 store dither matrices used when forming images on the recording paper 3 in the high-quality mode, where the high-quality mode is a recording mode having a higher resolution than the standard modes. The dither matrices used when forming images in the high-quality mode have a larger total number of dots than the dither matrices used for forming images in the standard mode.

When the color of the image to be formed on the recording paper 3 is cyan, the image-forming unit 20c forms a high-quality image in cyan using the high-quality mode cyan dither matrix stored in the high-quality mode cyan dither matrix memory area 24c5. Similarly, when the color of the image to be formed on the recording paper 3 is magenta, the image-forming unit 20M forms a high-quality image in magenta using the high-quality mode magenta dither matrix stored in the high-quality mode magenta dither matrix memory area 24c6. When the color of the image to be formed on the recording paper 3 is yellow, the image-forming unit 20Y forms a high-quality image in yellow using the high-quality mode yellow dither matrix stored in the high-quality mode yellow dither matrix memory area 24c7. When the color of the image to be formed on the recording paper 3 is black, the image-forming unit 20K forms a high-quality image in black using the high-quality mode black dither matrix stored in the high-quality mode black dither matrix memory area 24c8

FIG. 16 conceptually illustrates the high-quality mode cyan dither matrix stored in the high-quality mode cyan dither matrix memory area 24c5. The high-quality mode cyan dither matrix is a 24 (height)×24 (width) matrix having a total of 576 dots as shown in FIG. 16. Each high-quality mode dither matrix stored in the corresponding high-quality mode dither matrix area 24c6-24c8 has the same configuration as the high-quality mode cyan dither matrix.

Figure 11:
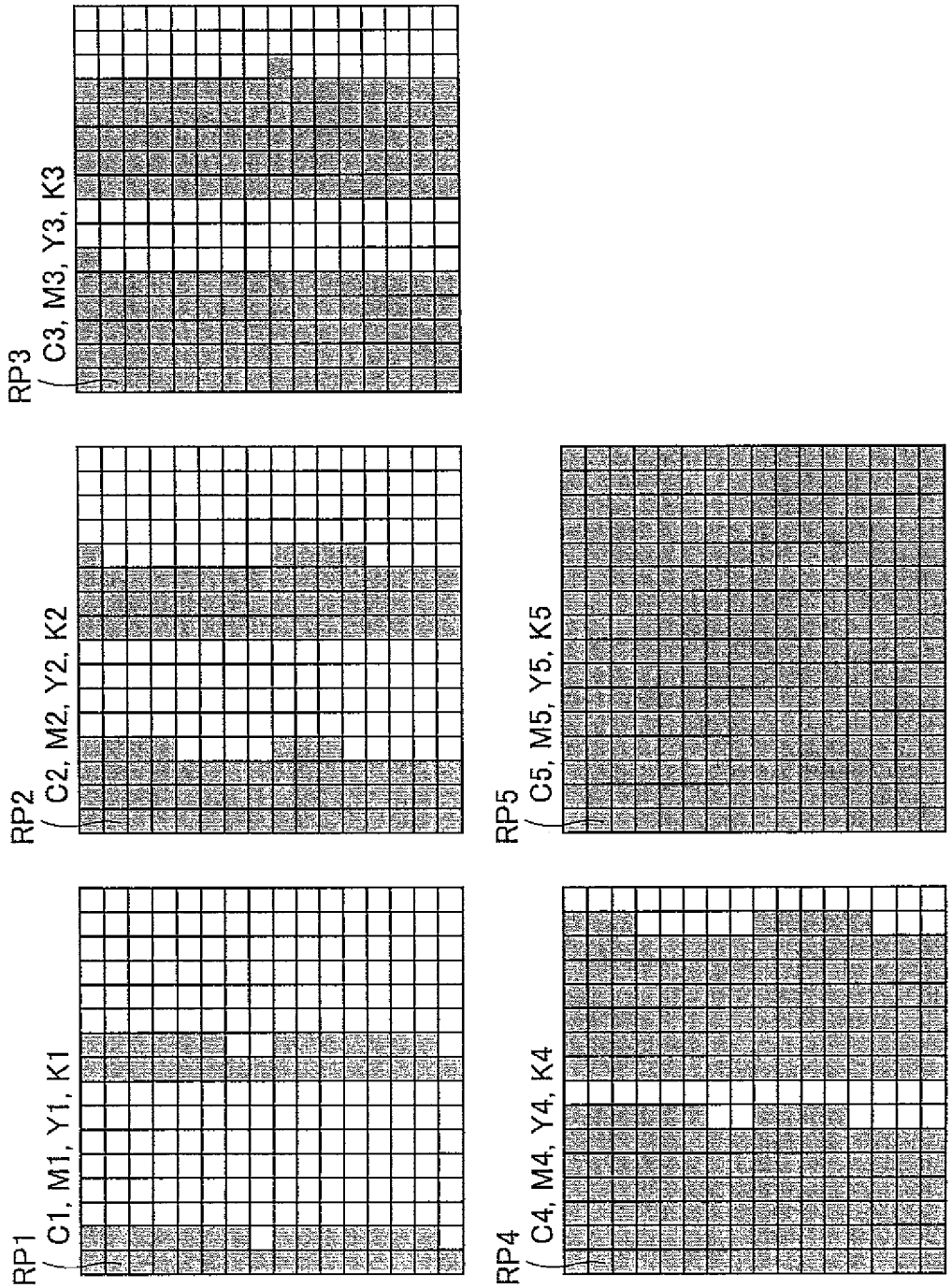
FIG. 11(a) is a table showing the patch names, set densities, and colors of reference density patches included in the reference density patch data memory area.
FIG. 11(b) is an explanatory diagram showing patterns for forming reference density patches stored in the reference density patch data memory area.
Figure 12:
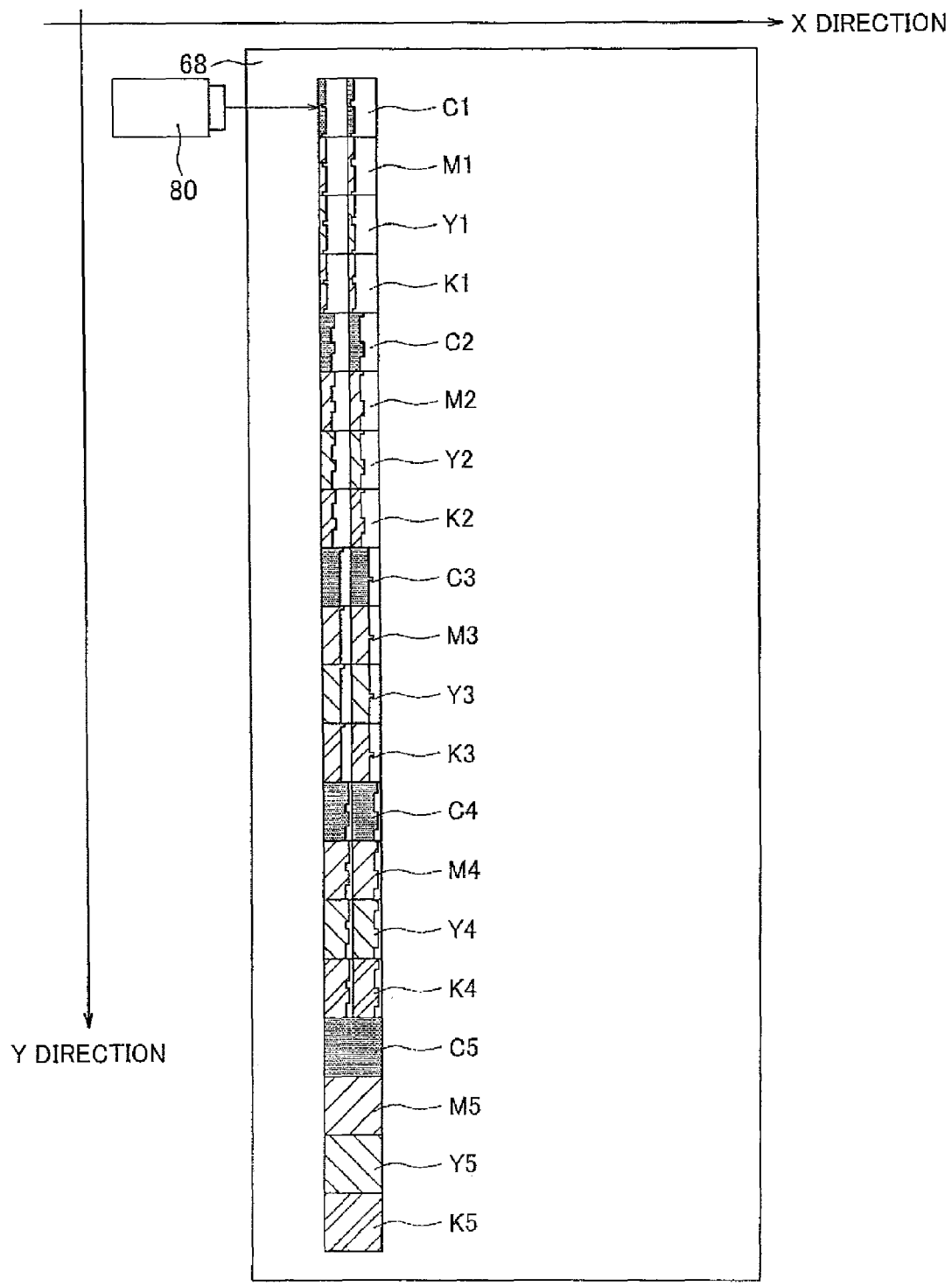
FIG. 12 is an explanatory diagram conceptually illustrating reference density patches formed on a conveying belt of the printer.

The reference density patch data memory area 24a stores reference density patch data for forming density patches C1-K5 shown in FIG. 12 on the conveying belt 68 (see FIG. 1). Here, the reference density patch data stored in the reference density patch data memory area 24a will be described with reference to FIGS. 11(a) and 11(b). FIG. 11(a) is a table showing names, set densities and colors for twenty reference density patches C1-K5. FIG. 11(b) shows five formation patterns (binarized patterns) RF1-RP5 for the reference density patches C1-K5.

As shown in FIGS. 11(a) and 11(b), each record of reference density patch data includes a patch name, set density, color, and formation pattern. Since data for the set density and color of the reference density patch is stored in association with each patch name, as shown in FIG. 11(a), the reference density patch data in the reference density patch data memory area 24a includes a total of 20 records.

The reference density patch name specifies the name of each of the reference density patches C1-K5. In the embodiment, there are a total of 20 patch names for the 20 density patches C1-K5.

The set densities specify the densities of the reference density patches C1-K5 on the conveying belt 68 shown in FIG. 12. The set density can have a minimum value of 0% and a maximum value of 100%, a higher set density resulting in a greater density of the density patch formed on the conveying belt 68 and a lower set density resulting in a lesser density of the density patch formed on the conveying belt 68.

A total of five densities are used in the embodiment: 20%, 40%, 60%, 80%, and 100%. The set density for the reference density patches C1, M1, Y1, and K1 are set to 20%. The set density for the reference density patches C2, M2, Y2, and K2 are set to 40%. The set density for the reference density patches C3, M3, Y3, and K3 are set to 60%. The set density for the reference density patches C4, M4, Y4, and K4 are set to 80%. The set density for the reference density patches C5, M5, Y5, and K5 are set to 100%.

The color indicates the color for the reference density patches C1-K5. In the embodiment, the color for reference density patches C1, C2, C3, C4, and C5 is set to cyan. The color for reference density patches M1, M2, M3, M4, and M5 is set to magenta. The color for reference density patches Y1, Y2, Y3, Y4, and Y5 is set to yellow. The color for reference density patches K1, K2, K3, K4, and K5 is set to black.

As illustrated in FIG. 11(b), reference patterns RP1-RP5 for forming the reference density patches C1-K5 on the conveying belt 68 differ according to the set densities. The reference pattern RP1 is used for the reference density patches C1, M1, Y1, and K1 having a set density of 20%. The reference pattern P2 is used for reference density patches C2, M2, Y2, and K2 having a set density of 40%. The reference pattern P3 is used for reference density patches C3, M3, Y3, and K3 having a set density of 60%. The reference pattern P4 is used for reference density patches C4, M4, Y4, and K4 having a set density of 80%. The reference pattern P5 is used for reference density patches C5, M5, Y5, and K5 having a set density of 100%.

Each of the patterns RP1-RP5 for the reference density patches C1-K5 is indicated by binary data that is determined based on a reference dither matrix (not shown) having threshold values of 16 (height)×16 (width). For example, the pattern RP1 is determined by turning on at dot locations where threshold values area smaller than the multi value 51 (–255× 20/100) and by turning off the other remaining dots whose threshold values area greater than or equal to 51. The reference dither matrix differs the standard mode cyan dither matrix, standard mode magenta dither matrix, standard mode yellow dither matrix, standard mode black dither matrix, high-quality mode cyan dither matrix, high-quality mode magenta dither matrix, high-quality mode yellow dither matrix, and high-quality mode black dither matrix stored in the dither matrix memory area 24c (see FIG. 3).

The PC 200 (see FIG. 2) can overwrite reference density patch data stored in the reference density patch data memory area 24a. In the embodiment, the laser printer 1 forms 16×16-dot square density patches C1-K5 on the conveying belt 68, but the density patches may be formed in a polygonal shape or other shape.

As shown in FIG. 14, the reference density patch coverage memory area 24b stores the reference density patch coverage of each of the reference density patches C1-K5. The coverage is a value obtained by dividing the number of dots that are on (indicated by hatch marks in FIG. 11(b)) in the pattern RS1-RP5 of each reference density patch C1-K5 by the total, number of dots in the reference density patch (including dots with and without hatch marks). Hence, the coverage can be easily calculated without performing a complex process.

As shown in FIG. 14, a single reference density patch coverage is set for each of the set densities of 20, 40, 60, 80, and 100%, regardless of the color of the reference density patches C1-K5 because the same formation pattern RP1-RP5 is set for the reference density patches C1-K5 of the same set density (see FIG. 11(b)). Hence, for example, the reference density patches C1, M1, Y1, and K1 of set density is 20% have the same coverage of 23% (23=100×59/256) since they have the same formation pattern RP1 (see FIG. 11(a)).

As shown in FIG. 3, the calibration table memory area 24d stores calibration tables used for determining an amount of calibration for set densities inputted by the PC 200 for each of the dither matrices. The calibration table memory area 24d is configured of eight memory areas corresponding to the eight dither matrices stored in the dither matrix memory area 24c. Specifically, the calibration table memory area 24d includes a standard mode cyan calibration table memory area 24d1, a standard mode magenta calibration table memory area 24d2, a standard mode yellow calibration table memory area 24d3, a standard mode black calibration table memory area 24d4, a high-quality mode cyan calibration table memory area 24d5, a high-quality mode magenta calibration table memory area 24d6, a high-quality mode yellow calibration table memory area 24d7, and a high-quality mode black calibration table memory area 24d8.

As shown in FIG. 19(d), the standard mode cyan calibration table memory area 24d1 stores a standard mode cyan calibration table used for determining a calibration amount for set densities of 0-100% inputable by the PC 200 for the standard mode cyan dither matrix. The calibration table memory area 24d has a plurality of (100) calibrated set densities in corresponding with the plurality of (100) set densities of 0-100%.

Each of the calibration table memory areas 24d2-24d8 has the same configuration as the standard mode cyan calibration table memory area 24d1 except for the values of the calibrated set densities.

Next, the content of the RAM 25 will be described with reference to FIG. 4. As shown in FIG. 4, the RAM 25 has a density data memory area 25a (see FIG. 17), a reference density patch measured density memory area 25b (see FIG. 13), a corresponding measured density data memory area 25c (see FIG. 18), an interpolation data memory area 25d (see FIG. 19(a)), and a target data memory area 25e (see FIG. 19(b)).

The corresponding density data memory area 25a stores a value of the set density for each dither matrix that allows the subject dither matrix to have a coverage close to the coverage of the reference density patch of the corresponding color stored in the reference density patch coverage memory area 24b (see FIG. 14).

The corresponding density data memory area 25a includes a standard mode cyan density data memory area 25a1, a standard mode magenta density data memory area 25a2, a standard mode yellow density data memory area 25a3, a standard mode black density data memory area 25a4, a high-quality mode cyan density data memory area 25a5, a high-quality mode magenta density data memory area 25a6, a high-quality mode yellow density data memory area 25a7, and a high-quality mode black density data memory area 25a8.

As shown in FIG. 17, the standard mode cyan calibration memory area 25a1 stores a value of the set density, for the standard mode cyan dither matrix, that allows the subject dither matrix to have a coverage that is close to the coverage of each reference density patch C1-C5 stored in the reference density patch coverage memory area 24b. Each of the calibration memory areas 25a2-25a8 has the same configuration as the standard mode cyan calibration memory area 25a1 except for the values of the set densities listed on the right column of FIG. 17.

The reference density patch measured density memory area 25b stores the value of the measured density measured by the density sensor 80 for each density patch C1-K5. The reference density patch measured density memory area 25b has a total of four memory areas corresponding to the four colors of density patches formed on the conveying belt 68. Specifically, the reference density patch measured density memory area 25b includes a cyan reference density patch measured density memory area 25b1 storing measured densities for the cyan density patches C1-C5, a magenta reference density patch measured density memory area 25b2 storing measured densities for the magenta density patches M1-M5, a yellow reference density patch measured density memory area 25b3 storing measured densities for the yellow density patches Y1-Y5, and a black reference density patch measured density memory area 25b4 storing measured densities for the black density patches K1-K5. As shown in FIG. 13, the cyan reference density patch measured density memory area 25b1 stores the value of the measured density for each density patch C1-C5. Each of the reference density patch measured density memory areas 25b2-25b4 has the same configuration as the cyan reference density patch measured density memory area 25b1 except for the values of the measured density listed on the right column of FIG. 13.

The measured densities stored in the reference density patch measured density memory area 25b are updated each time the density sensor 80 measures the densities of the reference density patches C1-K5 formed on the conveying belt 68.

The corresponding measured density memory area 25c stores corresponding measured data associating the value of the set density for each dither matrix stored in the corresponding density data memory area 25a (right column in FIG. 17), with the value of the measured density for the corresponding density patch C1-K5 (right column in FIG. 13).

The corresponding measured density memory area 25c has a total of eight memory areas corresponding to the respective dither matrices stored in the dither matrix memory area 24c. Specifically, the corresponding measured density memory area 25c includes a standard mode cyan corresponding measured density memory area 25c1, a standard mode magenta corresponding measured density memory area 25c2, a standard mode yellow corresponding measured density memory area 25c3, a standard mode black corresponding measured density memory area 25c4, a high quality mode cyan corresponding measured density memory area 25c5, a high-quality mode magenta corresponding measured density memory area 25c6, a high-quality mode yellow corresponding measured density memory area 25c7, and a high-quality mode black corresponding measured density memory area 25c8.

As shown in FIG. 18, the standard mode cyan corresponding measured data memory area 25c1 stores standard mode cyan corresponding measured data that associates the values of set densities of the standard mode cyan dither matrix stored in the standard mode cyan density data memory area 25a1 (right column in FIG. 17) and the values of the measured densities for the density patches C1-C5 stored in the cyan reference density patch measured density memory area 25b1 (right column in FIG. 13). Each of the corresponding measured data memory areas 25c2-25c8 has the same configuration as the standard mode cyan corresponding measured data memory area 25c1 except for the values of the set densities (left column in FIG. 18) and the values of the measured densities (right column in FIG. 18).

The interpolation data memory area 25d stores interpolation data obtained by performing linear interpolation on the corresponding measured data stored in the corresponding measured density memory area 25c. The interpolation data memory area 25d has a total of eight memory areas corresponding to the eight dither matrices stored in the dither matrix memory area 24c. Specifically, the interpolation data memory area 25d includes a standard mode cyan interpolation data memory area 25d1, a standard mode magenta interpolation data memory area 25d2, a standard mode yellow interpolation data memory area 25d3, a standard mode black interpolation data memory area 25d4, a high-quality mode cyan interpolation data memory area 25d5, a high-quality mode magenta interpolation data memory area 25d6, a high-quality mode yellow interpolation data memory area 25d7, and a high-quality mode black interpolation data memory area 25d8.

As shown in FIG. 19(a), the standard mode cyan interpolation data memory area 25d1 stores a standard mode cyan interpolation data obtained by performing linear interpolation on the standard mode cyan corresponding measured data stored in the standard mode cyan corresponding measured data memory area 25c1 (see FIG. 18). Each of the interpolation data memory areas 25d2-25d8 has the same configuration as the standard mode cyan interpolation data memory area 25d1 except for the values of the set densities (left column in FIG. 19(d)) and the measured densities (right column in FIG. 19(d)).

The target data memory area 25e stores a target value of a density desired to-be-measured by the density sensor 80 in correspondence with each set density for each dither matrix. The target values are used as reference for calibration. The target data memory area 25e has a total of eight memory areas corresponding to the eight dither matrices stored in the dither matrix memory area 24c. Specifically, the target data memory area 25e includes a standard mode cyan target data memory area 25e1, a standard mode magenta target data memory area 25e2, a standard mode yellow target data memory area 25e3, a standard mode black target data memory area 25e4, a high-quality mode cyan target data memory area 25e5, a high-quality mode magenta target data memory area 25e, a high-quality mode yellow target data memory area 25e7, and a high-quality mode black target data memory area 25e8.

As shown in FIG. 19(b), the standard mode cyan target data memory area 25e, stores target values for a measured density used as reference in calibration in correspondence with 101 set densities (0-100%) for the standard mode cyan dither matrix. Each target value is indicative of a value of density of an image desired to-be-measured when a corresponding set density is inputted and converted by the standard mode cyan dither matrix. Each of the target data memory areas 25e2-25e8 has the same configuration as the standard mode cyan target data memory area 25e1, except for the values of the target value for the measured density (right column in FIG. 19(b)).

Figure 5:
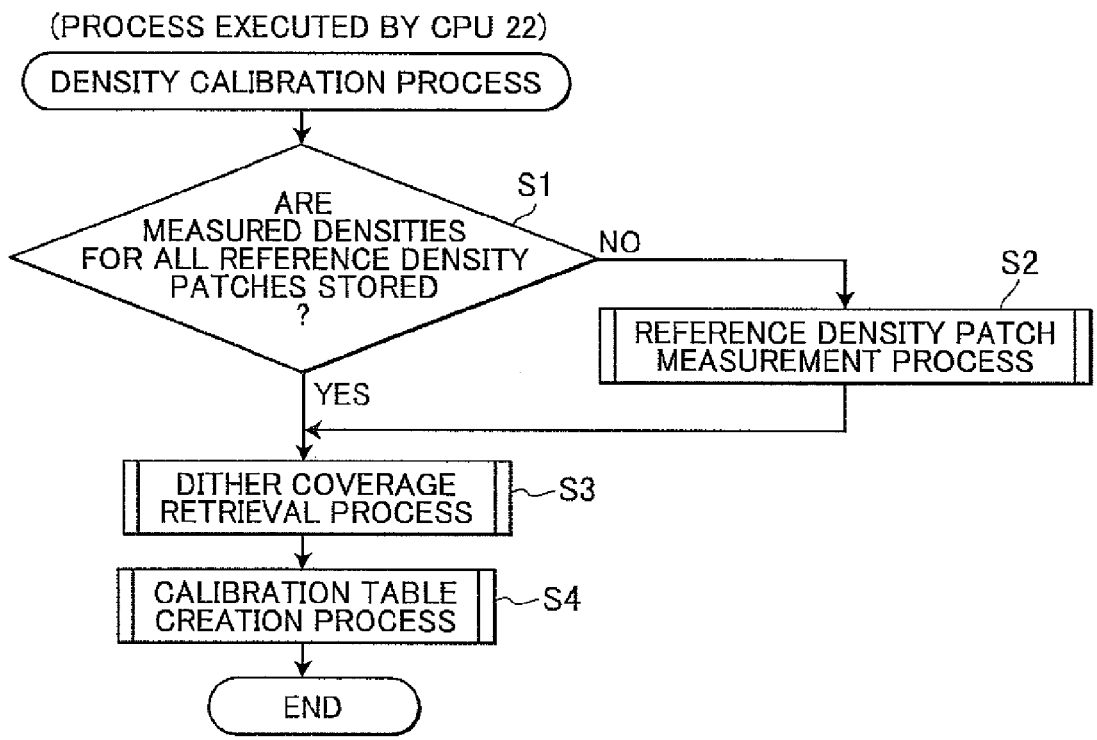
FIG. 5 is a flowchart illustrating steps in a density calibration process executed by a CPU in a controller of the printer.
Figure 6:
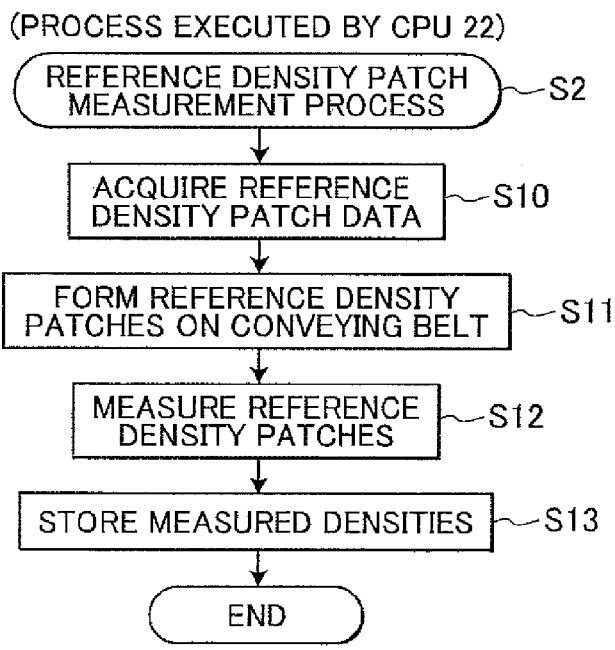
FIG. 6 is a flowchart illustrating steps in a reference density patch measurement process.

Next, a density calibration process executed by the CPU 22 of the controller 90 will be described with reference to FIGS. 5 through 10. FIG. 5 is a flowchart illustrating steps in the density calibration process. The density calibration process is performed each time at least one or all of the dither matrices stored in the dither matrix memory area 24c are changed by dither matrix data transmitted from the PC 200.

In S1 of the density calibration process, the CPU 22 determines whether or not the reference density patch measured density memory area 25b (see FIG. 13) contains measured densities for all of the reference density patches C1-K5. The CPU 22 advances to a dither coverage retrieval (searching) process of S3 upon determining that the reference density patch measured density memtory area 25b includes measured densities for all of the reference density patches C1-K5 (S1: YES) or after executing the reference density patch measurement process in S2. However, if the measured densities for all density patches C1-K5 are hot stored, in the reference density patch measured density memory area 25b (S1: NO), then the CPU 22 performs a reference density patch measuring process of S2 in order to acquire all measured densities for the reference density patches C1-K5. The reference density patch measurement process of S2 will be described next with reference to FIG. 6.

The reference density patch measurement process is configured to form the reference density patches C1-K5 on the conveying belt 68, measure the densities of the reference density patches C1-K5 with the density sensor 80, and to store the measured densities in the reference density patch measured density memory area 25b.

In S10 of the reference density patch measurement process the CPU 22 acquires reference density patch data from the reference density patch data memory area 24a (see FIGS. 11(a) and 11(b)). In S11 the CPU 22 forms the reference density patches C1-K5 on the conveying belt 68 based on the reference density patch data acquired in S10. In 312 the CPU 22 controls the density sensor 80 to measure the densities of the reference density patches C1-K5.

Here, the process from S10 to S12 will be described with reference to FIG. 12. FIG. 12 is an explanatory diagram conceptually illustrating the reference density patches C1-K5 formed on the conveying belt 68. In FIG. 12, the Y direction corresponds to the direction in which the conveying belt 68 moves, indicated by the arrow "a" in FIG. 1, while the X direction corresponds to a direction orthogonal t6 the surface of the drawing in FIG. 1 and parallel to the surface of the conveying belt 68.

Specifically, the CPU 22 acquires reference density patch data from the reference density patch data memory area 24a and first controls the image-forming unit 20C to form the density patch C1 on the conveying belt 68 in the color cyan and at the pattern RP1 (set density of 20%). Next, the CPU 22 controls the image-forming unit 20M to form the density patch M1 on the conveying belt 68 in the color magenta and at the pattern R21 (set density of 20%). The CPU 22 repeats this process until all of the reference density patches C1-K5 have been formed on the conveying belt 68.

Hence, the CPU 22 forms a total of twenty reference density patches C1-K5 on the conveying belt 68, as shown in FIG. 12. Subsequently, the density sensor 80 measures the density of each of the reference density patches C1-K5.

Returning to FIG. 6, after the density sensor 80 has measured each of the reference density patches C1-K5 formed on the conveying belt 68, the CPU 22 stores the measured densities in the reference density patch measured density memory area 25b in S13 and subsequently ends the reference density patch measurement process of S2.

More specifically, in S13 the CPU 22 stores the measured densities for the reference density patches C1-C5 in the cyan reference density patch measured density memory area 25b1 as shown in FIG. 13. Similarly, the CPU 22 stores the measured densities for the reference density patches M1-M5 in the magenta reference density patch measured density memory area 25b2. The CPU 22 stores the measured densities for the reference density patches Y1-Y5 in the yellow reference density patch measured density memory area 25b3. The CPU 22 stores the measured densities for the reference density patches K1-K5 in the black reference density patch measured density memory area 25b4.

Next, the content of the cyan reference density patch measured density memory area 25b1 will be described. The cyan reference density patch measured density memory area 25b1 stores the cyan reference density patch data measured densities that are indicative of the densities of the density patches C1-C5 measured by the density sensor 80. Hence, in the example of FIG. 13, the density of the density patch C1 measured by the density sensor 80 is 0.15. Similarly, densities of the density patches C2, C3, C4, and C5 are 0.25, 0.40, 0.62, and 1.00. Other reference density patch measured, density memory areas 25b2-25b4 have the same configuration as the cyan reference density patch measured density memory area 25b1, except for the values of the measured densities.

Figure 7:
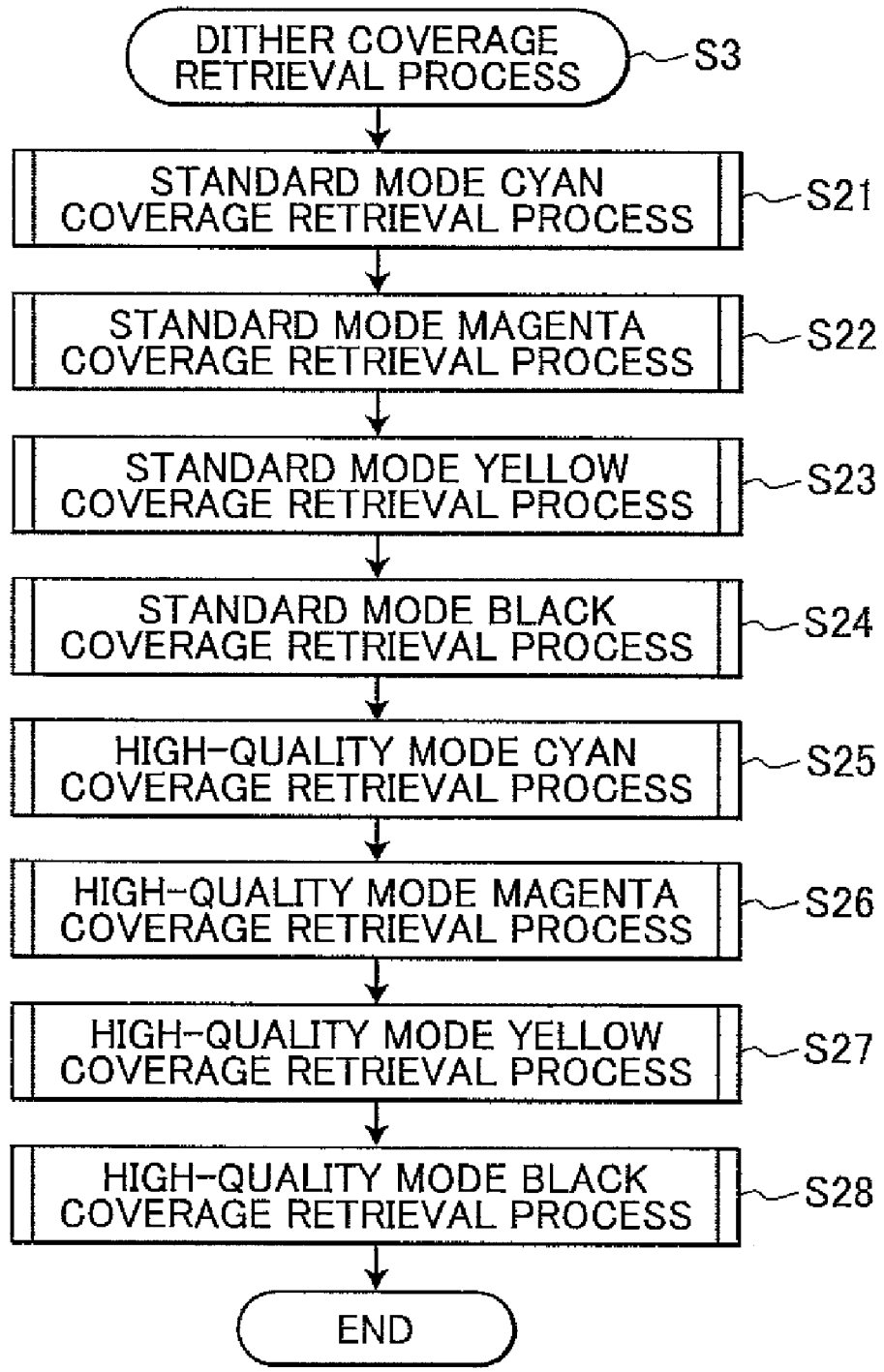
FIG. 7 is a flowchart illustrating steps in a dither coverage retrieval (searching) process.

The dither coverage retrieval (searching) process (S3) is shown in FIG. 7, and is configured to change the set is density for each dither matrix presently stored in the dither matrix memory area 24c and create the corresponding density data memory area 25a (see FIG. 17).

At the dither coverage retrieval (searching) process, first, the CPU 22 executes a standard mode cyan coverage retrieval process in S21. The standard mode cyan coverage retrieval process is configured to change the set density for the standard mode cyan dither matrix stored in the standard mode cyan dither matrix memory area 24c1, and to create the standard mode cyan density data memory area 25a1 by storing a value of a set density that allows the coverage of the standard mode cyan dither matrix to be close to the coverage of each reference density patch C1-C5.

Figure 8:
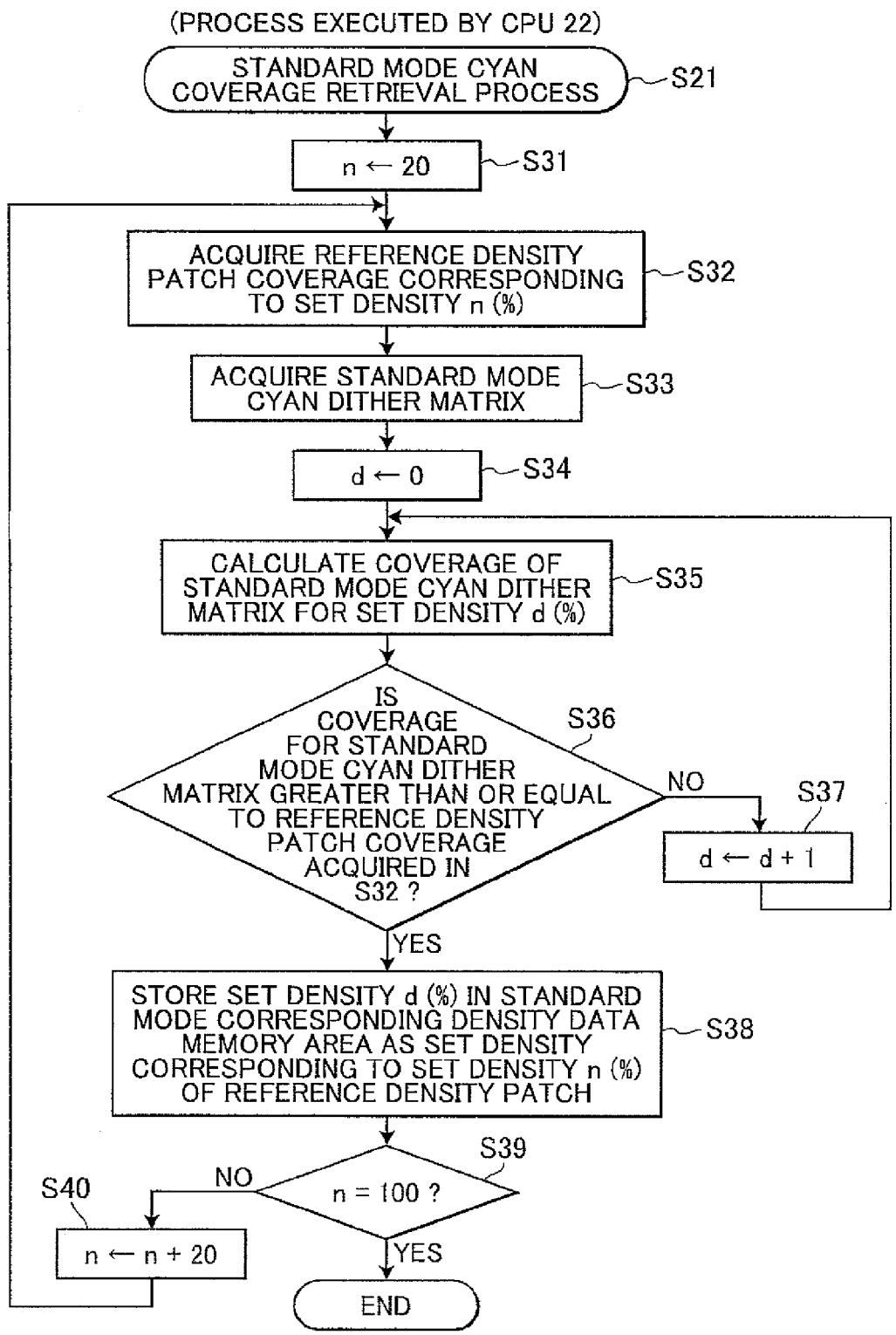
FIG. 8 is a flowchart illustrating steps in a standard mode cyan coverage retrieval process.
Figure 9:
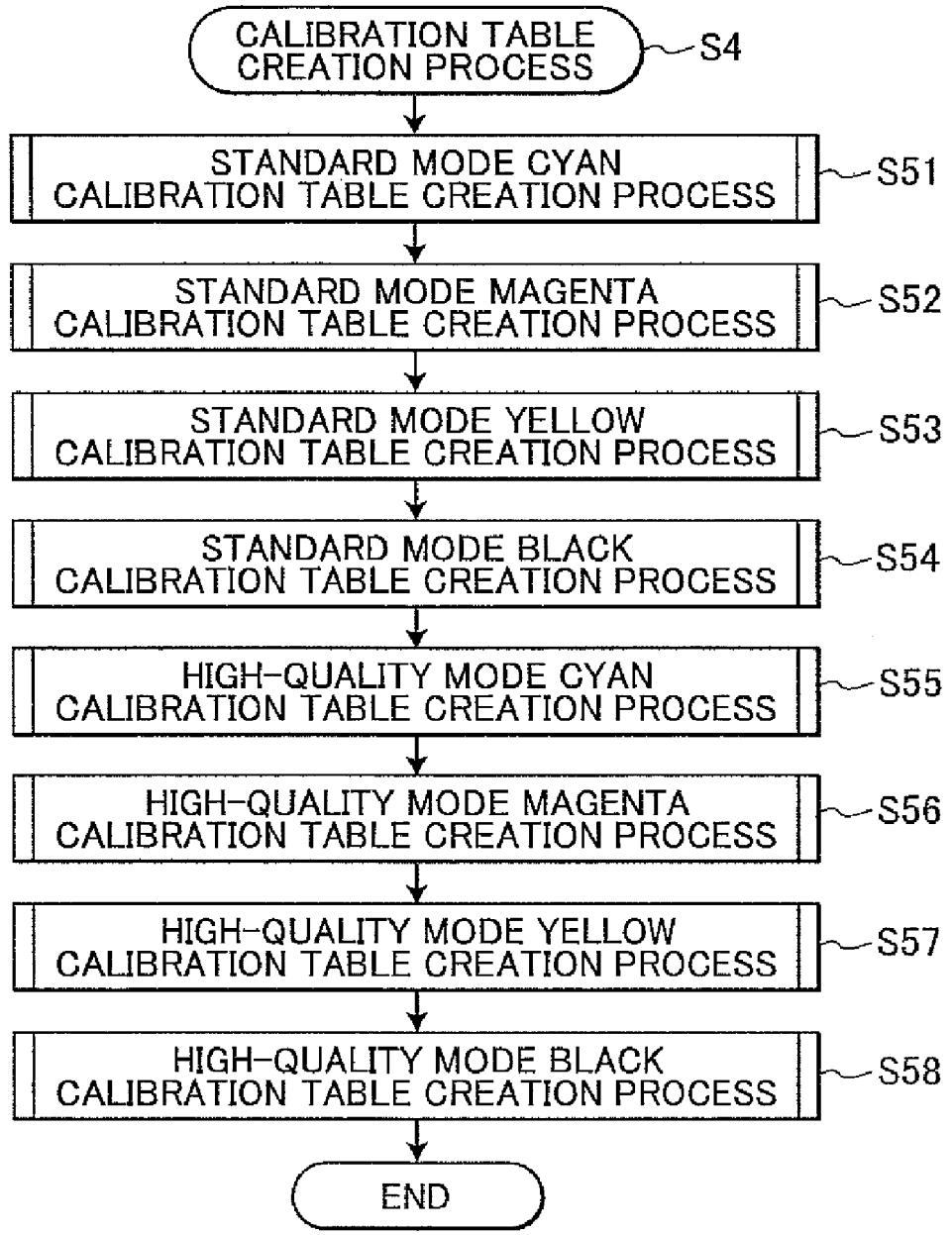
FIG. 9 is a flowchart illustrating steps in a calibration table creation process.

Next, the standard mode cyan coverage retrieval process of S21 will be described with reference to FIG. 8. First, in S31 the CPU 22 sets a variable n (20%), where n indicates the set density indicative of either one of the reference density patches C1-C5. In S32 the CPU 22 acquires the reference density patch coverage corresponding to the present set density n of 20% from the reference density patch coverage memory area 24b shown in FIG. 14.

So, the CPU 22 acquires the coverage value of 23% corresponding to the set density of 20% for the reference density patch C1 from the reference density patch coverage memory area 24b (see FIG. 14) in S32. In S33 the CPU 22 acquires the standard mode cyan dither matrix from the standard mode cyan dither matrix memory area 24c1. In S34 the CPU 22 sets a variable d to 0, where d is the set density for the standard mode cyan dither matrix. In S35 the CPU 22 calculates the coverage of the standard mode cyan dither matrix when the set density of the matrix is d (A0).

More specifically, in 335, the CPU 22 converts the set density d (%) indicated by the unit of % into a multilevel numeral value from 0 to 255. For example, when the set density "d" of the standard mode cyan dither matrix is 20%, the CPU 22 converts the set density 20% to the numeral 51 (51=255×20/100). The CPU 22 turns on or off at each of all the 32×16 dot location by comparing the converted set density (51 in this example) with the threshold on the subject dot location. That is, the CPU 22 turns on those dots whose thresholds are smaller than the converted set density. The CPU 22 calculated the coverage of the standard mode cyan dither matrix for the set density "d" (20%, for example) by calculating a ratio of the number of on-dots with respect to the total number (32×16) of the dots. It is noted that increasing the set density d will increase the number of dots that are on, increasing the coverage of the dither matrix.

Since no dots are on when the set density d for the standard mode cyan dither matrix is 0% (=0), the coverage of the standard mode cyan dither matrix is also 0%. Further, since all the dots are on when the set density d is 100% (=255), the coverage of the matrix will become also 100%.

Returning to S35 of FIG. 8, the CPU 22 now calculates the coverage for the standard mode cyan dither matrix to be 0%, since the set density d is presently 0%. In S36 the CPU 22 determines whether the coverage of the dither matrix reaches or exceed the 23% coverage with the 20% (n) set density for the reference density patch acquired in S32.

Since the coverage calculated in S35 is now 0%, the CPU 22 determines that this coverage does not reach or exceed the 23% coverage with the 20% set density (S36; NO). Accordingly, in S37 the CPU 22 increments the set density d by one (1) and returns to S35.

After returning to 835, the CPU 22 recalculates the coverage of the standard mode cyan dither matrix for which the set density d has been incremented by one (1) in S37. In S36 the CPU 22 again determines whether the coverage calculated in S35 reaches or exceeds the 23% coverage for the 20% set density of the reference density patch acquired in S32.

The process in S35-S37 is repeated in this way until the CPU 22 determines that the coverage of the standard mode cyan dither matrix reaches or exceeds the 23% coverage for the 20% set density for the first time.

In this example, when the set density d becomes 27%, the coverage of the standard mode cyan dither matrix shown in FIG. 15 reaches or exceeds the 23% coverage for the first time. At this time, the CPU 22 reaches a YES determination in S36 and advances to S38.

In S38 the CPU 22 stores the set density d of 27% in the standard mode cyan density data memory area 25a1 as the set density corresponding to the set density n of 20% for the reference density patch as shown in FIG. 17. In S39 the CPU 22 determines whether the set density n for the reference density patch has reached 100%. If the set density n is less than 100% (S39: NO), then in S40 the CPU 22 adds 20 to the set density n and returns to S32.

After adding 20 to the set density n for the reference density patch in S40, so that the set density n is now 40%, the CPU 22 repeats the process from S32 using 40% as the set density n of the reference density patch. The CPU 22 repeatedly performs the process from S32 until determining in S39 that the set density n reaches 100% (S39; YES), and subsequently ends the standard mode cyan dither coverage retrieval (searching) process of S21.

In other words, the CPU 22 ends the standard mode cyan dither coverage retrieval (searching) process after determining in S39 that the set density n of the reference density patch has reached 100% (339: YES) since the process beginning from S32 has been completed for the coverages of the reference density patches of all the set densities of 20%, 40%, 60%, 80%, and 100%.

In this example, the coverage of the standard mode cyan dither matrix reaches or Exceeds the 42% coverage of the 40% set density reference density patch for the first time when the set density d becomes 48%. The coverage of the standard mode cyan dither matrix reaches or exceeds the 63% coverage of the 60% set density for the reference density patch for the first time when the set density d becomes 70%. The coverage of the standard mode cyan dither matrix reaches or exceeds the 82% coverage of the 80% set density reference density patch for the first time when the set density d becomes 91%. The coverage of the standard mode cyan dither matrix reaches the 100% coverage of the 100% set density reference density patch for the first time when the set density d becomes 100%.

It is known from the thus created standard mode cyan corresponding density data memory area 25a1 of FIG. 17 that the coverage of the standard mode cyan dither matrix at each set density listed on the right column is substantially the same as the coverage of the reference density patches C1-C5 with set densities listed on the right column.

It is possible to presume that if a patch is formed based on the standard mode cyan dither matrix for each set density stored in the data memory area 25a1, right column, and is measured by the density sensor 80, the measured density will be substantially the same as the measured density for the reference density patch at the corresponding set density stored in the memory area 25a1 on the left column, because they have substantially the same coverage.

In this way, densities that are to be measured on patches obtained from the standard mode cyan dither matrix are correlated with actually-measured densities of the reference density patches C1-C5. The actually-measured densities for the reference density patches C1-C5 are used as to-be-measured densities of patches that will be obtained from the standard mode cyan dither matrix.

By creating corresponding measured data that correlates set densities for dither matrices stored in the corresponding density data memory area 25a with measured densities of the reference density patches C1-C5 stored in the reference density patch measured density memory area 25b, it is possible to presume a measured density for each dither matrix at each set density without actually forming a patch based on the measuring each dither matrix and measuring the patch with the density sensor 80.

Further, by determining in S36 whether the coverage of the standard mode cyan dither matrix calculated in S35 reaches or exceeds the coverage of the reference density patch acquired in S32, the CPU 22 can account for calculation errors that are obtained when calculating the coverage of the standard mode cyan dither matrix in S35.

Returning to FIG. 7, after completing the process in S21, the CPU 22 executes a standard mode magenta coverage retrieval process in S22, a standard mode yellow coverage retrieval process in S23, a standard node black coverage retrieval process in S24, a high-quality mode cyan coverage retrieval process in S25, a high-quality mode magenta coverage retrieval process in S26, a high-quality mode yellow coverage retrieval process in S27, and a high-quality mode black coverage retrieval process in S28. Each process S22-S28 is configured to vary the set density of the dither matrix stored in the corresponding dither matrix memory area 24c2-24c8, and to create the corresponding, corresponding density data memory area 25a2-25a8 by storing the set density that allows the coverage of the corresponding dither matrix to be close to the reference density patch coverage stored in the reference density patch coverage memory area 24b2-24b8 in the same manner as the standard mode cyan coverage retrieval process in S21. After completing the process in S28, the CPU 22 ends the dither coverage retrieval (searching) process of S3.

Returning to FIG. 5, after, completing the dither coverage retrieval (searching) process in S3, the CPU 22 executes a calibration table creation process of S4 and subsequently ends the density calibration process. The calibration table creation process of S4 will be described with reference to FIG. 9.

The calibration table creation process of S4 serves to create calibration tables for suitably calibrating a set density for each dither matrix so that densities of images formed on the recording paper 3 will become the same as target values for measured densities stored in the target data memory area 25e (see FIG. 19(b)).

At S4 of the beginning of the calibration table creation process, the CPU 22 executes a standard mode cyan calibration table creation process in S51. The process in S51 serves to create a standard mode cyan calibration table for appropriately calibrating each set density for the standard mode cyan dither matrix so that densities of images to be formed using the standard mode cyan dither matrix will become the same as the target values of the measured densities stored in the standard mode cyan target data memory area 25e1.

Figure 10:
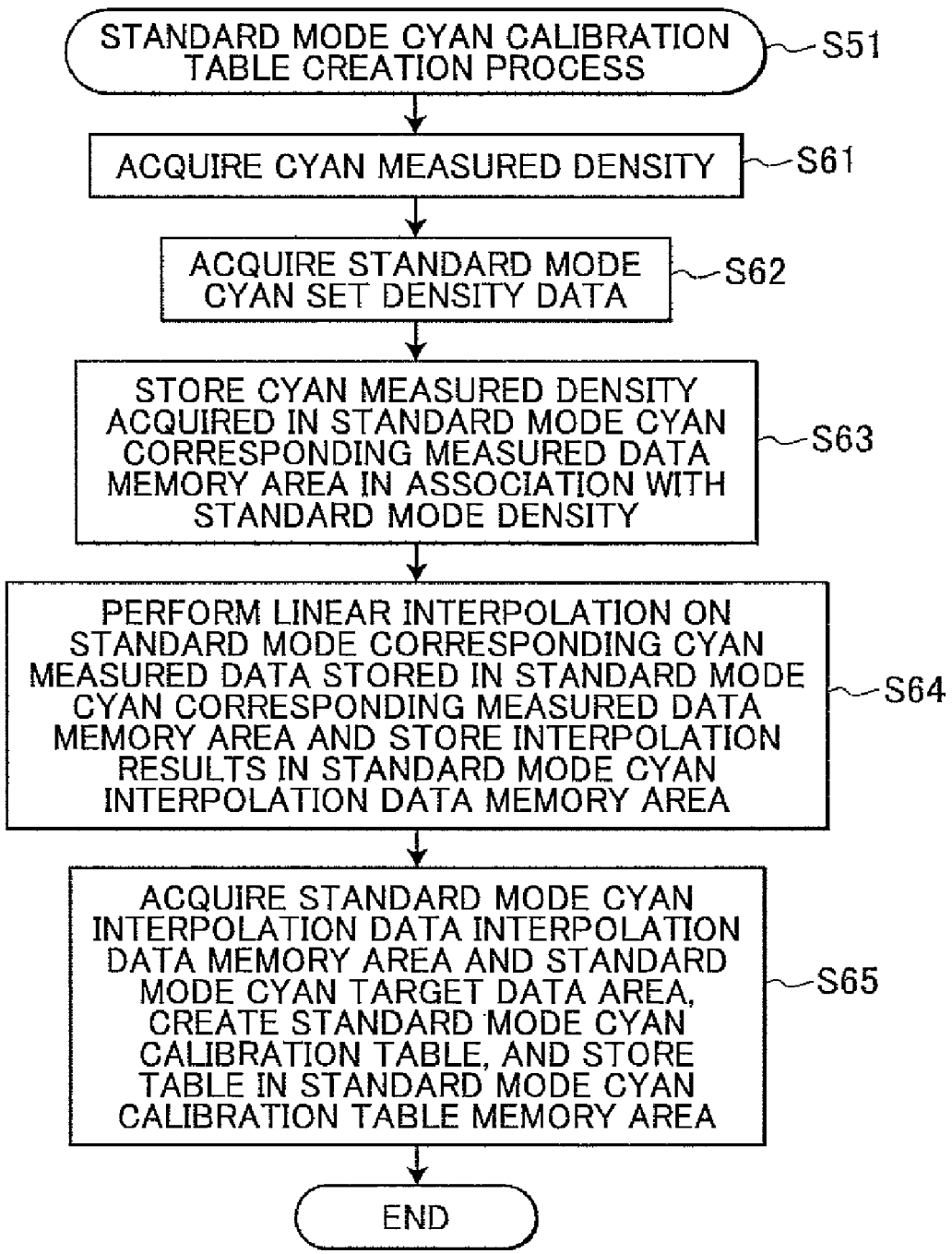
FIG. 10 is a flowchart illustrating steps in a standard mode cyan calibration table creation process.

The standard mode cyan calibration table creation process of S51 will be described next with reference to FIG. 10. FIG. 10 is a flowchart illustrating steps in the process of S51. In S61 at the beginning of the process the CPU 22 acquires the cyan measured densities from the cyan reference density patch measured density memory area 25b1 (see FIG. 13). In S62 the CPU 22 acquires the set densities for the standard mode cyan dither matrix from the standard mode cyan density data memory area 25a1 (see FIG. 17).

In S63 the CPU 22 stores the cyan measured densities acquired in, S61 in the standard mode cyan corresponding measured density memory area 25c1 in association with the set densities for the standard mode cyan dither matrix acquired in S62.

FIG. 18 is a table showing the content of the standard mode cyan corresponding measured data memory area 25c1. The standard mode cyan corresponding measured data stored in the standard mode cyan corresponding measured data memory area 25c1 associates measured densities for the reference density patches C1-C5 stored in the cyan reference density patch measured density memory area 25b1 (see FIG. 13) with the set densities for the standard mode cyan dither matrix stored in the standard mode cyan density data memory area 25a1 (see FIG. 17).

By creating the standard mode cyan corresponding measured data to associate densities measured by the density sensor 80 with the set densities for the standard mode cyan dither matrix, a measured density can be set for each set density of the standard mode cyan dither matrix without measuring the density with the density sensor 80 for each set density of the dither matrix actually used.

After completing the process in S63 of FIG. 10, in S64 the CPU 22 performs linear interpolation on the standard mode cyan corresponding measured data stored in the standard mode cyan corresponding measured data memory area 25c1 (FIG. 18) and stores the interpolation results in the standard mode cyan interpolation data memory area 25d1 (FIG. 19(a)). More specifically, the CPU 22 interpolates the measured densities (right column in FIG. 18) at increments of set density (left column in FIG. 18). The interpolation result, therefore, has 101 interpolated measured densities in correspondence 101 interpolated set densities of 0, 1, . . . , and 100(%) as shown in FIG. 19(a). The standard mode cyan interpolation data created through the process of S64 is more precise data than the standard mode cyan corresponding measured data stored in the standard mode cyan corresponding measured data memory area 25c1. Performing linear interpolation on the standard mode cyan corresponding measured data stored in standard mode cyan corresponding measured data memory area 25c1 (FIG. 18) makes it easy to compare the resulting standard mode cyan interpolation data with the standard mode cyan target data stored in the standard mode cyan target data memory area 25e1 (see FIG. 19(b)). Here, spline interpolation or another method may be used in place of linear interpolation.

In S65 of FIG. 10 the CPU 22 acquires the standard mode cyan interpolation data from the standard mode cyan interpolation data memory area 25d1 (see FIG. 19(a)) and the standard mode cyan target data from the standard mode cyan target data memory area 25e1 (see FIG. 19(d)), creates a standard mode cyan calibration table, and stores the table in the standard mode cyan calibration table memory area 24d1 (see FIG. 19(d)). Subsequently, the CPU 22 ends the standard mode cyan calibration table creation process.

Figure 19C:
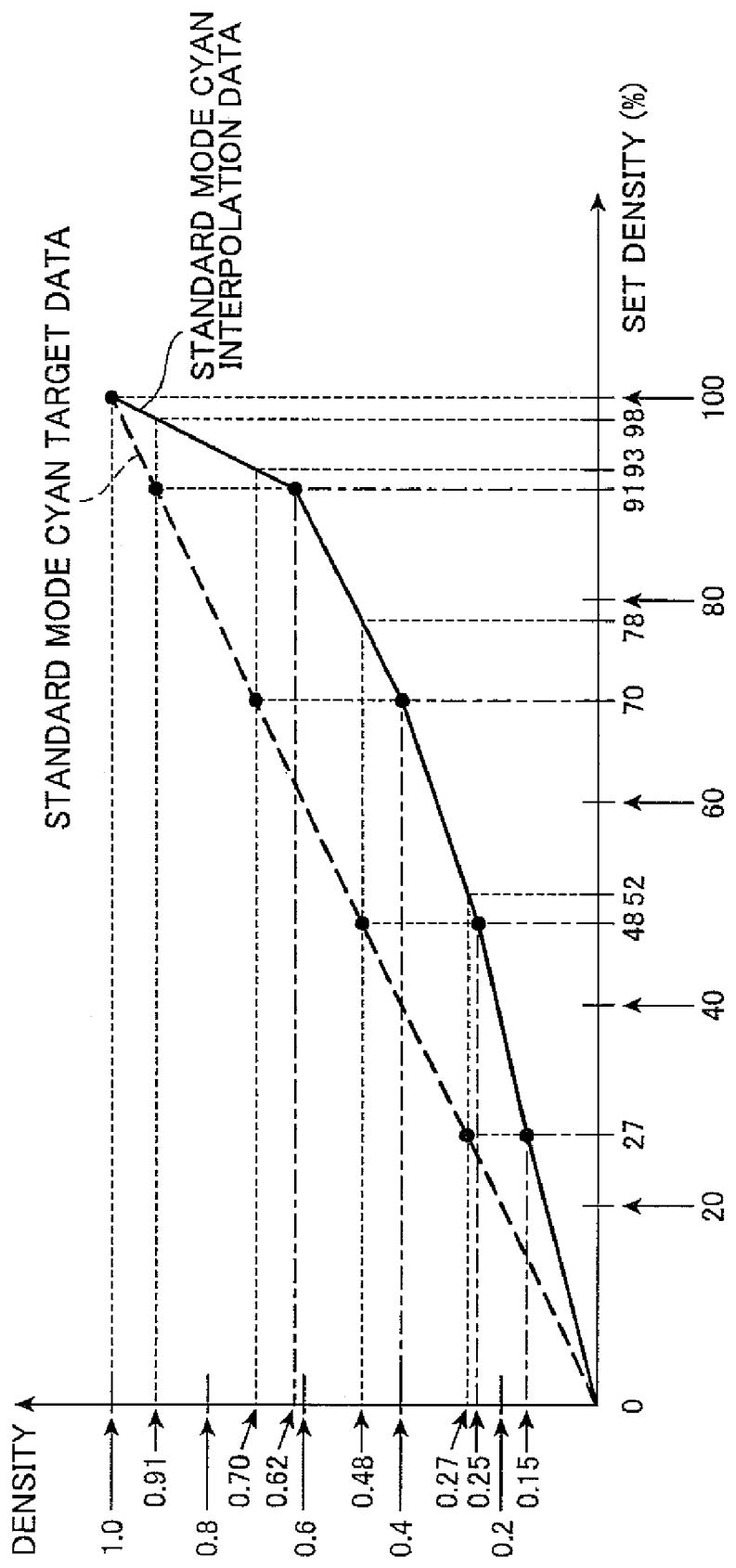
FIG. 19(c) is a graph plotting the standard mode cyan interpolation data and the standard mode cyan target data.
Figure 21:
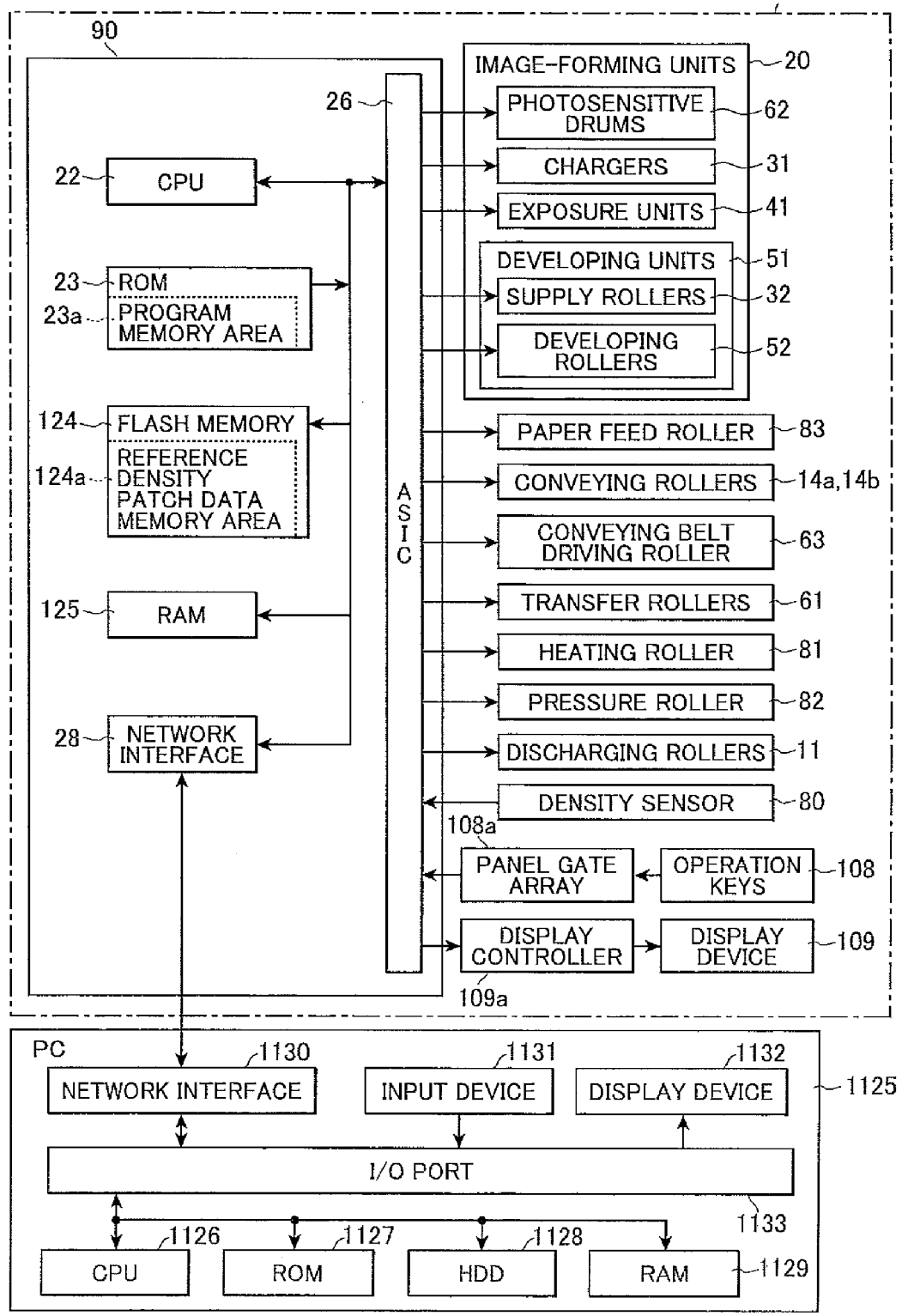
FIG. 21 is a block diagram showing the electrical structure of a color laser printer and a PC according to a second embodiment.
Figure 25A:
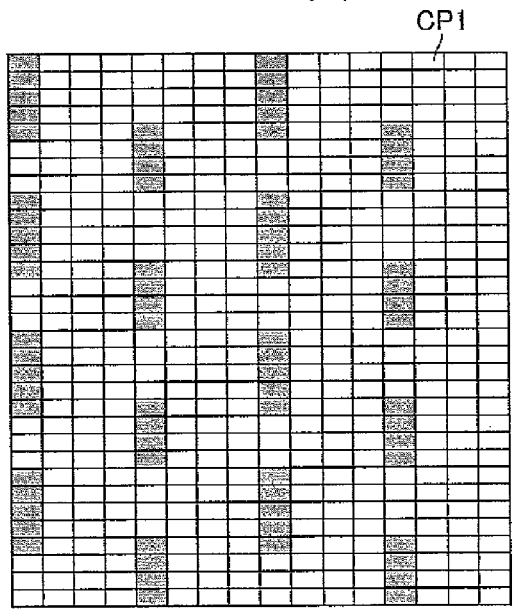
FIG. 25(a) is an explanatory diagram showing a pattern CP1 for forming a standard mode cyan density patch for set density 20%.
Figure 25C:
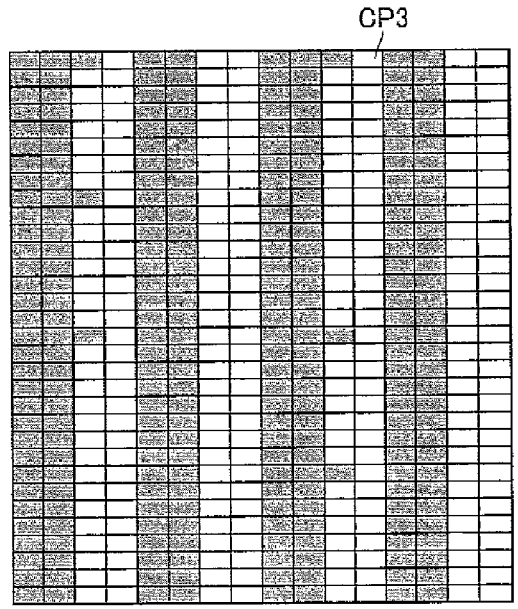
FIG. 25(c) is an explanatory diagram showing a pattern CP3 for forming a standard mode cyan density patch for set density 60%.
Figure 25B:
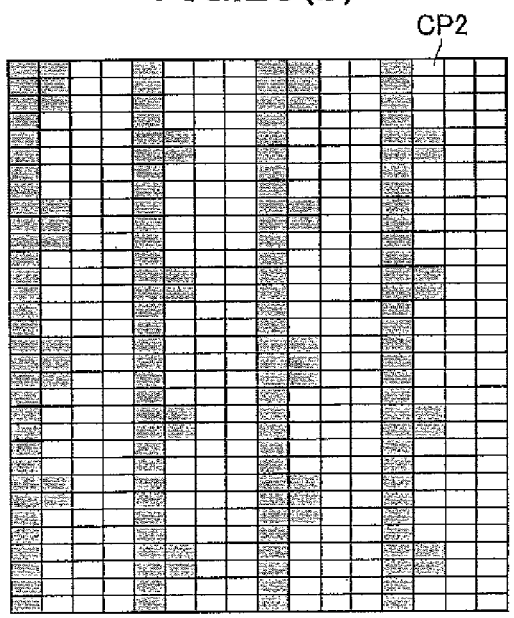
FIG. 25(b) is an explanatory diagram showing a pattern CP2 for forming a standard mode cyan density patch for set density 40%.
Figure 25D:
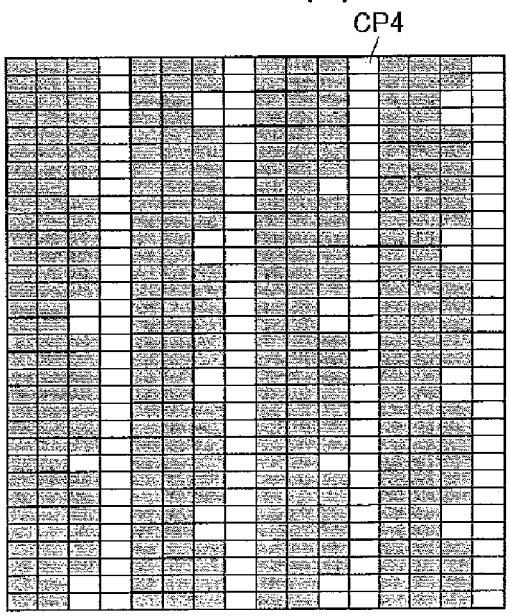
FIG. 25(d) is an explanatory diagram showing a pattern CP4 for forming a standard mode cyan density patch for set density 80%.
Figure 26:
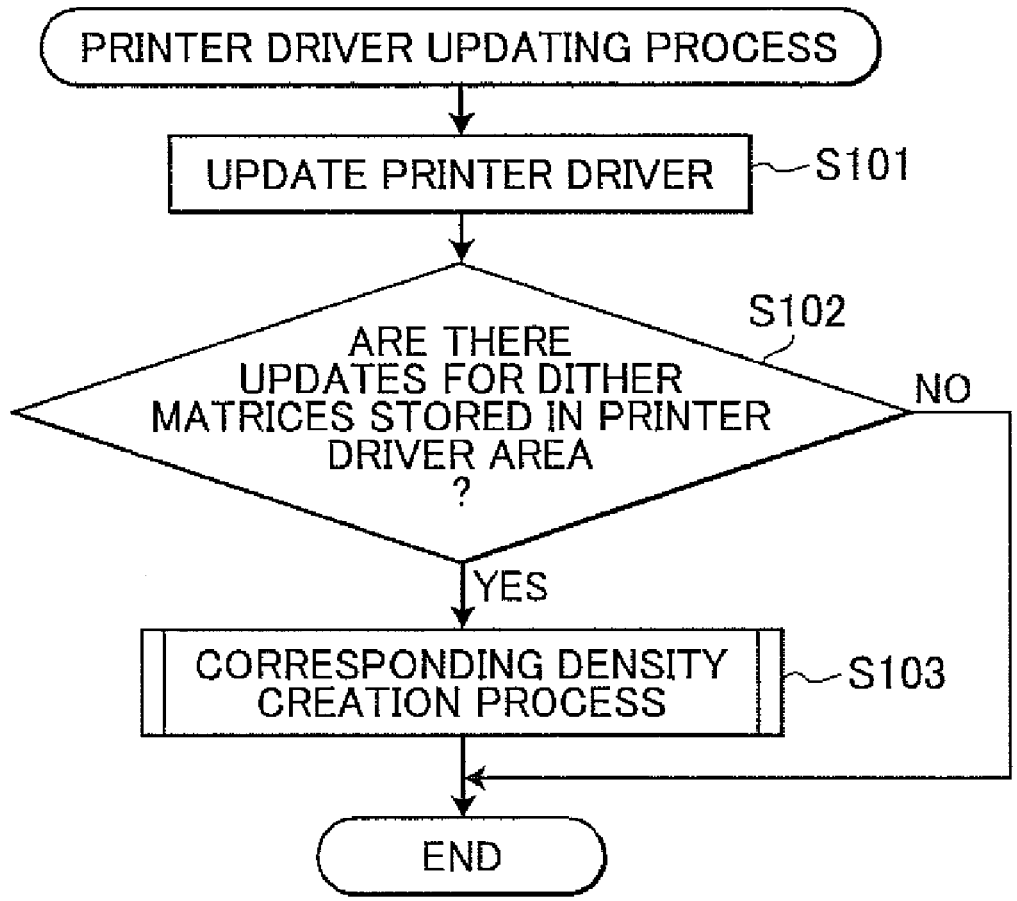
FIG. 26 is a flowchart illustrating steps in a printer driver updating process executed by the CPU of the PC.

Here, the process in S64 and S65 will be described with reference to FIGS. 19(a) through 19(d). FIG. 19(a) is a table showing the standard mode cyan interpolation data stored in the standard mode cyan interpolation data memory area 25d1. FIG. 19(b) is a table showing the standard mode cyan target data stored in the standard mode cyan target data memory area 25e1. FIG. 19(c) is a graph plotting the standard mode cyan interpolation data and the standard mode cyan target data. FIG. 19(d) is a table showing the standard mode cyan interpolation table stored in the standard mode cyan calibration table memory area 24d1.

As shown in FIG. 19(a), the standard mode cyan interpolation data memory area 25d1 stores standard mode cyan interpolation data configured of interpolation values obtained by performing linear interpolation on the standard mode cyan corresponding measured data stored in the standard mode cyan corresponding measured data memory area 25c1 (see FIG. 18).

As shown in FIG. 19(b), the standard mode cyan target data memory area 25e1 stores standard mode cyan target data including preset target values of densities desired to be measured in correspondence to the respective set densities for the standard mode cyan dither matrix.

FIG. 19(c) is a graph plotting the standard mode cyan interpolation data stored in the standard mode cyan interpolation data memory area 25d1 shown in FIG. 19(a) and standard mode cyan target data stored in the standard mode cyan target data memory area 25e1 shown in FIG. 19(b).

In the graph of FIG. 19(c), the horizontal axis represents the set density (%), and the vertical axis represents density to be measured. Hence, the horizontal axis indicates the interpolated values of the set densities for the standard mode cyan dither matrix shown in FIG. 19(a) and the set densities for the standard mode cyan dither matrix shown in FIG. 19(b), while the vertical axis indicates the measured densities for the standard mode cyan interpolation data shown in FIG. 19(a) and the target measured densities for the standard mode cyan target data shown in FIG. 19(b).

As shown in FIG. 19(c), when the set density of the standard mode cyan dither matrix is 27%, the density of the standard mode cyan target data (target value for measured density) is 0.27, while the density of the standard mode cyan interpolation data is 0.15. Hence, it is known that even when a cyan image is printed on the recording paper 3 based on a 27% set density by using the standard mode cyan dither matrix, the measured density of the printed cyan image outputted by the density sensor 80 will be 0.15, which is lower than the density of 0.27 in the standard mode cyan target data.

In this case, the CPU 22 reads the set density for the standard mode cyan dither matrix that is required for achieving a measured density for the printed cyan image equivalent to the 0.27 target density from FIG. 19(c). As can be seen from FIG. 19(c), the set density for the standard mode cyan dither matrix must be corrected to 52% in order to achieve a measured density of 0.27 for the printed cyan image.

As another example, when the set density of the standard mode cyan dither matrix is 70%, the target value for the measured density in the standard mode cyan target data is 0.70, while the density in the standard mode cyan interpolation data is 0.40. Accordingly, it is known that when a cyan image is printed on the recording paper 3 based on a 70% set density by using the standard mode cyan dither matrix, the measured density of the printed cyan image outputted by the density sensor 80 will be 0.40, which is lower than the target density of 0.70 in the standard mode cyan target data.

In this case, the CPU 22 reads the set density from the 19(c), which is required for achieving a measured density for the printed cyan image equivalent to the target density of 0.70. As can be seen in FIG. 19(c) the set density of the standard mode cyan dither matrix must be calibrated to 93% in order to obtain a 0.70 measured density for the printed cyan image.

FIG. 19(d) shows the standard mode cyan calibration table stored in the standard mode cyan calibration table memory area 24d1. This table lists calibration amounts taken from the graph in FIG. 19(c). For example, this table shows that the set density of 27% should be calibrated into 52%.

Returning to FIG. 9, after completing the process in S51, the CPU 22 executes a standard mode magenta calibration table creation process in S52, a standard mode yellow calibration table creation process in S53, a standard mode black calibration table creation process in S54, a high-quality mode cyan calibration table creation process in S55, a high-quality mode magenta calibration table creation process in S56, a high-quality mode yellow calibration table creation process in S57, and a high-quality mode black calibration table creation process in S58. Each of the calibration process in S52-S58 serves to create a calibration table of a corresponding combination of mode and color for appropriately calibrating the set density for a corresponding dither matrix so that densities of images formed using the corresponding dither matrix will become the same as the target values of the measured densities stored in the corresponding target data memory area 25e2-25e8 and storing the calibration table in the corresponding calibration table memory area 24d2-24d8 in the same manner as the standard mode cyan calibration table creation process in S51.

After completing the process in S58, the CPU 22 ends the calibration table creation process of S4 in FIG. 5. Through the calibration table creation process, the CPU 22 can create calibration tables for suitably calibrating each set density for each dither matrix so that the density of the image formed on the recording paper 3 will be equivalent to the target density that is desired to-be-measured and that is stored in the target data memory area 25e.

Next, the printing process will be described with reference to FIG. 20. FIG. 20 is a flowchart illustrating steps in the printing process. The printing process serves to calibrate a set density inputted from the PC 200 for one dither matrix, and is executed by the CPU 22 each time the laser printer 1 performs a printing process.

In S71 at the beginning of the printing process, the CPU 22 determines whether the PC 200 has inputted a set density for each dither matrix (standard mode cyan dither matrix, standard mode magenta dither matrix standard mode yellow dither matrix, standard mode black dither matrix, high-quality mode cyan dither matrix, high-quality mode magenta dither matrix, high-quality mode yellow dither matrix, or high-quality mode black dither matrix) If a set density has not been inputted for each dither matrix (S71: NO), the CPU 22 ends the printing process.

However, if a set density has been inputted for some dither matrix (S71: YES), then in S72 the CPU 22 acquires a calibration table corresponding to the inputted set density from the calibration table memory area 24d.

For example, when the set density is inputted for the standard mode cyan dither matrix, in S72 the CPU 22 acquires the standard mode cyan calibration table from the standard mode cyan calibration table memory area 24d1 (see FIG. 19(d)).

In S73 the CPU 22 calibrates the inputted set density based on the acquired calibration table, converts the calibrated set density into binary data by using the corresponding dither matrix, and outputs the binary data to the corresponding image-forming unit 20 (20C, 20M, 20Y, or 20K). Subsequently, the CPU 22 ends the printing process.

For example, when the inputted set density is for the standard mode cyan dither matrix in S73, the CPU 22 calibrates the inputted set density based on the standard mode cyan calibration table acquired in 372, converts the calibrated set density into binary data by using the standard mode cyan dither matrix, and outputs binary data to the image-forming unit 20C.

Here, the process in S73 will be described in detail with reference to FIG. 19(d). In this example, it will be assumed that the PC 200 has inputted a set density of 48% for the standard mode cyan dither matrix. The CPU 22 calibrates the set density 48% to 78% using the standard mode cyan calibration table stored in the standard mode cyan calibration table memory area 24d1, converts 78% into multivalue image data 198 (198=255×78/100), compares 198 with the threshold values in the standard mode cyan dither matrix into binary data, and outputs the binary data to the image-forming unit 20C. The binary data indicates that each dot location in the standard mode cyan dither matrix should be turned on or off.

As another example, if the PC 200 has inputted a set density of 91% for the standard mode cyan dither matrix, the CPU 22 calibrates 91% to 98% using the standard mode cyan calibration table, converts the calibrated set density into binary data by using the standard mode cyan dither matrix, and outputs the binary data to the image-forming unit 20C.

Hence, when printing a cyan image in standard mode on the recording paper 3 using the standard mode cyan dither matrix, the CPU 22 calibrates the set density for the standard mode cyan dither matrix using the standard mode cyan calibration table. In this way, even if the set density inputted from the PC 200 for the standard mode cyan dither matrix is too low or too high, the CPU 22 can print a cyan image using the standard mode cyan dither matrix at a density to be measured as equivalent to the target measured density in the standard mode cyan target data.

Through the printing process shown in FIG. 20, the CPU 22 can calibrate each set density inputted by the PC 200 for each dither matrix using the corresponding calibration table to form an image on the recording paper 3 at a density equivalent to the target measured density value stored in the target data memory area 25*e*.

In the embodiment described above, calibration of the laser printer 1 is performed by forming the reference density patches C1-K5 on the conveying belt 68 based on the reference density patch data stored in the reference density patch data memory area 24*a* and controlling the density sensor 80 to measure the density of each of the reference density patches C1-K5. The measured density for each of the reference density patches is stored in the reference density patch measured density memory area 25*b*. The CPU 22 also varies the set density for each dither matrix, i.e., varies the coverage of each dither matrix, and stores the set density for each dither matrix in the Corresponding density data memory area 25*a* at the point the coverage of the dither matrix has just reached or exceeded the coverage for the corresponding reference density patch stored in the reference density patch coverage memory area 24*b*.

Next, the CPU 22 stores the actual measured density for each of reference density patches C1-K5 which is stored in the reference density patch measured density memory area 25*b* in the corresponding measured density memory area 25*c* as the measured density of each dither matrix at one set density that is stored in the corresponding density data memory area 25*a* that allows the dither matrix to attain a coverage that has reached or exceeded the coverage of the subject reference density patch. In this way, the CPU 22 can set the measured density of each dither matrix for each set density stored in the corresponding density data memory area 25*a* without having to measure each dither matrix with the density sensor 80 for each set density stored in the corresponding density data memory area 25*a*.

The CPU 22 creates a calibration table, for each dither matrix based on the relationship between the reference density patch measured densities set by the CPU 22 in correspondence with the set densities for the each dither matrix and target values for measured densities corresponding to the set densities stored in the target data memory area 25*e*. The CPU 22 calibrates set densities of images to be formed by the image-forming units 20 using these calibration tables.

By forming the reference density patches C1-K5 on the conveying belt 68 and measuring the densities of the reference density patches C1-K5 with the density sensor 80, the CPU 22 can calibrate image densities without having to form density patches corresponding to each dither matrix on the conveying belt 68 and measuring the density patches with the density sensor 80. Hence, the present embodiment eliminates the need to form density patches according to each dither matrix, thereby reducing the required capacity of the device for storing density patches created for each dither matrix.

According to the embodiment described above, dither matrices are provided in the dither matrix memory area 24*c* for each of the plurality of resolutions (standard mode and high-quality mode), while the reference density patch data stored in the reference density patch data memory area 24*a* is created from only one type of a reference dither matrix. Therefore, the CPU 22 can create calibration tables using the reference density-patches C1-K5 created from only one type of reference dither matrix, even when a plurality of dither matrices are provided for each of the image resolutions, making it unnecessary to create density patches corresponding to dither matrices of the plurality of resolutions. Since the storage device need not store density patches created for dither matrices of the plurality of resolutions, the required capacity of the storage device can be reduced. Since the CPU 22 forms the reference density patches C1-K5 created from a single type of reference dither matrix on the conveying belt 68 when creating calibration tables and measures the reference density patches C1-K5 with the density sensor 80, it becomes unnecessary to form density patches based on dither matrices of the plurality of resolutions (standard mode and high-quality mode) on the conveying belt 68 and to measure the density patches for all resolutions with the density sensor so, thereby reducing the time required for creating calibration tables.

According to the embodiment described above, a dither matrix is provided in the dither matrix memory area 24*c* for each color (cyan, magenta, yellow, or black), while the reference density patch data stored in the reference density patch data memory area 24*a* is created from a single reference dither matrix. Accordingly, the CPU 22 can create calibration tables using the reference density patches C1-K5 created from only one reference dither matrix, even when a dither matrix is provided for each image color, thereby eliminating the need to create density patches for a dither matrix of each color. Hence, the storage device need not store density patches corresponding to the dither matrix for each color, reducing the required capacity of the storage device. Further, since the CPU 22 forms the reference density patches C1-K5 created from the single reference dither matrix on the conveying belt 68 and measures the densities of the reference density patches C1-K5 with the density sensor 80 when creating calibration tables, it is unnecessary to form density patches on the conveying belt 58 for the dither matrix in each color and measuring the densities of the density patches for each color with the density sensor 80, reducing the time required for creation of the calibration tables.

A laser printer 1001 and a PC 1125 according to a second embodiment will be described as reference to FIGS. 21 through 36, except for the points the same as the first embodiment described above.

As shown in FIG. 21*i* the laser printer 1001 in the same as the laser printer 1 of the first embodiment except that the laser printer 1001 includes a flash memory 124 and RAM 125 instead of the flash memory 24 and the RAM 25. The flash memory 124 includes the reference density patch data memory area 24*a* similarly to the flash memory 24 of the first embodiment, but does not include the reference density patch coverage memory area 24*b*, the dither matrix memory area 24*c*, or the calibration table memory area 24*d*.

As shown in FIG. 22, similarly to the RAM 25 in the first embodiment, the RAM 125 has the reference density patch measured density data memory area 25*b*. The RAM 125 further has a character string storage memory area 125*a*, a density patch data memory area 125*c*, and a measured density data memory area 125*d*.

The character string storage memory area 125*a* stores a character string received from the PC 1125 enabling the laser printer 1001 to recognize a process being executed by the PC 1125. The CPU 22 of the laser printer 1001 changes the process being executed based on the character string stored in the character string storage memory area 125*a*. The character string in the character string storage memory area 125*a* is updated each time a character string is received from the PC 1125.

The density patch data memory area 125*c* stores density patch data transferred from the PC 1125. The PC 1125 transmits eight types of density patch data, including standard mode cyan density patch data, standard mode magenta density patch data, standard mode yellow density patch data, standard mode black density patch data, high-quality mode cyan density patch data, high-quality mode magenta density patch data, high-quality mode yellow density patch data, and high-quality mode black density patch data.

The density patch data memory area 125c includes standard mode cyan density patch data memory area 125c1 storing the standard mode cyan density patch data, standard mode magenta density patch data memory area 125c2 storing the standard mode magenta density patch data, standard mode yellow density patch data memory area 125c3 storing the standard mode yellow density patch data, standard mode black density patch data memory area 125c4 storing the standard mode black density patch data, high quality mode cyan density patch data memory area 125c5 storing the high-quality mode cyan density patch data, high-quality mode magenta density patch data memory area 125c6 storing the high-quality mode magenta density patch data, high-quality mode yellow density patch data memory area 125c7 storing the high-quality mode yellow density patch data, and high-quality mode black density patch data memory area 125c8 storing the high-quality mode black density patch data.

When density patch data is stored in the density patch data memory area 125c, the CPU 22 can form patches, for example, on the conveying belt 68 based on the density patch data. More specifically, the CPU 22 can read the density patch data from the density patch data memory area 125c and form density patches on the conveying belt 68 based on the density patch data. For example, when standard mode cyan density patch data is stored in the standard mode cyan density patch data memory area 125c1, the CPU 22 can form standard mode cyan density patches on the conveying belt 65. Each of the density patch data memory area 125c2-125c8 has the same configuration as the standard mode cyan density patch data memory area 125c1, except that the each density patch data memory area 125c2-125c8 stores corresponding density patch data.

The measured density data memory area 125d includes standard mode cyan measured density data memory area 125d1, standard mode magenta measured density data memory area 125d2, standard mode yellow measured density data memory area 125d3, standard mode black measured density data memory area 125d4, high-quality mode cyan measured density data memory area 125d5, high-quality mode magenta measured density data memory area 125d6, high-quality mode yellow measured density data memory area 125d7, and high-quality mode black measured density data memory area 125d8.

The standard mode cyan measured density data memory area 125d1 stores measured densities of standard mode cyan density patches formed on the conveying belt 68 and measured by the density sensor 80. Each of the measured density data memory area 125d2 through 125d8 has the same configuration with the standard mode cyan measured density data memory area 125d1, except that each measured density data memory area 125d2-1258 stores measured densities of the corresponding density patches.

The PC 1125 includes a CPU 1126, a ROM 1127, a HDD 1128, a RAM 1129, a network interface 1130, an input device 1131, a display device 1132, and an I/O port 1133. The CPU 1126 is a microprocessor for executing various programs stored in the ROM 1127. The ROM 1127 is a read-only memory for storing programs executed by the CPU 1126 and for storing constants and tables that the CPU 22 refers to when executing the programs. The HDD 1128 is a rewritable memory device storing various data that can be overwritten when the power is on and is capable of preserving the memory content when the power is off. The RAM 1129 has a work area in which the CPU 1126 temporarily stores variables and the like when executing programs.

As shown in FIG. 23, the HDD 1128 includes a printer driver area 1128a, and the corresponding density data memory area 25a and the calibration table memory area 24d that are provided in the laser printer 1 according to the first embodiment.

The printer driver area 1128a has a memory area (not shown) for storing a printer driver. The printer driver area 1128a further includes the standard mode cyan dither matrix memory area 24c1, standard mode magenta dither matrix memory area 24c2, standard mode yellow dither matrix memory area 24c3, standard mode black dither matrix memory area 24c4, high-quality mode cyan dither matrix memory area 24c5, high-quality mode magenta dither matrix memory area 24c6, high-quality mode yellow dither matrix memory area 24c7, and high-quality mode black dither matrix memory area 24c8, which are provided in the laser printer 1 according to the first embodiment.

When printing a standard mode cyan image on the recording paper 3, for example, the CPU 1126 of the PC 1125 transmits binary image data that is converted from multivalue image data by using the standard mode cyan dither matrix stored in the standard mode cyan dither matrix memory area 24c1 to the laser printer, 1001. The CPU 22 of the laser printer 1001 forms a cyan image based on the binary image data using the image-forming unit 20C.

The CPU 1126 of the PC 1125 can overwrite the dither matrices stored in the printer driver area 1128a of the HDD 1128.

As shown in FIG. 24, the RAM 1129 has the corresponding measured data memory area 25c1, the interpolation data memory area 25d, and the target data memory area 25e that are provided in the laser printer 1 according to the first embodiment. The RAM 1129 further has a density patch data memory area 1129a, a dither patch measured density data memory area 1129b, a reference density patch measured density data memory area 1129c, and an interpolation density data memory area 1129d.

The density patch data memory area 1129a stores density patch data for forming density patches on the conveying belt 68 at the set densities created for each dither matrix. The density patch data memory area 1129a includes standard mode cyan density patch data memory area 1129a1, standard mode magenta density patch data memory area 1129a2, standard mode yellow density patch data memory area 1129a3, standard mode black density patch data memory area 1129a4, high-quality mode cyan density patch data memory area 1129a5, high-quality mode magenta density patch data memory area 1129a6, high-quality mode yellow density patch data memory area 1129a7, and high-quality mode black density patch data memory area 1112a8.

The standard mode cyan density patch data memory area 1129a1 stores binarized patterns CP1-CP5 that are obtained from the standard mode cyan dither matrix stored in the standard mode cyan dither matrix memory area 24c1 for cases in which the set densities are 20%, 40%, 60%, 80%, and 100%, respectively.

Each of the density patch data memory areas 1129a2-1129a8 has the same configuration as the standard mode density patch data memory area 1129a1. That is, each density patch data memory area 1129a2-1129a8 stores density patch data that is created for the set densities of 20%, 40%, 60%, 80%, and 100%, from a corresponding dither matrix stored in the corresponding area 24c2-24c8.

The PC 1125 transmits the density patch data stored in the density patch data memory area 1129a to the laser printer 1001 to be stored in the density patch data memory area 125c.

The dither patch measured density data memory area 1129b stores the measured density of each density patch that is stored in the measured density data memory area 125*d* in the laser printer 1001 and that is transmitted from the laser printer 1001.

The dither patch measured density data memory area 1129*b* is configured of a total of eight memory areas corresponding to the memory areas of the measured density data memory area 125*d* in the laser printer 1001. Specifically, the dither patch measured density data memory area 1129*b* includes a standard mode cyan dither patch measured density data memory area 1129*b*1, standard mode magenta dither patch measured density data memory area 1129*b*2, standard mode yellow dither patch measured density data memory area 1129*b*3, standard mode black dither patch measured density data memory area 1129*b*4, high-quality mode cyan dither patch measured density data memory area 1129*b*5, high-quality mode magenta dither patch measured density data memory area 1129*b*6, high-quality mode yellow dither patch measured density data memory area 1129*b*7, and high-quality mode black dither patch measured density data memory area 1129*b*8.

As shown in FIG. 35, the standard mode cyan dither patch measured density data memory area 1129*b*1 stores data of the measured densities that are stored in the standard cyan measured density data memory area 125*d*1 in the laser printer 1001 and that are transmitted from the laser printer 1001. Each of measured density data memory areas 1129*b*2-1129*b*5 has the same configuration as the standard mode cyan dither patch measured density data memory area 1129*b*1. That is, each dither patch measured density data memory area 1129*b*2-1129*b*8 stores measured densities that are stored in the corresponding measured density data memory 125*b*2-125*b*8 in the laser printer 1001 and that are transmitted from the laser printer 1001.

The reference density patch measured density data memory area 1129*c* stores measured densities for the reference density patches C1-K5.

The measured densities stored in the reference density patch measured density data memory area 1129*c* are updated each time the PC 1125 receives from the laser printer 1001 data of the measured densities for the reference density patches C1-K5 that is stored in the reference density patch measured density data memory area 25*b* of laser printer 1001 (see FIG. 22).

The reference density patch measured density data memory area 1129*c* is configured of a total of four memory areas corresponding to measured densities of the reference density patches C1-K5 transmitted from the laser is printer 1001. Specifically, the reference density patch measured density data memory area 1129*c* includes a reference density patch cyan measured density data memory area 1129*c*1 for storing measured densities of the cyan density patches C1-C5, a reference density patch magenta measured density data memory area 1129*c*2 for storing measured densities of the magenta density patches M1-M5, a reference density patch yellow measured density data memory area 1129*c*3 for storing measured densities of the yellow density patches Y1-Y5, and a reference density patch black measured density data memory area 1129*c*4 for storing measured densities of the black density patches K1-K5.

The interpolation density data memory area 1129*d* stores interpolation data obtained by performing linear interpolation on the measured data stored in the measured density memory area 1129*c*.

The interpolation density data memory area 1129*d* has a total of eight memory areas corresponding to each of the dither matrices stored in the dither patch measured density data memory area 1129*b*. Specifically, the interpolation density data memory area 1129*d* includes a standard mode cyan interpolation density data memory area S1129*d*1, a standard mode magenta interpolation density data memory area 1129*d*2, a standard mode yellow interpolation density data memory area 1129*d*3, a standard mode black interpolation density data memory area 1129*d*4, a high-quality mode cyan interpolation density data memory area 1129*d*5, a high-quality mode magenta interpolation density data memory area 1129*d*6, a high-quality mode yellow interpolation density data memory area 1129*d*7, and a high-quality mode black interpolation density data memory area 1129*d*8.

As shown in FIG. 36, the standard mode cyan interpolation density data memory area 1129*d*1 stores standard mode cyan interpolation data obtained by performing linear interpolation on the measured data stored in the standard mode cyan dither patch measured density data memory area 1129*b*1. Each of interpolation density data memory areas 1129*d*2-1129*d*3 has the same configuration as the standard mode cyan interpolation density data memory area 1129*d*1 except for the values of the stored interpolation data. That is, each interpolation density data memory area 1129*d*2-1129*d*58 stores interpolation data obtained by performing linear interpolation on the measured data stored in the corresponding measured density data memory area 1129*b*2-1129*b*8.

Returning to FIG. 21, the network interface 1130 is connected to the I/O port 1133 and to the network interface 28 of the laser printer 1001 and functions as a communication interface using the USB standard, for example. The network interface 1130 receives various data or commands from the network interface 28 and outputs the received data and commands to the CPU 1126 of the PC 1125 via the I/O port 1133.

The input device 1131 is connected to the I/O port 1133 and is an operating device for operating the PC 1125. The display device 1132 is connected to the I/O port 1133 and functions to display the state of the PC 1125 and various other data.

Figure 29:
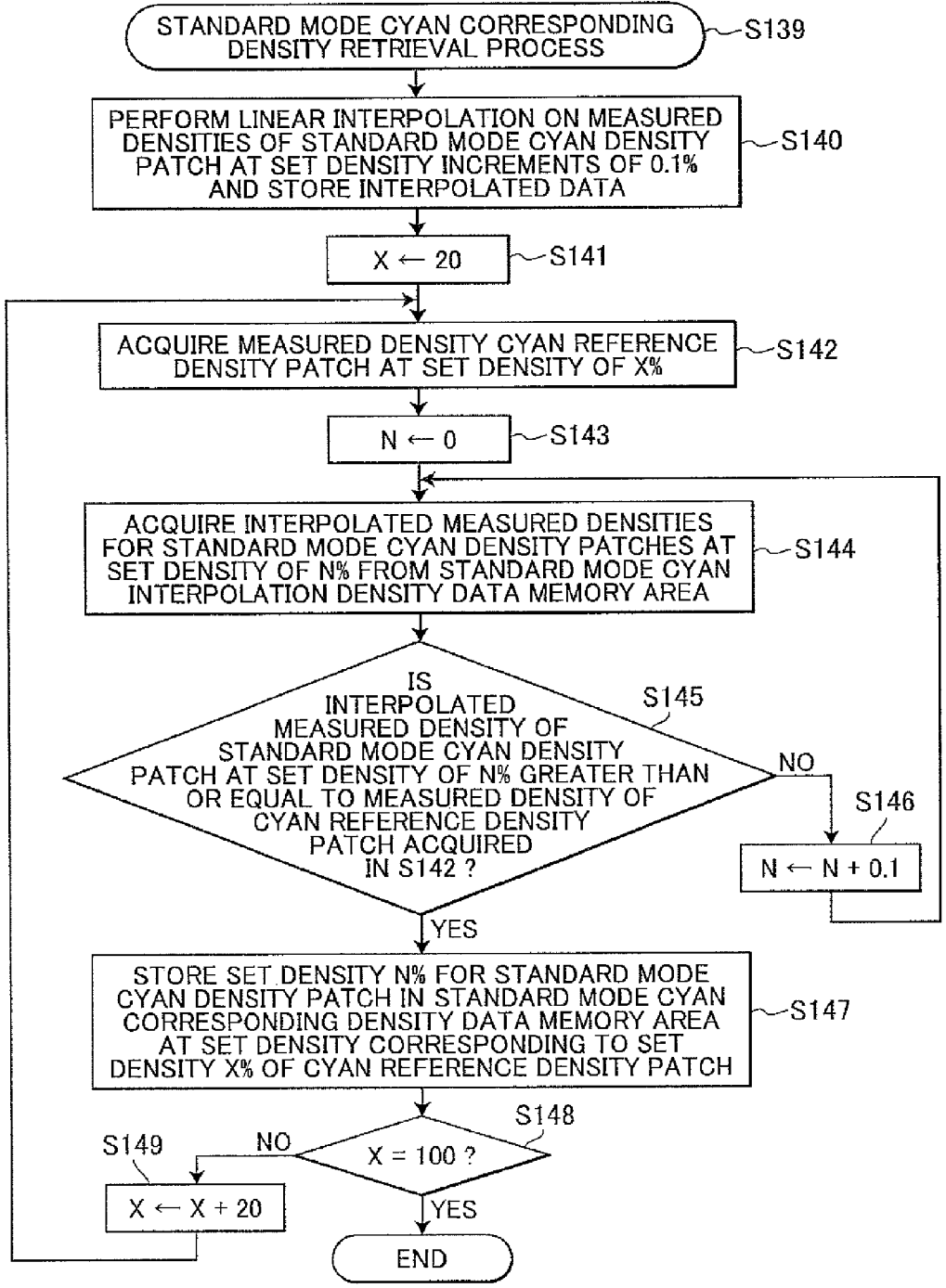
FIG. 29 is a flowchart illustrating steps in a standard mode cyan corresponding density retrieval process executed by the CPU of the PC.
Figure 30:
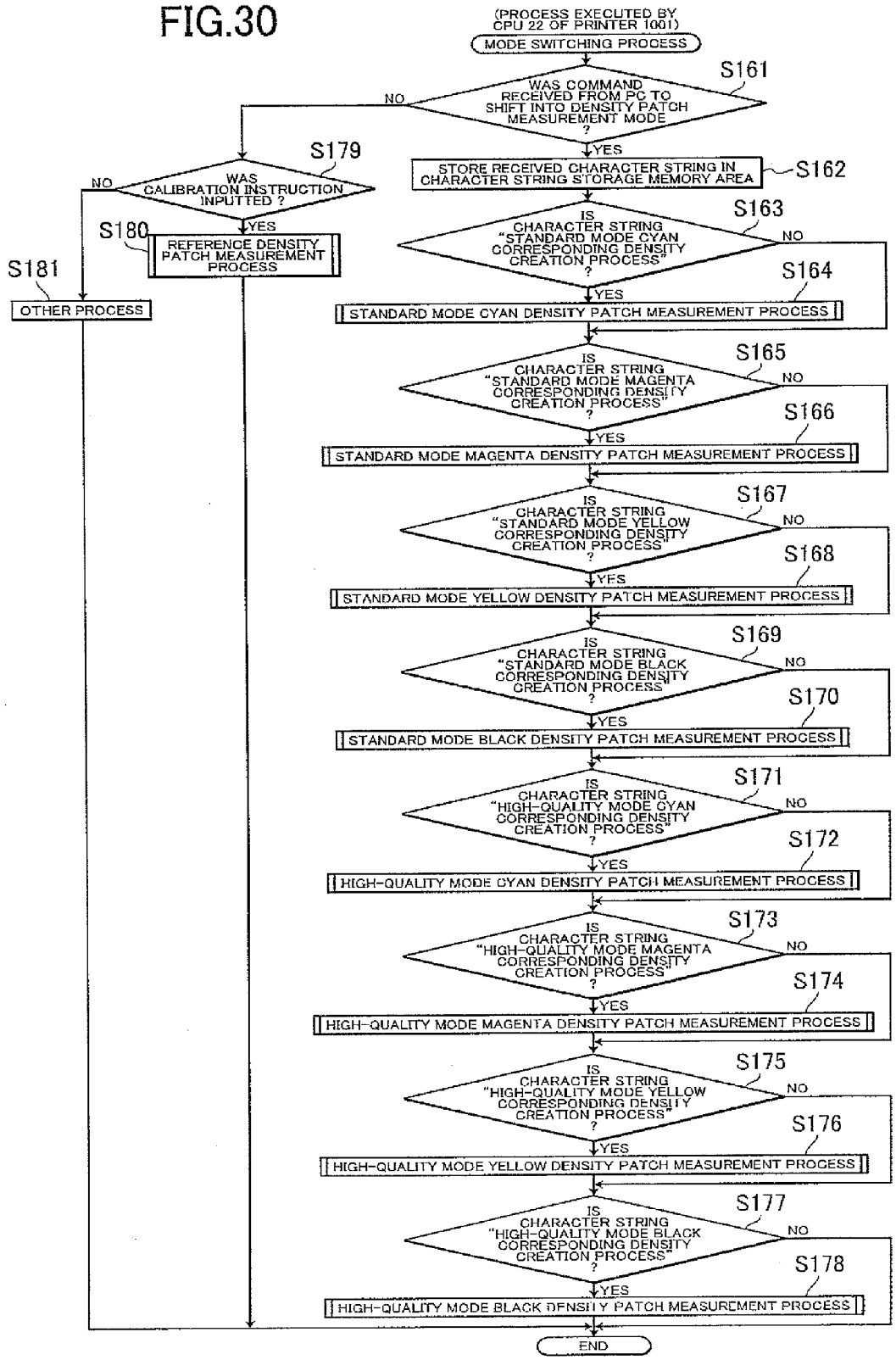
FIG. 30 is a flowchart illustrating steps in a mode switching process executed by the CPU of the printer.

The PC 1125 executes a printer driver updating process (FIGS. 26 through 29), a calibration table creation process (FIG. 33) and a PC-side calibration process (FIG. 34), and the laser printer 1001 executes a mode switching process (FIGS. 30 through 32). Thus, the PC 1125 and the laser printer 1001 share the process to create the corresponding density data and store the same in the corresponding density data area 25*a* and to create calibration tables and store the same in the calibration table memory area 24*d*.

First, the printer driver updating process executed by the CPU 1126 of the PC will be, described with reference to FIGS. 26 through 29. The printer driver updating process is performed to determine whether dither matrices stored in the printer driver area 1128*a* have changed in association with changes in the printer driver stored in the printer driver area 1128*a* (see FIG. 23) and to jump to a process for updating corresponding density data stored in the corresponding density data area 25*a* when the dither matrices stored in the printer driver area 1128*a* have changed.

The CPU 1126 of the PC 1125 executes the printer driver updating process when the operator has given an instruction to change the printer driver stored in the printer driver area 1128*a* of the HDD 1128 (see FIG. 23).

In S101 of the printer driver updating process, the CPU 1126 updates the printer driver stored in the printer driver area 1128*a*. In S102 the CPU 1126 determines whether there is an update for the dither matrices stored in the printer driver area 1128*a*.

If no update exists for the dither matrices (S102: NO), the CPU 1126 ends the printer driver updating process since there is no need to update the corresponding density data stored in the corresponding density data area 25*a* (see FIG. 23).

However, if an update exists for the dither matrices (S802: YES), then in S103 the CPU 1126 advances to a corresponding density creation process for updating the corresponding density data stored in the corresponding density data area 25*a* (set densities for the dither matrices required to achieve substantially the same measured densities as those of the density patches C1-K5).

Here, updating the dither matrices includes the case of updating the dither matrices already stored in the printer driver area 1128*a*, as well as the case of initially storing the dither matrices in the printer driver area 1128*a*.

After completing the corresponding density creation process in 3103, the CPU 1126 ends the printer driver updating process since the corresponding density data has been updated in the corresponding density data area 25*a* (see FIG. 23).

Figure 27:
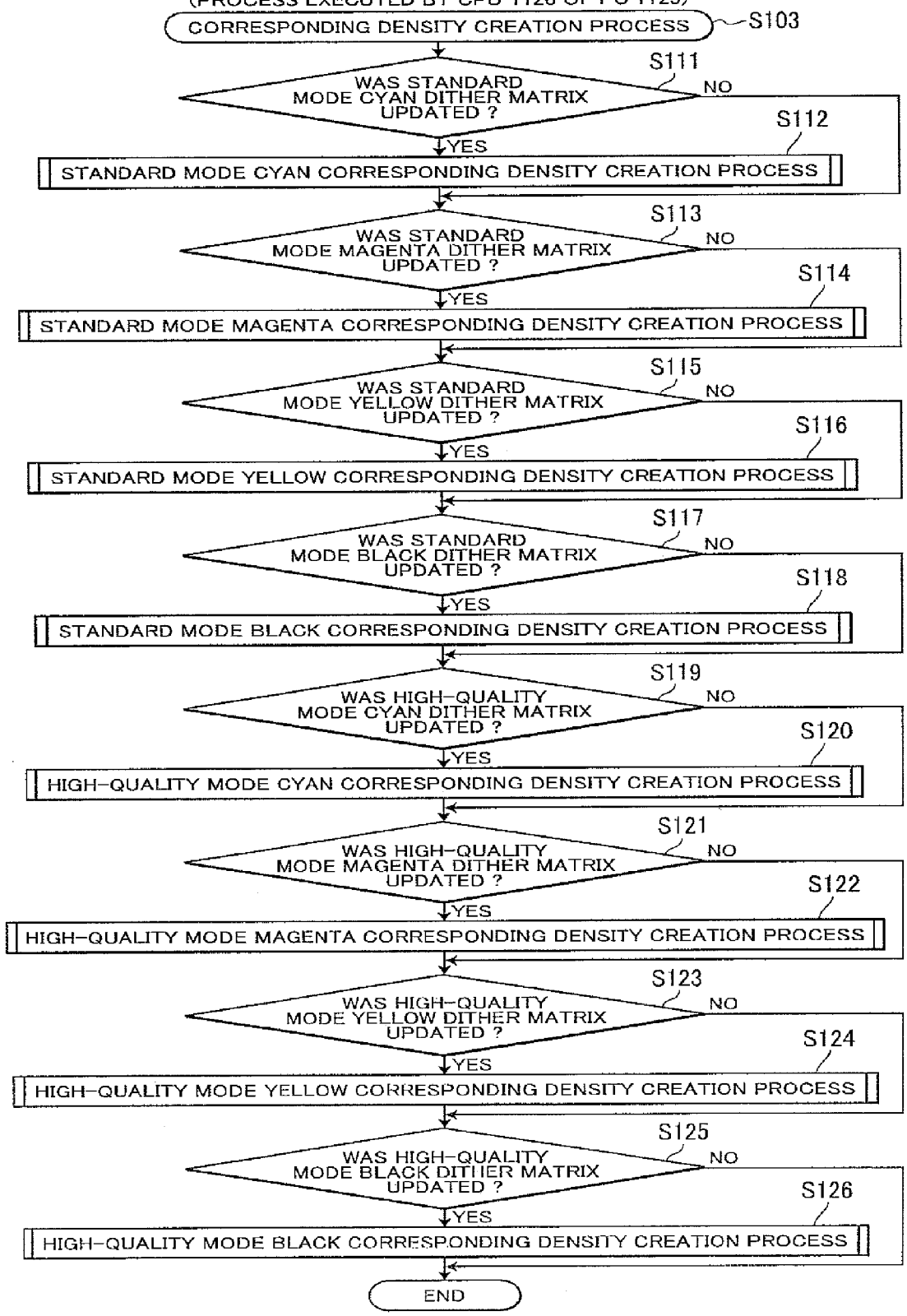
FIG. 27 is a flowchart illustrating steps in a corresponding density creation process executed by the CPU of the PC.

As shown in FIG. 27, the corresponding density creation process is performed to execute a process for retrieving dither matrices updated according to an update of the printer driver, and a process for creating corresponding density data for the updated dither matrices and storing the same in the corresponding density data area 25*a* (see FIG. 23).

In S111 of the corresponding density creation process, the CPU 1126 determines whether the standard mode cyan dither matrix stored in the standard mode cyan dither matrix memory area 24*c*1 has been updated. If the standard mode cyan dither matrix has been updated (S111: YES), then in S112 the CPU 1126 jumps to a standard mode cyan corresponding density creation process for creating standard mode cyan corresponding density data and storing the same in the standard mode cyan corresponding density data area 25*a*1 (see FIG. 17).

However, if the standard mode cyan dither matrix has not been updated (S111: NO), then in S113 the CPU 1126 determines whether the standard mode magenta dither matrix stored in the standard mode magenta dither matrix memory area 24*c*2 has been updated.

If the standard mode magenta dither matrix has been updated (S113: YES), then in S114 the CPU 1126 jumps to a standard mode magenta corresponding density creation process for creating standard mode magenta corresponding density data and storing the same in the standard mode magenta corresponding density data area 25*a*2.

However, if the standard mode magenta dither matrix has not been updated (S113: NO), then in S115 the CPU 1126 determines whether the standard mode yellow dither matrix stored in the standard mode yellow dither matrix memory area 24*c*3 has been updated.

If the standard mode yellow dither matrix has been updated (S115: YES), then in S116 the CPU 1126 jumps to a standard mode yellow corresponding density creation process for creating standard mode yellow corresponding density data and storing the same in the standard mode yellow corresponding density data area 25*a*3.

However, if the standard mode yellow dither matrix has not been updated (S115: NO), then in S117 the CPU 1126 determines whether the standard mode black dither matrix stored in the standard mode black dither matrix memory area 24*c*4 has been updated.

If the standard mode black dither matrix has been updated (S117: YES), then in S118 the CPU 1126 jumps to a high-quality mode cyan corresponding density creation process for creating high-quality mode cyan corresponding density data and storing the same in the high-quality mode cyan corresponding density data area 25*a*5.

However, if the standard mode black dither matrix has not been updated (3117: NO), then in S119 the CPU 1126 determines whether the high-quality mode cyan dither matrix stored in the high-quality mode cyan dither matrix memory area 24*c*5 has been updated.

If the high-quality mode cyan dither matrix has been updated (S119: YES), then in S120 the CPU 1126 jumps to a high-quality mode cyan corresponding density creation process for creating high-quality mode cyan corresponding density data and storing the same in the high-quality mode cyan corresponding density data area 25*a*5.

However, if the high-quality mode cyan dither matrix has not been updated (S119: NO), then in S121 the CPU 1126 determines whether the high-quality mode magenta dither matrix stored in the high-quality mode magenta dither matrix memory area 24*c*6 has been updated.

If the high-quality mode magenta dither matrix has been updated (S121: YES, then in S122 the CPU 1126 jumps to a high-quality mode magenta corresponding density creation process for creating high-quality mode magenta corresponding density data and storing the same in the high-quality mode magenta corresponding density data area 25*a*6.

However, if the high-quality mode magenta dither matrix has not been updated (S121: NO), then in S123 the CPU 1126 determines whether the high-quality mode yellow dither matrix stored in the high-quality mode yellow dither matrix memory area 24*c*7 has been updated.

If the high-quality mode yellow dither matrix has been updated (S121: YES), then in S122 the CPU 1126 jumps to a high-quality mode yellow corresponding density creation process for creating high-quality mode yellow corresponding density data and storing the same in the high-quality mode yellow corresponding density data area 25*a*7.

However, if the high-quality mode yellow dither matrix has not been updated (S121: NO), then in 3123 the CPU 1126 determines whether the high-quality mode black dither matrix stored in the high-quality mode black dither matrix memory area 24*c*8 has been updated.

If the high-quality mode yellow dither matrix has been updated (S123: YES), then in S124 the CPU 1126 jumps to a high-quality mode yellow corresponding density creation process for creating high-quality mode yellow corresponding density data and storing the same in the high-quality mode yellow corresponding density data area 25*a*7.

However, if the high-quality mode yellow dither matrix has not been updated (S123; NO), then in S125 the CPU 1126 determines whether the high-quality mode black dither matrix stored in the high-quality mode black dither matrix memory area 24*c*8 has been updated.

If the high-quality mode black dither matrix has been updated (S125: YES), then in S126 the CPU 1126 of the PC 1125 jumps to a high-quality mode black corresponding density creation process for creating high-quality mode black corresponding density data and storing the same in the high-quality mode black corresponding density data area 25*a*8.

However, if the high-quality mode black dither matrix has not been updated (S125: NO), then the CPU 1126 stops determining whether the dither matrices stored in the dither matrix memory area 24*c* have been updated. S0, the corresponding density creation process ends.

Through the corresponding density creation process, the CPU 1126 performs a process for retrieving dither matrices updated according to the update of the printer driver, and a process for creating corresponding density data and storing the same in the corresponding density data area 25*a*.

Next, the standard mode cyan corresponding density creation process of S112 will be described with reference to FIG. 28. The standard mode cyan corresponding density creation process is configured of a process for creating density patch data using the standard mode cyan dither matrix and for transmitting this density patch data to the laser printer 1001; a process for receiving measured densities of density patches from the laser printer 1001; and a process for receiving measured densities of the cyan reference density patches C1-C5 transmitted from the laser printer 1001.

In S131 of the standard mode cyan corresponding density creation process, the CPU 1126 of the PC 1125 creates standard mode cyan density patch data having binarized patterns CP1-CP5 for the set densities 20%, 40%, 60%, 80%, and 100% using the standard mode cyan dither matrix (see FIG. 15) stored in the standard mode cyan dither matrix memory area 24$c$1, and stores the created standard mode cyan density patch data in the standard mode cyan density patch data memory area 1129$a$1. The binarized patterns CP1-CP4 are shown in FIG. 25($a$) through 25($d$). The binarized pattern CP5 has all the dots being turned on.

In S132 the CPU 1126 of the PC 1125 transmits a command and a character string to the laser printer 1001, the command functioning to shift the state of the laser printer 1001 to a density patch measuring mode and the character string "standard mode cyan corresponding density creation process," informing the laser printer 1001 of the name of the process to be executed. Upon receiving the command, the CPU 22 of the laser printer 1001 shifts the is state of the laser printer 1001 to the density patch measuring mode for measuring density patches, thereby setting the laser printer 1001 in a state capable of receiving standard mode cyan density patch data from the PC 1125.

In S133 the CPU 1126 of the PC 1125 transmits standard mode cyan density patch data stored in the standard mode cyan density patch data memory area 1129$a$1 for set densities 20%, 40%, 60%, 80%, and 100% to the laser printer 1001. Upon receiving the standard mode cyan density patch data, the CPU 22 of the laser printer 1001 forms cyan density patches CP1-CP5 on the conveying belt 68 based on the standard mode cyan density patch data, measures the cyan density patches with the density sensor 80, and transmits the measured densities to the PC 1125.

In S134 the CPU 1126 determines whether the measured densities of the standard mode cyan density patches have been received from the laser printer 1001. If the measured densities have not been received from the laser printer 1001 (S134: NO), the CPU 1126 continues to loop back to S134 until the measured densities have been received.

When the measured densities of the standard mode cyan density patches have been received from the laser printer 1001 (S134: YES), in S135 the CPU 1126 of the PC 1125 stores the measured densities of the standard mode cyan density patches for set densities 20%, 40%, 60%, 80%, and 100% in the standard mode cyan dither patch measured density data memory area 1129$b$1 (see FIG. 35).

In the example of FIG. 35, the density of the standard mode cyan density patch measured by the density sensor 80 of the laser printer 1001 is 0.12, 0.21, 0.34, 0.54, and 1.00 for the set density of 20%, 40%, 60%, 80%, and 100%.

Accordingly, the standard mode cyan measured density data stored in the standard mode cyan dither patch measured density data memory area 1129$b$1 is configured of measured densities for the standard mode cyan density patches for set densities 20%, 40%, 60%, 80%, and 100%.

Returning to FIG. 28, in S136 the CPU 1126 transmits a command to the laser printer 1001 instructing the laser printer 1001 to measure densities of the cyan reference density patches C1-C5 with the density sensor 80. Upon receiving this command, the CPU 22 of the printer 1001 forms the cyan reference density patches C1-C5 on the conveying belt 68 as shown in FIG. 12, measures the densities of the cyan reference density patches C1-C5 with the density sensor 80, and transmits the measured densities to the PC 1125.

In S137 the CPU 1126 determines whether measured densities for the cyan reference density patches C1-C5 have been received from the laser printer 1001. If measured densities have not been received from the laser printer 1001 (S137: NO), the CPU 1126 continues to loop back to S137 until the measured densities have been received.

When measured densities for the cyan reference density patches C1-C5 have been received from the laser printer 1001 (S137: YES), in S138 the CPU 1126 stores the measured densities of the cyan reference density patches C1-C5 in the reference density patch cyan measured density data memory area 1119$c$1 and in S139 jumps to a standard mode cyan corresponding density retrieval (searching) process. After completing the standard mode cyan corresponding density retrieval (searching) process in S19, the CPU 1126 ends the standard mode cyan corresponding density creation process.

The configuration of the reference density patch cyan measured density data memory area 1129$c$1 is identical to the cyan reference measured density data memory area 25$b$1 (see FIG. 13). The reference density patch cyan measured density data is 0.15, 0.25, 0.40, 0.62, and 1.00 for the set density of 20%, 40%, 60%, 80%, and 100%, respectively.

Figure 28:
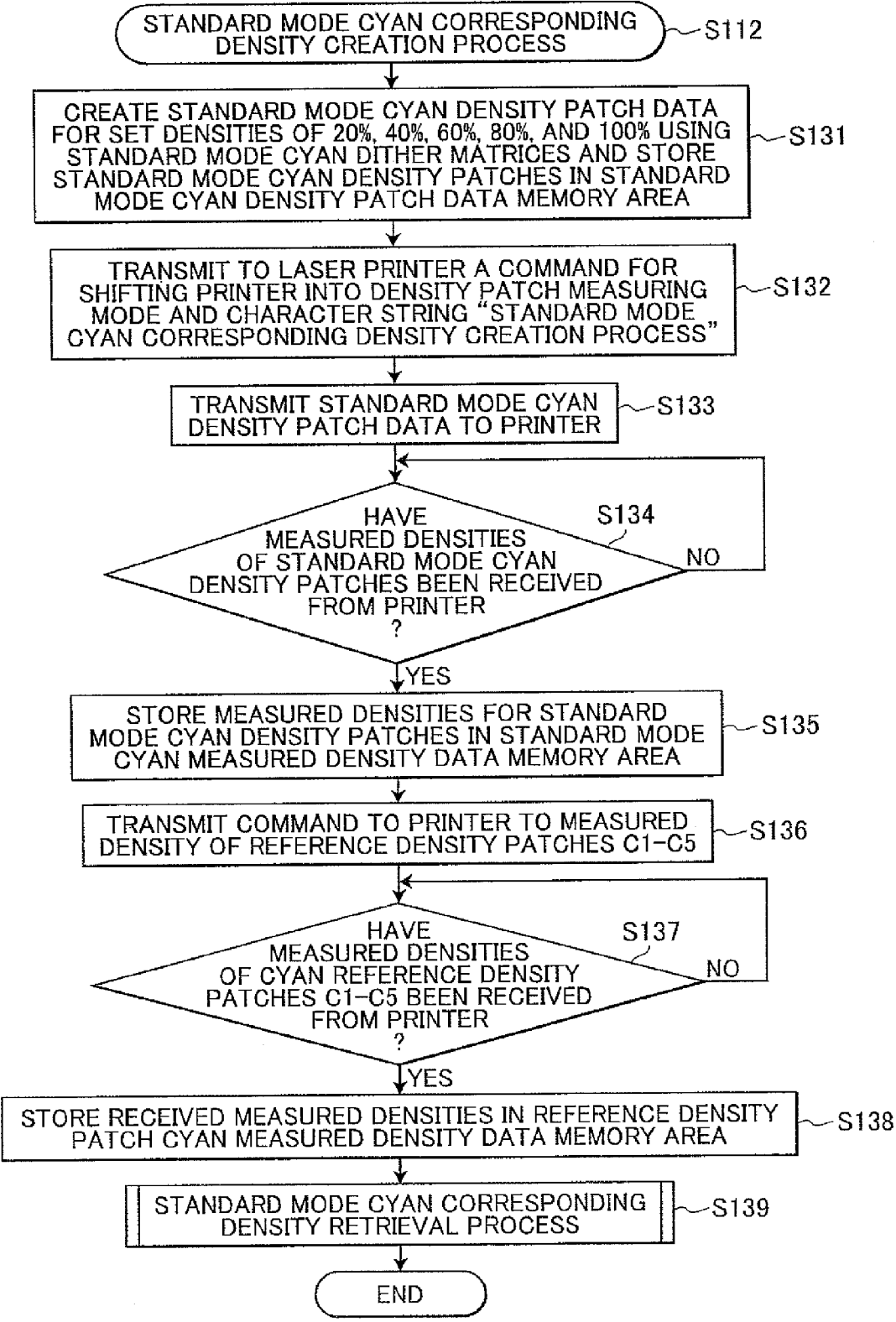
FIG. 28 is a flowchart illustrating steps in a standard mode cyan corresponding density creation process executed by the CPU of the PC.

The reference density patch cyan measured density data stored in the reference density patch cyan measured density data memory area 1129$c$1 (see FIG. 13) indicates measured densities of the cyan density patches C1-C5 received in S137 of the standard mode cyan corresponding density creation process in FIG. 28.

Accordingly, the reference patch cyan measured density data stored in the reference density patch cyan measured density data memory area 1129$c$1 (see FIG. 23) is configured of measured densities for the cyan density patches C1-C5.

Through the process of S131 through S138, the CPU 1126 creates standard mode cyan measured density data and the stores the same in the standard mode cyan dither patch measured density data memory area 1129$b$1, and creates reference density patch cyan measured density data and stores the same in the reference density patch cyan measured density data memory area 129$c$1.

The standard mode cyan corresponding density retrieval process of S139 is performed to create standard mode cyan corresponding density data based on the standard mode cyan measured density data stored in S135 and the reference density patch cyan measured density data stored in S138, and to store the standard mode cyan corresponding density data in the standard mode cyan corresponding density data area 25$a$1 (see FIG. 17).

As shown in FIG. 29, in S140 of the standard mode cyan corresponding density retrieval process, the CPU 1126 performs linear interpolation on measured densities stored in the standard mode cyan dither patch measured density data memory area 1129$b$1 (see FIG. 35) at set density increments of 0.1% and stores the interpolated data in the standard mode cyan interpolation density data memory area 1129$d$1 (see FIG. 36).

In S141 of FIG. 29, the CPU 1126 sets a set density X for the cyan reference density patch to 20%. In S142 the CPU 1126 acquires the measured density of the density patch C1 corresponding to the set density of 20% from the reference density patch cyan measured density data memory area 1129$c$1 (see FIG. 13).

In S143 the CPU 1126 sets a variable N for the set density of the standard mode cyan density patch to 0, and in S144 acquires the measured density interpolated from the standard mode cyan density patch for a set density of 0% from the standard mode cyan interpolation density data memory area 1129*d*1 (see FIG. 36).

In S145 the CPU 1126 determines whether the interpolated measured density of the standard mode cyan density patch acquired for the set density N of 0% is no less than the measured density of the cyan density patch C1 acquired in S142 for the set density of 20%.

By calculating standard mode cyan interpolation density data by performing linear interpolation on the measured densities of the standard mode cyan density patch data stored in the standard mode cyan dither patch measured density data memory area 1129*b*1, the CPU 1126 can easily compare the interpolated measured is densities with the reference density patch cyan measured density data stored in the reference density patch cyan measured density data memory area 1129*c*1 in S145.

In this examples the measured density interpolated from the standard mode cyan density patch is 0 for the set density of 0% (see FIG. 36), while the reference measured density of the cyan reference density patch C1 at the set density of 20% is 0.15 (see FIG. 18). Therefore, the interpolated measured density is less than the measured density acquired in S142 (S145: NO). Accordingly, in S146 the CPU 1126 increments the set density N for the standard mode cyan density patch by 0.1 and subsequently returns to S144.

Since the set density N for the standard mode cyan density patch is now 0.1, in S144 the CPU 1126 acquires the measured density interpolated from the standard mode cyan density patch for the set density of 0.1% from the standard mode cyan interpolation density data memory area 1129*d*1. In S145 the CPU 1126 determines again whether the interpolated measured density is greater than or equal to the measured density of 0.15 for the cyan reference density patch C1 at the set density of 20%.

In this way, the CPU 1126 repeatedly performs the process in S144-S146, increasing the set density by 0.1 increments until the interpolated measured density of the standard mode cyan density patch exceeds the measured density of 0.15 acquired in S142 for the cyan reference density patch C1 at the set density of 20%.

In the example shown in FIG. 36, the interpolated measured density exceeds the measured density of 0.15 for the density patch C1 at the set density of 20% when the set density of N for the standard mode cyan density patch is 27.0%. At this time, the CPU 1126 reaches a YES determination in S145 and advances to S147.

In S147 the CPU 1126 stores the set density N of 27.0% for the standard mode cyan density patch in the standard mode cyan corresponding density data area 25*a*1 as the set density corresponding to the set density X of 20% for the cyan reference density patch as indicated in parenthesis in FIG. 17. In S148 the CPU 1126 determines whether the set density of the cyan reference density patch has reached 100%. If the set density of the cyan reference density patch has not reached 80% (S148: NO), in S149 the CPU 1126 increments the set density X by 20 and returns to S142.

The CPU 1126 ends the standard mode cyan corresponding density retrieval process of S139 upon determining in S148 that the set density of the cyan reference density patch is 100% (S148: YES) since the process from S142 has been completed for the measured densities of all cyan reference density patches C1-C5.

By increasing the set density N of the standard mode cyan density patch by 0.1 increments in order to find the set density N for which the interpolated measured density has first reached or exceeded the measured density of the cyan reference density patches C1-C5 at each set density 20%, 40%, 60%, 80%, or 100%, the CPU 1126 can retrieve a set density for the standard mode cyan density patch for which the measured density is substantially equivalent or equal to the measured density of the cyan reference density patches C1-C5 at each of the above set densities.

Since the CPU 1126 determines in S145 whether the measured density of the standard mode cyan density patch at the set density N reaches or exceeds the measured density of the corresponding cyan density patches C1-C5 acquired in S142, the CPU 1126 can account for errors in calculating the standard mode cyan interpolation density data through linear interpolation.

The thus created standard mode cyan corresponding density data area 25*a*1 stores set densities for the standard mode cyan dither matrices corresponding to the set densities of the cyan density patches C1-C5 as shown in FIG. 17. For example, the standard mode cyan corresponding density data area 25*a*1 stores a set density of 25.8% for the standard mode cyan dither matrix corresponding to the set density of 20% for the cyan reference density patch C1.

In this way, the standard mode cyan corresponding density data stored in the standard mode cyan corresponding density data area 25*a*1 indicates the set density for each standard mode cyan density patch that achieves substantially the same measured density as that of the corresponding cyan density patch.

By storing the standard mode cyan corresponding density data in the standard mode cyan corresponding density data area 25*a*1 and subsequently measuring the cyan reference density patches C1-C5 with the density sensor 80 (to be described later), the CPU 1126 can find measured densities for the set densities stored in the standard mode cyan corresponding density data area 25*a*1 by referring to the standard mode cyan corresponding density data area 25*a*1, without having to form and measure the standard mode cyan density patches with the laser printer 1001 each time a calibration table is created to be described later.

Through the standard mode cyan corresponding density retrieval process of FIG. 29, the CPU 1126 can create standard mode cyan corresponding density data to be stored in the standard mode cyan corresponding density data area 25*a*1 using the standard mode cyan measured density data and the reference density patch cyan measured density data created in the standard mode cyan corresponding density creation process of FIG. 28.

In each density creation process of S114, S116, S118, S120, S122, S124, and S126, the CPU 1126 of the PC 1125 executes a process in a the same manner as that of the standard mode cyan corresponding density creation process (see FIGS. 29-30).

Next, a mode switching process executed by the CPU 22 of the laser printer 1001 will be described with reference to FIG. 30. The mode switching process is performed to select either a process for forming density patches on the conveying belt 68 or a process for creating the calibration tables (FIG. 19(*d*)).

The mode switching process is executed when the laser printer 1001 receives a command from the PC 1125 to shift to a density patch measuring mode for measuring the dither-matrix-based density patches and the reference density patches, or when a command has been inputted through the operation keys 108 on the laser printer 1001 to create calibration tables for calibrating densities of images that the laser printer 1001 is to form on the paper 3.

In S161 of the mode switching process, the CPU 22 of the laser printer 1001 determines whether a command has been received from the PC 1125 to shift into the density patch measurement mode.

If a command for shifting into the density patch measuring mode has been received from the PC 1125 (S161: YES), then in S162 the CPU 22 of the laser printer 1001 stores the character string transmitted from the PC 1125 (see S132 of FIG. 28) in the character string storage memory area 125a (see FIG. 22). In S163 the CPU 22 of the laser printer 1001 determines whether the character string stored in the character string storage memory area 125a is "standard mode cyan corresponding density creation process,"

When the character string stored in the character string storage memory area 125a is the "standard mode cyan corresponding density creation process" (S363: YES), the CPU 22 advances to S164 to form standard mode cyan density patches on the conveying belt 68 and measure the density of the patches. However, if the character string stored in the character string storage memory area 125a is not the "standard mode cyan corresponding density creation process" (S163: NO), then in S165 the CPU 22 of the printer determines whether the character string is "standard mode magenta corresponding density creation process."

When the character string is the "standard mode magenta corresponding density creation process" (565 YES), the CPU 22 advances to S166 to form standard mode magenta density patches on the conveying belt 68 and measure the density of the patches. However, if, the character string is not the "standard mode magenta corresponding density creation process" (S165: NO), then in S165 the CPU 22 determines whether the character string is "standard mode yellow corresponding density creation process."

When the character string is the "standard mode yellow corresponding density creation process" (S167: YES), the CPU 22 advances to S168 to form standard mode yellow density patches on the conveying belt 68 and measure the density of the patches. However, if the character string is not the "standard mode yellow corresponding density creation process" (S167: NO), then in S167 the CPU 22 determines whether the character string is "standard mode black corresponding density creation process."

When the character string is the "standard mode black corresponding density creation process" (S169; YES), the CPU 22 advances to S170 to form standard mode black density patches on the conveying belt 68 and measure the density of the patches. However, if the character string is not the "standard mode black corresponding density creation process" (S169; NO), then in S167 the CPU 22 determines whether the character string is "high-quality mode cyan corresponding density creation process."

When the character string is the "high-quality mode cyan corresponding density creation process" (S171: YES), the CPU 22 advances to S172 to form high-quality mode cyan density patches on the conveying belt 68 and measure the density of the patches. However, if the character string is not the "high-quality mode cyan corresponding density creation process" (S175: NO), then in S173 the CPU 22 determines whether the character string is "high-quality mode magenta corresponding density creation processs,"

When the character string is the "high-quality mode magenta corresponding density creation process" (S173: YES), the CPU 22 advances to S174 to form high-quality mode magenta density patches on the conveying belt 68 and measure the density of the patches. However, if the character string is not the "high-quality mode magenta corresponding density creation process" (S173: NO), then in S175 the CPU 22 determines whether the character string is "high-quality mode yellow corresponding density creation process."

When the character string is the "high-quality mode yellow corresponding density creation process" (S175: YES), the CPU 22 advances to S176 to form high-quality mode yellow density patches on the conveying belt 68 and measure the density of the patches. However, if the character string is not the "high-quality mode yellow corresponding density creation process" (S175: NO), then in S177 the CPU 22 of the laser printer 1001 determines whether the character string is "high-quality mode black corresponding density creation process."

When the character string is the "high-quality mode black corresponding density creation process" (S177: YES), the CPU 22 of the laser printer 1001 advances to S178 to form high-quality mode black density patches on the conveying belt 68 and measure the density of the patches. However, if the character string is not the "high-quality mode black corresponding density creation process" (S177: NO), then the CPU 22 ends the mode switching process.

If the CPU 22 determines in S161 that a command to shift into the density patch measuring mode has not been received from the PC 1125 (S161: NO), then in S179 the CPU 22 determines whether an instruction to execute calibration has been inputted on the laser printer 1001. If a calibration instruction has been inputted on the laser printer 1001 (S179: YES), then in S180 the CPU 22 advances to a reference density patch measurement process for forming reference density patches C1-C5, measuring the densities of the reference density patches, and transmitting the measured densities to the PC 1125. However, if a calibration instruction has not been inputted (S179; NO), then in S181 the CPU 22 performs another process, such as a process for changing the display of the display unit 109. After completing the process in S178, S180 or S181 the CPU 22 ends the mode switching process.

The standard mode cyan density patch measurement process of S164 is configured of a process for forming standard mode cyan density patches based on the standard mode cyan density patch data transmitted from the PC 1125, measuring the densities of the patches, and transmitting these densities to the PC 1125; and a process for forming the cyan reference density patches C1-C5 on the conveying belt 68, measuring the densities of the reference density patches C1-C5, and transmitting these densities to the PC 1125.

As shown in FIG. 31, in S191 of the standard mode cyan density patch measurement process, the CPU 22 of the printer 1001 determines whether standard mode cyan density patch data has been received from the PC 1125. It no standard mode cyan density patch data has been received from the PC 1125 (S191: NO), then the CPU 22 continues to loop back to S191 until standard mode cyan density patch data has been received.

When standard mode cyan density patch data has been received from the PC 1125 (S191: YES), in S192 the CPU 22 stores the received standard mode cyan density patch data in the standard mode cyan density patch data memory area 125c1.

In S193 the CPU 22 forms each of the standard mode cyan density patches on the conveying belt 68 based on the data stored in the standard mode cyan density patch data memory area 125c1. In S194 the CPU 22 measures each of the standard mode cyan density patches with the density sensor 80.

In S195 the CPU 22 stores the measured densities in the standard mode cyan measured density data memory area 125d1, and in S196 transmits the measured densities stored in the standard mode cyan measured density data memory area 125*d*1 to the PC 1125. Through the process of S191-S196, the PC 1125 can receive measured densities of the standard mode cyan density patches.

In S197 the CPU 22 determines whether a command to measure the densities of the cyan reference density patches C1-C5 has been received from the PC 1125 (see S136 of FIG. 28). If such a command has not been received from the PC 1125 (S197: NO), then the CPU 22 continues to loop back to S197 until such a command has been received.

When a command to measure the densities of the cyan reference density patches C1-C5 has been received from the PC 1125 (S197: YES), then in S198 the CPU 22 forms the cyan reference density patches C1-C5 stored in the reference density patch data memory area 24*a* on the conveying belt 68 and in S199 measures the densities of the cyan density patches C1-C5 with the density sensor 80.

In S1100 the CPU 22 stores the measured densities in the cyan reference density patch measured density data memory area 25*b*5 and in S1101 transmits the measured densities from the cyan reference density patch measured density data memory area 25*b*1 to the PC 1125. Through the process in S197-S1101, the PC 1125 can receive measured densities of the cyan reference density patches C1-C5.

Hence, through the standard mode cyan density patch measurement process, the CPU 22 of the laser printer 1001 can perform a process to form standard mode cyan density patches on the conveying belt 68 based on the standard mode cyan density patch data received from the PC 1125, measure the densities of the standard mode cyan density patches, and transmit the densities to the PC 1125; and a process to form the cyan reference density patches C1-C5 on the conveying belt 68, measure the densities of the reference density patches, and transmit these densities to the PC 1125.

Each of density patch measurement process of S166, S168, S170, S172, S174, S176, and S178 is the same as the standard mode cyan density patch measurement process of S164, except for the content of data used.

Returning to FIG. 30, in S180 of the reference density patch measurement process executed by the CPU 22 of the laser printer 1001 will be described with reference to FIG. 32. The reference density patch measurement process is performed to form the reference density patches C1-K5 on the conveying belt 68, to measure the densities of the reference density patches C1-K5, and to transmit the densities to the PC 1125.

In S1110 of the reference density patch measurement process, the CPU 22 of the laser printer 1001 transmits a calibration execution command to the PC 1125. Upon receiving this command, the PC 1125 executes the calibration table creation process shown in FIG. 33 described later.

In S1111 the CPU 22 forms each of the reference density patches C1-K5 on the conveying belt 68 based on the reference density patch data stored in the reference density patch data memory area 24*a* (see FIG. 24), and in S1112 measures the densities of the reference density patches C1-K5 with the density sensor 80.

In S1113 the CPU 22 stores the measured densities in the reference density patch measured density data memory area 25*b* (see FIG. 13), and in S1114 transmits the measured densities from the reference density patch measured density data memory area 25*b* to the PC 1125. Subsequently, the CPU 22 ends the reference density patch measurement process.

The CPU 1126 of the PC 1125 executes the calibration table creation process shown in FIG. 33 is executed when the CPU 1126 of the PC 1125 receives a calibration execution command that is transmitted from the laser printer 1001 in S1110.

It is noted that the CPU 1126 of the PC 1125 executes the calibration table creation process only when the corresponding density data described above is stored in the corresponding density data area 25*a* (see FIG. 17). If corresponding density data is not stored in the corresponding density data area 25*a*, the process in FIGS. 27 through 31 described above must be performed prior to executing the calibration table creation process. The CPU 1126 can execute the calibration table creation process once the corresponding density data has been stored in the corresponding density data area 25*a*.

In S1120 at the beginning of the calibration table creation process, the CPU 1126 determines whether measured densities for all of the reference density patches C1-K5 have been received. While not all measured densities for the reference density patches C1-K5 have been received (S1120: NO), the CPU 1126 repeatedly loops back to S1120 until the measured densities for all reference density patches C1-K5 have been received.

Once measured densities for all of the reference density patches C1-K5 have been received (S1120: YES), in S1121 the CPU 1126 stores the measured densities received in the reference density patch measured density data memory area 1129*c*, thereby updating the measured densities stored in the reference density patch measured density data memory area 1129*c*.

The CPU 1126 then executes the process of S51 through S58 in the same manner as in the first embodiment described with reference to FIG. 10, by using the reference density patch measured density data memory area 1129*c* of PC 1125 instead of the reference density patch measured density data memory area 25*b* of the laser printer 1, thereby creating each calibration tables (see FIG. 19(*d*)) and storing the same in the calibration table memory area 24*d* of the HDD 1128. After completing the process in S58, the CPU 1126 ends the calibration table creation process.

It is noted that the reference density patch cyan measured density data stored in the reference density patch cyan measured density data memory area 1129*c*1 (see FIG. 13), i.e., the measured densities of the cyan reference density patches C1-C5 (at set densities of 20%, 40%, 60%, 80%, and 100%) may vary due to the internal temperature of the laser printer 1001 and other factors. Therefore, the PC 1125 can create an accurate calibration table by receiving the measured densities of the cyan reference density patches C1-C5 from the laser printer 1001 each time the calibration table creation process is performed.

It is noted that according to the second embodiment, the standard mode cyan measured data stored in the standard mode cyan measured data memory area 25*c*1 (see FIG. 18) is obtained in S51 (S63 in FIG. 10) so as to be configured of data correlating the reference density patch cyan measured density data stored in the reference density patch cyan measured density data memory area 1129*c*1 (see FIG. 13) with the standard mode cyan corresponding density data stored in the standard mode cyan corresponding density data area 25*a*1 (see FIG. 17).

The standard mode cyan corresponding density data stored in the standard mode cyan corresponding density data areas 25*a*1 (see FIG. 17) indicates set densities for the standard mode cyan dither matrix needed to achieve substantially the same measured densities as those of the reference density patches C1-K5. So, the measured densities of the cyan reference density patches C1-C5 stored in the reference density patch cyan measured density data memory area 1129*c*1 (see FIG. 13) are correlated with the set densities for the standard mode cyan dither matrix stored in the standard mode cyan corresponding density data area 25*a*1 (see FIG. 17).

Through these correlations, it is possible to find measured densities for those set densities of the standard mode cyan dither matrix stored in the standard mode cyan corresponding density data area 25a1 (FIG. 17), without having to actually measure the densities with the density sensor 80, provided that the cyan reference density patches C1-C5 have been measured by the density sensor 80.

Hence, the CPU 22 of the laser printer 1001 can create calibration tables by forming the cyan reference density patches C1-C5 on the conveying belt 68, measuring the densities of the density patches, and transmitting these densities to the PC 1125. Hence, the time required for calibration can be greatly reduced.

Next, a PC-side calibration process executed by the CPU 1126 of the PC 1125 will be described with reference to FIG. 34. The calibration process serves to calibrate set densities (image data) to be outputted to the laser printer 1001. The CPU 1126 of the PC 1125 executes the calibration process each time an operator inputs a command via the input device 131 to output image data to the laser printer 1001.

In S1140 of the PC-side calibration process, the CPU 1126 acquires the calibration table of FIG. 19(*d*) from the calibration table memory area 24*d* of the PC 1125 (see FIG. 23) corresponding to the set density indicated by image data desired to be outputted to the laser printer 1001.

For example, when image data to be outputted to the laser printer 1001 indicates a set density for a standard mode cyan dither matrix, in S1140 the CPU 1126 acquires the standard mode cyan calibration table from the standard mode cyan calibration table memory area 24*d*1 (FIG. 19(*d*)) of the PC 1125.

In S1141 the CPU 1126 of the PC 1125 calibrates the set density based on the calibration table, converts multivalues image data corresponding to the calibrated set density into binary image data by using a dither matrix of the corresponding combination of mode and color, and outputs the binary image data to the laser printer 1001. Subsequently, the CPU 1126 ends the calibration process. The binary image data indicates whether each dot location in the dither matrix.

For example, when image data to be outputted to the laser printer 1001 indicates a set density for the standard mode cyan dither matrix, in S1141 the CPU 1126 of the PC 1125 calibrates the set density based on the standard mode cyan calibration table acquired in S1140, converts multivalue image data, corresponding to the calibrated set density, into binary image data by using the standard mode cyan dither matrix, and outputs the binary image data to the laser printer 1001.

Through the PC-side calibration process in FIG. 34, the CPU 1126 of the PC 1125 can calibrate the set density indicated by the image data desired to be outputted to the laser printer 1001 using the corresponding calibration table in order that the image formed on the recording paper 3 will have a density matching the target measured density stored in the target data memory area 25*e*.

According to the second embodiment, the CPU 1126 of the PC 1125 creates density patch data using the corresponding dither matrices stored. In the printer driver area 1128*a* and transmits this data to the laser printer 1001. The CPU 22 of the laser printer 1001 forms each density patch on the conveying belt 68 based on the corresponding density patch data received from the PC 1125 and measures the density of the density patches with the density sensor 80. Subsequently, the CPU 22 of the laser printer 1001 transmits the measured densities of the density patches to the PC 1125. The CPU 22 of the laser printer 1001 also forms the reference density patches C1-K5 on the conveying belt 68 based on the reference density patch data stored in the reference density patch data memory area 24*a* and measures the densities of the density patches C1-K5 with the density sensor 80 when the PC 1125 transmits a command to the laser printer 1001 instructing the laser printer 1001 to measure densities of the reference density patches C1-K5 Subsequently, the CPU 22 of the laser printer 1001 transmits the measured densities of the reference density patches C1-K5 to the PC 1125. The CPU 1126 of the PC 1125 calculates the set densities for each dither matrix required to produce substantially the same measured densities as the is corresponding reference density patches C1-K5 based on the measured densities of the reference density patches C1-K5 and the measured densities of the density patches, and stores the set densities for each dither matrix in the corresponding density data area 25*a*. Using there set densities for the dither matrix, the CPU 1126 can produce images with densities substantially the same as the measured densities of the reference density patches C1-K5 by setting the set density of each dither matrix as set in the corresponding density data area 25*a*.

Next, the CPU 22 of the laser printer 1001 forms the reference density patches C1-K5 on the conveying belt 68, measures the densities of the reference density patches C1-K5, and transmits the measured densities to the PC 1125. The CPU 1126 of the PC 1125 creates corresponding measured data using the measured densities of the reference density patches C1-K5 transmitted from the laser printer 1001 and the set densities for the dither matrices stored in the density data corresponding memory area 25*a*, and stores the corresponding measured data in the corresponding measured data memory area, 25*c*. Next, the CPU 1126 creates calibration tables based on the relationship between the measured densities, which are originally stored in the corresponding measured data memory area 25*c* and which are interpolated and stored in the interpolation data memory area 25*d*, and the target values of measured densities stored in the target data memory area 25*e*. The CPU 112 stores the calibration tables in the calibration table memory area 24*d*. The CPU 1126 then calibrates set densities indicated by image data to be outputted to the laser printer 1001 using these calibration tables to form images on the paper 3 to have densities corresponding to the target values of measured densities stored in the target data memory area 25*e*.

The second embodiment can accurately create the corresponding density data by actually measuring the density patches of dither matrices.

Further, when performing calibration table creation process after storing the corresponding density data in the corresponding density data memory area 25*a* in the second embodiment, the CPU 1126 of the PC 1125 can instruct the laser printer 1001 to form the reference density patches C1-K5 on the conveying belt 68, to measure the densities of the reference density patches C1-K5 with the density sensor 80, and transmit the measured densities to the PC 1125. The CPU 1126 of the PC 1125 can create calibration tables without forming density patches created according to the dither data on the conveying belt 68 of the laser printer 1001 and measuring the densities of these density patches in each case, thereby reducing the time required for calibration.

Further, according to the second embodiment, the laser printer 1001 forms density patches on the conveying belt 68 based on the density patch data for the dither matrices transmitted from the PC 1125. Accordingly, it is possible to eliminate the portion of the storage device required for storing data of density patches created according to dither data necessary to form density patches on the conveying belt 68. Hence, the laser printer 1001 can reduce the capacity of the storage device required for storing density patches created based on dither matrix.

In the second embodiment described above, the reference density patch measurement process executed by the CPU 22 of the laser printer 1001 in FIG. 32 is performed to create calibration tables by newly measuring the densities of C the reference density patches C1-K5 in S112. However, the CPU 22 of the laser printer 1001 may create calibration tables using measured densities of the reference density patches C1-K5 that are acquired in S199 when creating the corresponding density data to be stored in the corresponding density data area 25a.

In the first embodiment, the CPU 22 reads all reference density patch data from the reference density patch data memory area 24a and forms a total of 20 reference density patches C1-K5 on the conveying belt 68. However, the CPU 22 may instead read a portion of the reference density patch data from the reference density patch data memory area 24a. The CPU 22 may read data of only the four cyan reference density patches C1-C4 and form only the cyan reference density patches C1-C4 on the conveying belt 68, for example. Hence, it should be apparent that any portion of reference density patch data stored in the reference density patch data memory area 24a may be read to form only the reference density patches corresponding to this data on the conveying belt 68.

The measured value outputted from the density sensor 80 is the minimum value when the set density for the reference density patch is 0% and the measured value is the maximum value when the set density for the reference density patch is 100%. According to the first and second embodiments, it is not necessary to form reference density patches for set densities 0% and 100% on the conveying belt 68 and to measure the densities of the reference density patches with the density sensor 80. For this reason, the reference density patch is not formed for the set density of 0%, and the measured density of the reference density patch is forcibly set to 0.00 for the set density of 0%.

Similarly, the density patches C5, M5, Y5, and K5 may not be formed. The measured density of the density patches C5, M5, Y5, and K5 may be forcibly set to 1.00. It is noted that the reference density patch data may not be stored in the reference density patch data memory are 24a for the set density 100%.

Similarly, according to the second embodiment, it is not necessary to form dither matrix density patches for the set density of 100% on the conveying belt 68 and to measure the densities of the density patches. The measured densities for the density patches of the set density 100% may be forcibly set to 1.00. So, in S131 (FIG. 28), patch data may not be created for the set density of 100%. Patch data may be created only for 20, 40, 60, and 80%.

In the first embodiment, the CPU 22 determines in S36 whether the coverage of the standard mode cyan dither matrix reaches or exceeds the coverage of the reference density patch as a method for determining whether the coverage first reaches or exceeds the coverage of the reference density patch. However, in S36 the CPU 22 may determine whether the coverage of the standard mode cyan dither matrix calculated in S35 is within a prescribed range (±5 for example) of the reference density patch coverage retrieved in S32. Or, in the S36, the CPU 22 may determine whether the coverage of the standard mode cyan dither matrix calculated in S35 is exactly the same as the reference density patch coverage retrieved in S32.

In the second embodiment, the CPU 1126 determines in S145 whether the measured density of the standard mode cyan density patch reaches or exceeds the measured density of the reference density patch as a method for determining whether the measured density first reaches or exceeds the measured density of the reference density patch. However, in 3145 the CPU 1126 may determine whether the measured density of the standard mode cyan density patch is within a prescribed range (±0.5%, for example) of the reference density patch measured density retrieved in S32. Or, in the S145, the CPU 1126 may determine whether the measured density of the standard mode cyan density patch is exactly the same as the reference density patch measured density retrieved in S32.

While the invention has been described in detail with reference to specific embodiments thereof, it would be apparent to those skilled in the art that many modifications and variations may be made therein without departing from the spirit of the invention, the scope of which is defined by the attached claims.

While the present invention is applied to a tandem laser printers 1 and 1001 in the embodiments described above, the present invention may also be applied to a transfer drum type color laser printer, a transfer belt type color laser printer, or a direct transfer type color laser printer, for example.

Further, while the density patches are formed on the conveying belt 68 and subsequently measured with the density sensor 90 in the embodiments described above, the density patches may be formed on the recording paper 3 and subsequently read with a scanner provided in the laser printer 1 or 1001 in order to measure the densities thereof. Since the scanner is used in place of the density sensor 80 for measuring the densities of the density patches in this method, the density sensor 80 can be eliminated.

Further, in the first embodiment, the CPU 22 determines, for each reference set density, a corresponding set density of dither matrix, that allows the dither matrix to create binarized image data that enables the image-forming unit to form an image whose density reaches or exceeds the measured density of the reference density patch at the each reference set density, by comparing coverage of the reference patches and coverage of the dither matrix. However, the CPU 22 may determine the corresponding set density of the dither matrix for each reference set density, by comparing densities of reference density patches measured by sensor 80 and measured densities of patches that are formed based on dither matrices and are measured by sensor 80. In this case, the process in S21-S40 is modified by replacing with a process of measuring densities of images that are formed based on the dither matrix and CPU 22 determine the corresponding set density in the same manners as in S140-S149.

What is claimed is:

1. A calibration data creating device comprising:
   a reference measured density memory storing, as reference measured densities, measured densities of reference density patches that are formed by an image-forming unit based on a single group of reference density patch data, the single group of reference patch data including a plurality of sets of reference density patch data for a plurality of reference set densities, the reference density patch data being binarized image data;
   a target density memory storing for target densities in association with a plurality of set densities;
   a dither data memory for storing a plurality of sets of dither data, each set of dither data that has a plurality of dot locations and that is used for creating binarized image data based on each set density, the dither data having a prescribed threshold at each dot location;

a corresponding set density determining unit determining, for each set of dither data, corresponding set densities for the plurality of the reference set densities being used for creating, based on the subject set of dither data, binarized image data that enables the image-forming unit to form an image whose density corresponds to the measured density of the reference density patch that is formed by the image-forming unit based on the reference density patch data at the each reference set density;

a calibration data creating unit creating calibration data indicating a correlation between the set densities and calibrated set densities, the calibrated set density for each set density being used for creating, based on the subject set of dither data, binarized image data that enables the image-forming unit to form an image whose density is the same as the target density for the each set density, the calibration data creating unit creating the calibrated set densities based on the target densities, the reference measured densities, and the corresponding set densities; and a calibration data memory storing the calibration data.

2. The calibration data creating device according to claim 1, wherein the dither data memory stores a plurality of sets of dither data in correspondence with a plurality of different resolutions, at which the image-forming unit is capable of forming images;

wherein the single group of reference density patch data is defined with respect to the plurality of resolutions;

wherein the corresponding set density determining unit is arranged to determine, for each set of dither data, corresponding set densities for the plurality of the reference set densities, the corresponding set density for each reference set density being used for creating, based on the subject set of dither data binarized image data that enables the image-forming unit to form an image whose density corresponds to the measured density of the reference density patch that is formed by the image-forming unit based on the reference density patch data at the each reference set density; and wherein the calibration data creating unit create, for each set of dither data calibration data indicating a correlation between the set densities and calibrated set densities, the calibrated set density for each set density being used for creating, based on the subject set of dither data, binarized image data that enables the image-forming unit to form an image whose density is the same as the target density for the each set density.

3. The calibration data creating device according to claim 1, wherein the dither data memory stores a plurality of sets of dither data in correspondence with a plurality of different colors, at which the image-forming unit is capable of forming images;

wherein the single group of reference density patch data is defined with respect to the plurality of colors;

wherein the corresponding set density determining unit is arranged to determine, for each set of dither data corresponding set densities for the plurality of the reference set densities, the corresponding set density for each reference set density being used for creating, based on the subject set of dither data, binarized image data that enables the image-forming unit to form an image whose density corresponds to the measured density of the reference density patch that is formed by the image-foaming unit based on the reference density patch data at the each reference set density; and wherein the calibration data creating unit is arranged to create, for each set of dither data, calibration data of each color indicating a correlation between the set densities and calibrated set densities, the calibrated set density for each set density being used for creating, based on the subject set of dither data, binarized image data that enables the image-forming unit to form an image whose density is the same as the target density for the each set density.

4. The calibration data creating device according to claim 1, further comprising a density calibrating unit that receives a set density indicative of an image desired to be formed by the image forming unit, that calibrates the set density into a calibrated set density by referring to the calibration data, and that converts multivalue image data indicated by the calibrated set density into binarized image data.

5. The calibration data creating device according to claim 1, further comprising a corresponding measured density memory that stores the corresponding set density for the each reference set density, in correspondence with a reference measured density stored in the reference measured density memory for the each reference set density, wherein the calibration data creating unit creates the calibration data by using contents of the target density memory and the corresponding measured density memory.

6. The calibration data creating device according to claim 1, further comprising:

a dither data converting unit converting the dither data to density patch data by using each reference set density and transmitting the converted density patch data to the image-forming unit, the density patch data being binarized image data; and a dither data density measuring unit measuring a measured density of a density patch, the density patch being formed by the image-forming unit at each reference set density based on the dither data converted by the dither data converting unit; and wherein the corresponding set density determining unit determines, for each reference set density, the corresponding set density that allows the dither data to create binarized image data that enables the image-forming unit to form an image whose density is substantially equal to the measured density of the reference density patch at the each reference set density, the dither data set density determining unit determiining the corresponding set density based on the measured density of the reference density patch at the each reference set density and the measured density of the density patch at the each reference set density.

7. The calibration data creating device according to claim 1, further comprising a reference coverage memory storing a coverage of the reference density patch at each reference set density; and wherein the corresponding set density determining unit determines, in correspondence with each reference set density, the corresponding set density that allows the dither data to have a coverage corresponding to a coverage of the reference density patch that is stored in the reference coverage memory for the each reference set density.

8. The calibration data creating device according to claim 7, further comprising a coverage calculating unit calculating, for each set density, the coverage of the dither data by dividing the number of dot locations whose threshold values are smaller than multivalue image data indicated by the each set density with the total number of dot locations in the dither data.

9. The calibration data creating device according to claim 1, further comprising the image-forming unit that is configured to form images based on binarized image data.

10. The calibration data creating device according to claim 1, further comprising a measuring unit measuring density of the reference density patch at each reference set density, the reference measured density memory storing the measured density indicative of a measured result by the measuring unit.

11. The calibration data creating device according to claim 1, further comprising:
a corresponding set density memory storing the corresponding set density for each reference set density in association with the measured density of the reference density patch at the each reference set density, the calibrating data creating unit creating the calibration data based on the content of the dither data corresponding set density memory and the target density memory;
a communication unit that is capable of communicating with an image-forming device, the image-forming device including the image-forming unit that is configured to form images based on binarized image data, and a measuring unit measuring density of a patch;
a density patch data transmitting unit converting the dither data to density patch data by using each set density and transmitting the converted density patch data via the communication unit to the image-forming device, the density patch data being binarized image data;
a density patch measured density receiving unit receiving via the communication unit from the image-forming device a measured density of a density patch, the density patch being formed by the image-forming unit in the image-forming device at each reference set density based on the density patch data transmitted from the density patch data transmitting unit, the measured density of the density patch being measured by the measuring unit;
a reference density patch measured density receiving unit receiving via the communication unit from the image-forming device the measured density of the reference density patch, the reference density patch being formed by the image-forming unit in the image-forming device at each reference set density based on the binarized reference density patch data for each reference set density, the measured density of the reference density patch being measured by the measuring unit, the reference density patch measured density receiving unit storing the measured density of the reference patch data in the reference measured density memory; and
wherein the corresponding set density determining unit determines, for each reference set density, the corresponding set density that allows the dither data to create binarized image data that enables the image-forming unit to form an image whose density is substantially equal to the measured density of the reference density patch at the each reference set density, the dither data set density determining unit determining the corresponding set density based on the measured density of the reference density patch at the each set density received by the reference density patch measured density receiving unit and the measured density of the density patch at the each reference set density received by the density patch measured density receiving unit.

12. The calibration data creating device according to claim 11, further comprising:
a corresponding set density memory storing the corresponding set density determined by the corresponding set density determining unit;
an updating unit updating the measured density of the reference density patch at each reference set density stored in the reference measured density memory when the reference density patch measured density receiving unit receives a new measured density of the reference density patch at each reference set density; and
a corresponding measured density memory that stores the corresponding set density for the each reference set density, in correspondence with a reference measured density stored in the reference measured density memory for the each reference set density, wherein the calibration data creating unit creates the calibration data by using contents of the target density memory and the corresponding measured density memory.

13. The image-forming device that is capable of communicating with the calibration data creating device according to claim 11, the image-forming device comprising:
the image-forming unit that is configured to form images based on binarized image data;
the measuring unit that is configured to measure density of images formed by the image-forming unit;
a density patch data receiving unit receiving the density patch data at each reference set density transmitted from the dither data density patch data transmitting unit;
a density patch measuring unit controlling the image-forming unit to form a density patch at each reference set density based on the dither data density patch data, and controlling the measuring unit to measure the density of the dither data density patch at each reference set density;
a reference density patch measuring unit measuring a density of the reference density patch formed by the image-forming unit based on the reference density patch data at each reference set density; and
a measured density transmitting unit transmitting the measured density of the density patch and the measured density of the reference density patch to the calibration data creating device.

14. A system comprising:
the calibration data creating device according to claim 11, and
the image-forming device according to claim 13.

15. A method for creating calibration data comprising:
forming reference density patches for a plurality of reference set densities based on a single group of reference density patch data, the single group of reference patch data including a plurality of sets of binarized reference density patch data by an image-forming unit, the reference density patch data being binarized image data;
measuring densities of the reference density patches and storing the measured densities in a measured density memory;
determining, for each of a plurality of sets of dither data, a corresponding set density for the subject set of dither data that has a plurality of dot locations and that is used for creating binarized image data based on each set density, the subject set of dither data having a prescribed threshold at each dot location, the corresponding set density being used for creating, based on the subject set of dither data binarized image data that enables the image-forming unit to form an image whose density corresponds to the measured density of the reference density patch that is formed by the image-forming unit based on the reference density patch data at the each reference set density; and
creating calibration data that indicates a correlation between the set densities and calibrated set densities, the calibrated set density for each set density being used for creating, the subject set of dither data binarized image data that enables the image-forming unit to form an image whose density is the same as a target density for the each set density, the calibrated set density being created based on the target density, measured density, and the corresponding set density for each reference set density.

16. The method according to claim 15, wherein the determining comprises:
acquiring a reference coverage that is a preset value for each reference density patch data; and
calculating, for each set density, a coverage of the dither data by dividing the number of dot locations whose threshold values are smaller than multivalue image data indicated by the each set density with the total number of dot locations in the dither data;
searching, for each set density, the corresponding set density that allows the dither data to have a coverage substantially equal to a coverage of the reference density patch for the each reference set density.

17. The method according to claim 15, further comprising:
converting the dither data to density patch data by using each reference set density, the density patch data being binarized image data;
forming a density patch by the image-forming unit at each reference set density based on the dither data converted by the dither data converting unit;
measuring density of the density patch; and
wherein the corresponding set density is determined, for each reference set density, the corresponding set density allowing the dither data to create binarized image data that enables the image-foaming unit to form an image whose density is substantially equal to the measured density of the reference density patch at the each reference set density, the corresponding set density being determined the corresponding set density based on the measured density of the reference density patch at the each set density and the measured density of the density patch at the each reference set density.

18. A method executed by a calibration data creating device and an image-forming device, the method comprising:
converting, for each of a plurality of sets of dither data, the subject of dither data to density patch data by using each reference set density at the calibration data creating device, the dither data having a plurality of dot locations and that is used for creating binarized image data based on each set density, the dither data having a prescribed threshold at each dot location;
transmitting the converted density patch data from the calibration data creating device to the image-funning device, the density patch data being binarized image data;
forming, for each set of dither data a density patch at each reference set density based on the subject set of dither data density patch data, and measuring the density of the dither data density patch at each reference set density at the image-forming device;
transmitting from the image-forming device to the calibration data creating device a measured density of a density patch for each reference set density,
forming the reference density patch at each reference set density based on a single group of reference density patch data, the single group of reference density patch data including a plurality offsets of binarized reference density patch data by an image-forming unit, the reference density patch data being binarized image data;
measuring a density of the reference density patch for each set density at the image-forming device;
transmitting the measured density of the reference density patch from the image-forming device to the calibration data creating device;
determining, for each set of dither data, at the calibration data creating device, for each reference set density, a corresponding set density being used for creating, based on the subject set of dither data binarized image data that enables the image-forming unit to form an image whose density corresponding to the measured density of the reference density patch at the each reference set density; and
creating calibrated set densities based on the corresponding set densities and target densities at the calibration data creating device.

19. A non-transitory computer readable recording medium storing a set of program instructions executable on a calibration data creating device, instructions comprising:
forming reference density patch for a plurality of reference set densities based on a single group of reference density patch data, the single group of reference density patch data including a plurality of sets of binarized reference density patch data by an image-forming unit, the reference density patch data being binarized image data;
measuring densities of the reference density patches and storing the measured densities in a measured density memory;
determining, for each of a plurality of sets of dither data, a corresponding set density being used for creating, based on the subject set of dither data, binarized image data that enables the image-forming unit to form an image whose density corresponds to the measured density of the reference density patch that is formed by the image-forming unit based on the reference density patch data at the each reference set density; and
creating calibration data that indicates a correlation between the set densities and calibrated set densities, the calibrated set density for each set density being used for creating, based on the subject set of dither data binarized image data that enables the image-forming unit to form an image whose density is the same as a target density for the each set density, calibrated set density being created based on the target density, measured density, and the corresponding set density for each set density.

20. The calibration data creating device according to claim 7, wherein the dither data memory is arranged to store a plurality of sets of dither data in correspondence with a plurality of different resolutions, at which the image-forming unit is capable of forming images; and
wherein the calibration data creating devices further comprises a reference density patch data memory that is arranged to store the single group reference density patch data with respect to the plurality of resolutions.

21. The calibration data creating device according to claim 7, wherein the dither data memory is arranged to store a plurality of sets of dither data in correspondence with a plurality of different colors, at which the image-forming unit is capable of forming images; and
wherein the calibration data creating device further comprises a reference density patch data memory is that arranged to store the single group of reference density patch data with respect to the plurality of colors.

22. The image-forming device according to claim 13, wherein the dither data memory is arranged to store a plurality of sets of dither data in correspondence with a plurality of different resolutions, at which the image-forming unit is capable of forming images; and wherein the image-forming device further comprises a reference density patch data memory that is arranged to store the single group of reference density patch data with respect to a plurality of resolutions.

23. The image-forming device according to claim 13, wherein the dither data memory is arranged to store a plurality of sets of dither data in correspondence with a plurality of different colors, at which the image-forming unit is capable of forming images; and wherein the image-forming device further comprises a reference density patch data memory that is arranged to store the single group of reference density patch data with respect to the plurality of colors.

* * * * *